US011853523B2

(12) United States Patent
Kim et al.

(10) Patent No.: US 11,853,523 B2
(45) Date of Patent: Dec. 26, 2023

(54) DISPLAY DEVICE AND METHOD OF INDICATING AN ACTIVE REGION IN A MULTI-WINDOW DISPLAY

(71) Applicant: Samsung Electronics Co., Ltd., Suwon-si (KR)

(72) Inventors: Young-Jin Kim, Suwon-si (KR); Kang-Tae Kim, Yongin-si (KR); Dae-Wook Park, Suwon-si (KR); Tae-Soo Kim, Suwon-si (KR); Jung-Hwan Choi, Seoul (KR); Sung-Hee Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/566,295

(22) Filed: Sep. 10, 2019

(65) Prior Publication Data

US 2020/0004387 A1     Jan. 2, 2020

Related U.S. Application Data

(63) Continuation of application No. 14/097,788, filed on Dec. 5, 2013, now Pat. No. 10,564,792.

(Continued)

(30) Foreign Application Priority Data

Feb. 1, 2013   (KR) .................. 10-2013-0012019
Feb. 28, 2013  (KR) .................. 10-2013-0022422
Aug. 22, 2013  (KR) .................. 10-2013-0099927

(51) Int. Cl.
*G06F 3/048*   (2013.01)
*G06F 3/0481*  (2022.01)
(Continued)

(52) U.S. Cl.
CPC .......... *G06F 3/0481* (2013.01); *G06F 3/0486* (2013.01); *G06F 3/0488* (2013.01); *G06F 2203/04803* (2013.01)

(58) Field of Classification Search
CPC ......... G06F 3/0486; G06F 2203/04803; G06F 3/0481; G06F 3/0488
(Continued)

(56) References Cited

U.S. PATENT DOCUMENTS 5,835,919 A  * 11/1998  Stern ................. G06F 9/543
                                                         715/209
6,008,809 A    12/1999  Brooks
(Continued)

FOREIGN PATENT DOCUMENTS

CN  1344989 A   4/2002
CN  1458576 A   11/2003
(Continued)

OTHER PUBLICATIONS

Korean Examination report dated Apr. 6, 2020, issued in Korean Application No. 10-2013-0150785.
(Continued)

*Primary Examiner* — Aleksey Olshannikov
(74) *Attorney, Agent, or Firm* — Jefferson IP Law, LLP

(57) ABSTRACT

A display device with a touch screen, which executes at least one application and a method for controlling the display device are provided. The method includes receiving an application execution command to execute at least one application, determining at least one of a size and a position of a window that executes the at least one application according to a position at which the application execution command is input, and displaying the window according to the at least one of the size and position of the window.

12 Claims, 85 Drawing Sheets

Related U.S. Application Data

(60) Provisional application No. 61/740,887, filed on Dec. 21, 2012, provisional application No. 61/737,540, filed on Dec. 14, 2012, provisional application No. 61/734,097, filed on Dec. 6, 2012.

(51) Int. Cl.
  *G06F 3/0488* (2022.01)
  *G06F 3/0486* (2013.01)

(58) Field of Classification Search
  USPC .................................................. 715/792
  See application file for complete search history.

(56) References Cited

U.S. PATENT DOCUMENTS

| | | | |
|---|---|---|---|
| 6,166,736 A * | 12/2000 | Hugh | G06F 3/0481 715/777 |
| 6,535,930 B2 | 3/2003 | Stern et al. | |
| 6,686,852 B1 | 2/2004 | Guo | |
| 7,694,233 B1 | 4/2010 | Ording | |
| 8,271,907 B2 | 9/2012 | Kim et al. | |
| 8,302,026 B2 | 10/2012 | Wang et al. | |
| 8,549,429 B2 | 10/2013 | Tsuruta et al. | |
| 2003/0063125 A1 | 4/2003 | Miyajima et al. | |
| 2003/0076362 A1 | 4/2003 | Terada | |
| 2004/0008224 A1 | 1/2004 | Molander et al. | |
| 2004/0056903 A1 | 3/2004 | Sakai | |
| 2005/0235220 A1 | 10/2005 | Duperrouzel et al. | |
| 2007/0157089 A1 | 7/2007 | Van Os et al. | |
| 2007/0192726 A1 | 8/2007 | Kim et al. | |
| 2008/0082920 A1 | 4/2008 | Eom | |
| 2008/0109740 A1 | 5/2008 | Prinsen et al. | |
| 2008/0158189 A1 | 7/2008 | Kim | |
| 2008/0172609 A1 | 7/2008 | Rytivaara | |
| 2008/0204424 A1 | 8/2008 | Jin et al. | |
| 2008/0214239 A1 | 9/2008 | Hashimoto et al. | |
| 2008/0320396 A1 | 12/2008 | Mizrachi et al. | |
| 2009/0027334 A1 | 1/2009 | Foulk et al. | |
| 2009/0199128 A1 | 8/2009 | Matthews et al. | |
| 2009/0307631 A1 | 12/2009 | Kim et al. | |
| 2009/0322690 A1 | 12/2009 | Hiltunen et al. | |
| 2009/0325563 A1 | 12/2009 | Horodezky et al. | |
| 2010/0062811 A1 | 3/2010 | Park et al. | |
| 2010/0066698 A1 | 3/2010 | Seo | |
| 2010/0088634 A1 | 4/2010 | Tsuruta et al. | |
| 2010/0138767 A1 * | 6/2010 | Wang | G06F 3/0481 715/769 |
| 2010/0214278 A1 | 8/2010 | Miura | |
| 2010/0248788 A1 * | 9/2010 | Yook | G06F 3/0481 455/566 |
| 2010/0293501 A1 | 11/2010 | Russ et al. | |
| 2011/0078624 A1 | 3/2011 | Missig et al. | |
| 2011/0087989 A1 | 4/2011 | McCann et al. | |
| 2011/0099512 A1 | 4/2011 | Jeong | |
| 2011/0105187 A1 | 5/2011 | Dobroth et al. | |
| 2011/0107272 A1 | 5/2011 | Aguilar | |
| 2011/0175930 A1 * | 7/2011 | Hwang | G06F 3/0488 345/629 |
| 2011/0202872 A1 | 8/2011 | Park | |
| 2011/0216064 A1 | 9/2011 | Dahl et al. | |
| 2011/0225538 A1 | 9/2011 | Oyagi et al. | |
| 2011/0239156 A1 | 9/2011 | Lin | |
| 2011/0244924 A1 * | 10/2011 | Jung | G06F 3/0488 455/566 |
| 2011/0258571 A1 | 10/2011 | Kodimer | |
| 2012/0026157 A1 | 2/2012 | Unkel et al. | |
| 2012/0066628 A1 * | 3/2012 | Ens | G06F 16/9577 715/769 |
| 2012/0084715 A1 | 4/2012 | Sirpal et al. | |
| 2012/0089950 A1 | 4/2012 | Tseng | |
| 2012/0144331 A1 | 6/2012 | Tolonen et al. | |
| 2012/0166980 A1 | 6/2012 | Yosef et al. | |
| 2012/0169768 A1 * | 7/2012 | Roth | G06F 3/04886 345/629 |
| 2012/0176322 A1 | 7/2012 | Karmi et al. | |
| 2012/0208593 A1 | 8/2012 | Yang et al. | |
| 2012/0210273 A1 | 8/2012 | Seong et al. | |
| 2012/0289290 A1 | 11/2012 | Chae et al. | |
| 2012/0290966 A1 | 11/2012 | Chae et al. | |
| 2012/0303476 A1 | 11/2012 | Krzyzanowski et al. | |
| 2013/0104075 A1 * | 4/2013 | Matthews | G06F 9/451 715/800 |
| 2014/0089833 A1 | 3/2014 | Hwang et al. | |
| 2014/0096050 A1 * | 4/2014 | Boblett | G01C 21/3697 715/769 |
| 2015/0015520 A1 | 1/2015 | Narita et al. | |

FOREIGN PATENT DOCUMENTS

| | | |
|---|---|---|
| CN | 101308416 A | 11/2008 |
| CN | 101352057 A | 1/2009 |
| CN | 101515227 A | 8/2009 |
| CN | 101606124 A | 12/2009 |
| CN | 101676853 A | 3/2010 |
| CN | 102077164 A | 5/2011 |
| CN | 102129345 A | 7/2011 |
| CN | 102215290 A | 10/2011 |
| CN | 102365617 A | 2/2012 |
| CN | 102521034 A | 6/2012 |
| CN | 102646010 A | 8/2012 |
| CN | 102664747 A | 9/2012 |
| CN | 102780932 A | 11/2012 |
| CN | 103677627 A | 3/2014 |
| EP | 2 530 578 A2 | 12/2012 |
| JP | 02-150919 A | 6/1990 |
| JP | 10-260784 A | 9/1998 |
| JP | 11-110099 A | 4/1999 |
| JP | 2004-46796 A | 2/2004 |
| JP | 2005-284752 A | 10/2005 |
| JP | 2006-59117 A | 3/2006 |
| JP | 2006-073015 A | 3/2006 |
| JP | 2006-115213 A | 4/2006 |
| JP | 2008-117181 A | 5/2008 |
| JP | 2008-134348 A | 6/2008 |
| KR | 10-0478920 B1 | 3/2005 |
| KR | 10-0650257 B1 | 11/2006 |
| KR | 10-0652626 B1 | 11/2006 |
| KR | 10-2007-0001771 A | 1/2007 |
| KR | 10-0700171 B1 | 3/2007 |
| KR | 10-2008-0029225 A | 4/2008 |
| KR | 10-2009-0016044 A | 2/2009 |
| KR | 10-2009-0024508 A | 3/2009 |
| KR | 10-0900295 B1 | 5/2009 |
| KR | 10-2010-0030968 A | 3/2010 |
| KR | 10-0950705 B | 3/2010 |
| KR | 10-2010-0053823 A | 5/2010 |
| KR | 10-2010-0107377 A | 10/2010 |
| KR | 10-2011-0046191 A | 5/2011 |
| KR | 10-2011-0058879 A | 6/2011 |
| KR | 10-2011-0115545 A | 10/2011 |
| KR | 10-2011-0129750 A | 12/2011 |
| KR | 10-2012-0010056 A | 2/2012 |
| KR | 10-2012-0021925 A | 3/2012 |
| KR | 10-2012-0079271 A | 7/2012 |
| KR | 10-2012-0095155 A | 8/2012 |
| KR | 10-2013-0094310 A | 8/2013 |
| KR | 10-1968131 B1 | 4/2019 |
| WO | 2001/096934 A2 | 12/2001 |
| WO | 2008/090902 A1 | 7/2008 |
| WO | 2009/017175 A1 | 2/2009 |
| WO | 2009/028892 A2 | 3/2009 |

OTHER PUBLICATIONS

Korean Office Action dated Dec. 12, 2019, issued in Korean Application No. 10-2013-0022422.
Australian Office Action dated Feb. 20, 2019, issued in Australian Patent Application No. 2013356799.
European Office Action dated Mar. 19, 2019, issued in European Patent Application No. 17191028.4.

(56) References Cited

OTHER PUBLICATIONS

Korean Office Action dated Jun. 28, 2019, issued in Korean Application No. 10-2013-0022422.
Korean Office Action dated Jul. 22, 2019, issued in Korean Application No. 10-2013-0012077.
Chinese Office Action dated Sep. 3, 2018; Chinese Appln. No. 201380071613.8.
Use Automatic Switcher in Windows Live MSN Messenger To Enable or Disable Aero Border Frame, 2011, (http://www.techbuzz.in/tag/aero).
Vocabulary Set MP1—Active Window, 2010, (http://cahmed2010.blogspot.com/2010/10/vocabulary-set-mp1-active-window.html).
Korean Office Action dated Jun. 12, 2020, issued in Korean Application No. 10-2020-0044797.
Chinese Office Action dated Aug. 19, 2020, issued in Application No. 201711096847.4.
Korean Office Action dated Oct. 21, 2020, issued in Korean Application No. 10-2013-0150785.
Korean Office Action dated Dec. 29, 2020, issued in Korean Application No. 10-2020-0140051.
Korean Decision of Grant dated Oct. 23, 2020, issued in Korean Application No. 10-2013-0096206.
Korean Decision on Grant dated Oct. 29, 2021, issued in Korean Application No. 10-2021-0010755.
Chinese Office Action with English translation dated Apr. 20, 2022; Chinese Appln. No. 201910525925.0.
Chinese Office Action with English translation dated Apr. 24, 2022; Chinese Appln. No. 201910525895.3.

* cited by examiner

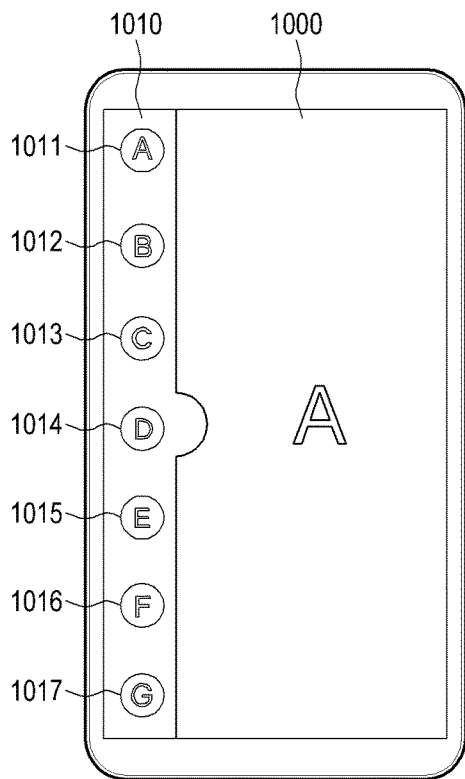 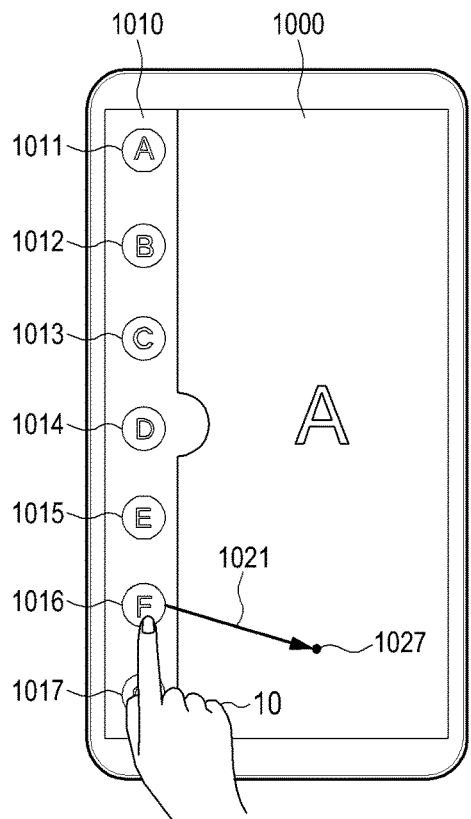
FIG.10A   FIG.10B
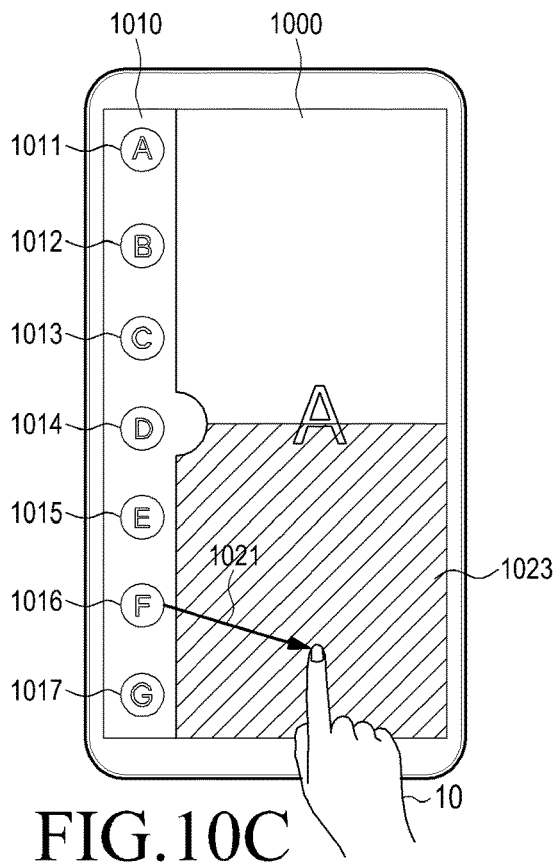 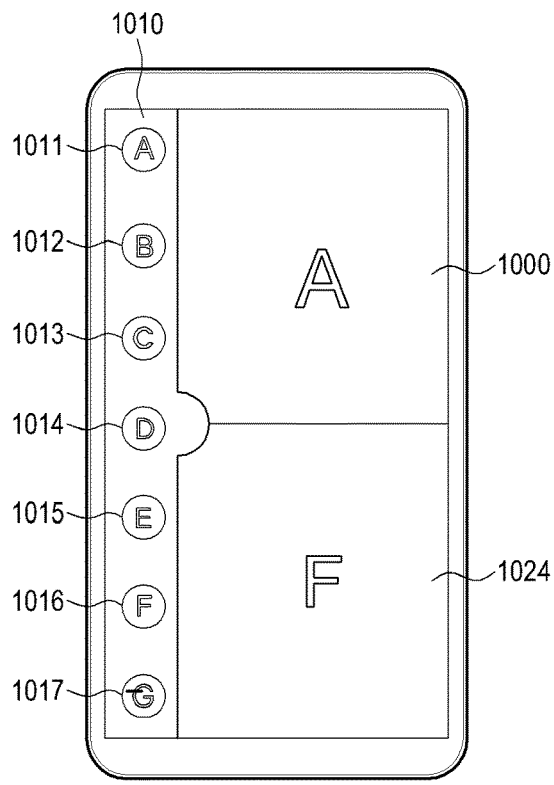
FIG.10C   FIG.10D

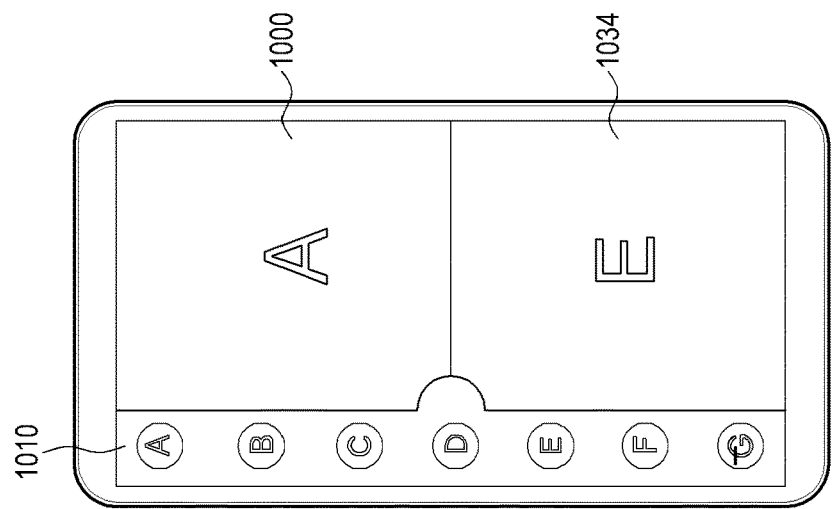
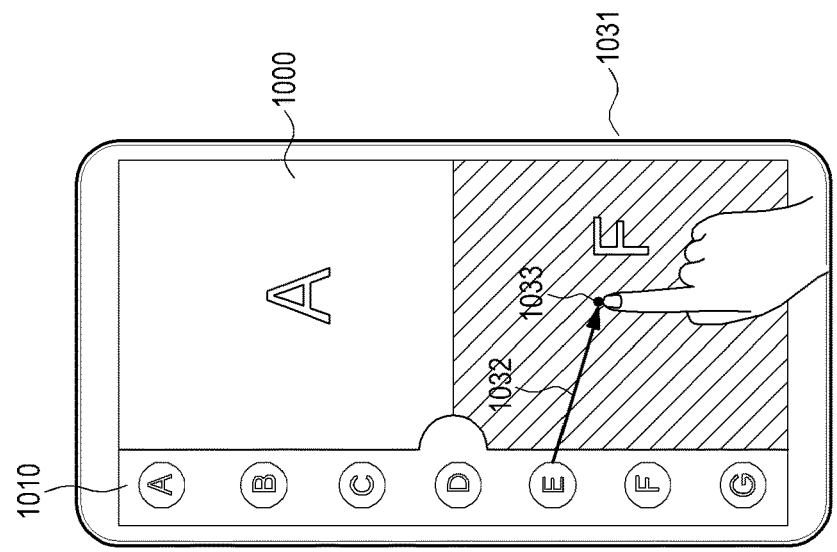
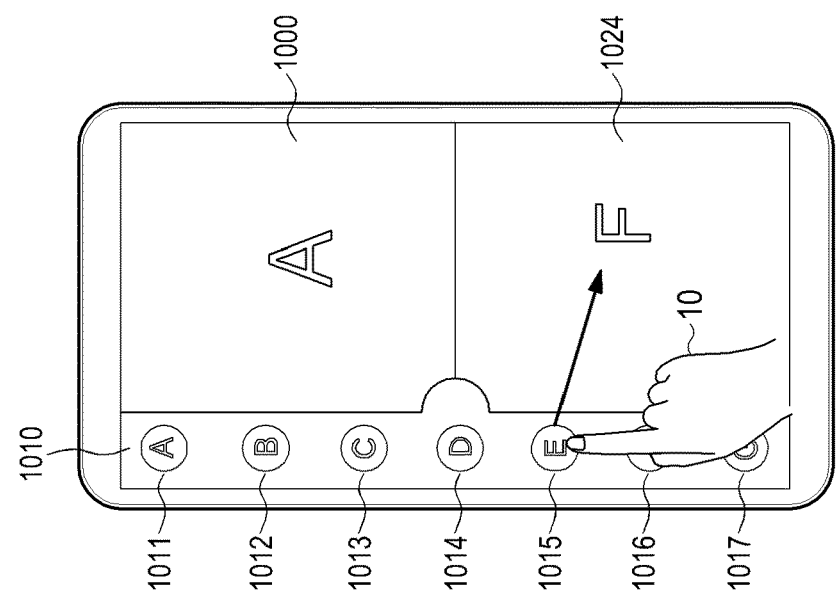

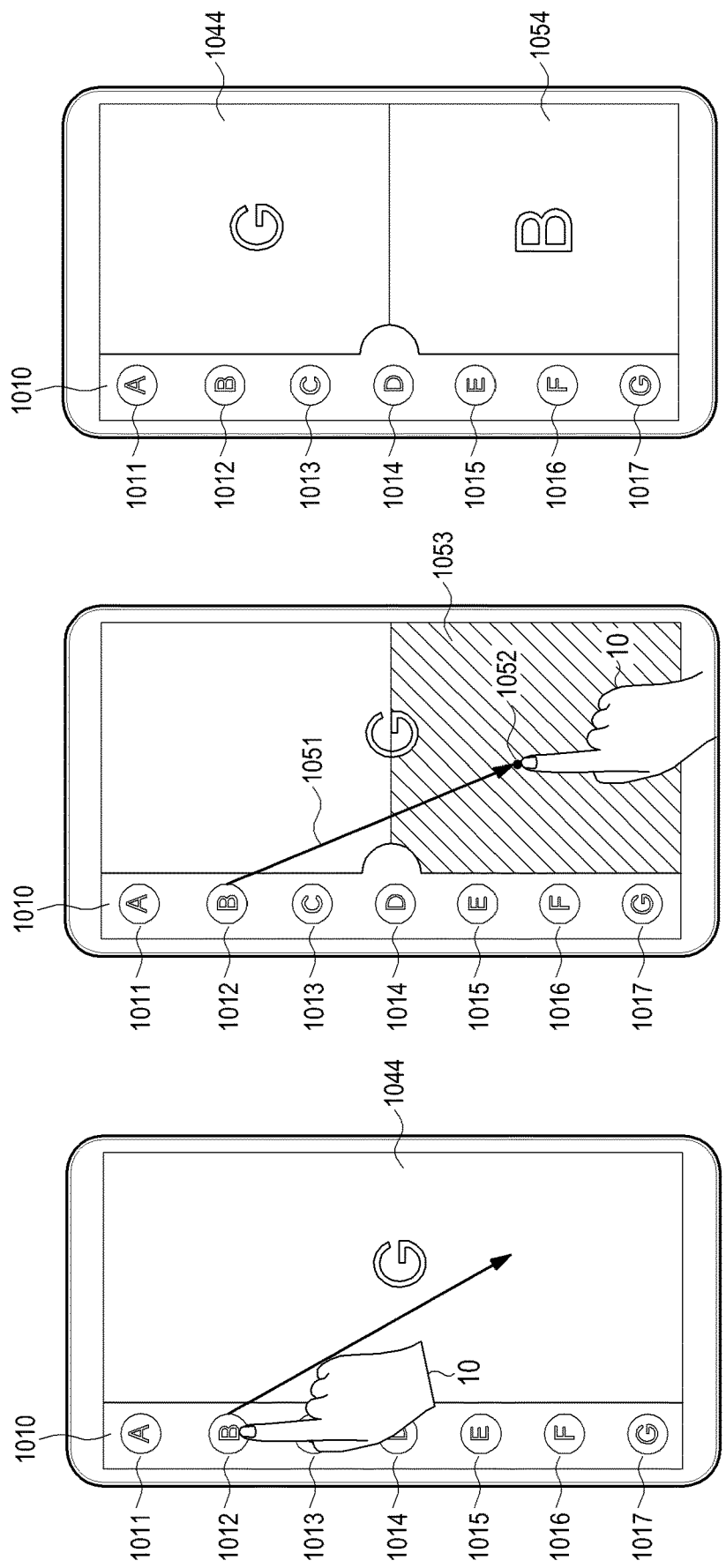

| App. | Page |
|---|---|
| App. C | 3 |
| App. F | 3 |
| App. G | 3 |
| App. A | 1 |
| App. D | 4 |
| App. B | 2 |
| App. J | 1 |
| App. K | 2 |
| App. H | 4 |
| App. M | 4 |
| App. L | 1 |
| App. I | 2 |

| App. | Page |
|---|---|
| App. G | 3 |
| App. C | 3 |
| App. F | 3 |
| App. A | 1 |
| App. D | 4 |
| App. B | 2 |
| App. J | 1 |
| App. K | 2 |
| App. H | 4 |
| App. M | 4 |
| App. L | 1 |
| App. I | 2 |

FIG.22

| App. | Page |
|---|---|
| App. G | 3 |
| App. C | 3 |
| App. F | 3 |
| App. A | 1 |
| App. D | 4 |
| App. B | 2 |
| App. J | 1 |
| App. K | 2 |
| App. H | 4 |
| App. M | 4 |
| App. L | 1 |
| App. I | 2 |

| App. | Page |
|---|---|
| App. L | 1 |
| App. G | 3 |
| App. C | 3 |
| App. F | 3 |
| App. A | 1 |
| App. D | 4 |
| App. B | 2 |
| App. J | 1 |
| App. K | 2 |
| App. H | 4 |
| App. M | 4 |
| App. I | 2 |

FIG.24

| App. | Page |
|------|------|
| App. C | 3 |
| App. F | 3 |
| App. G | 3 |
| App. A | 1 |
| App. D | 4 |
| App. B | 2 |
| App. J | 1 |
| App. K | 2 |
| App. H | 4 |
| App. M | 4 |
| App. L | 1 |
| App. I | 2 |

| App. | Page |
|------|------|
| App. G | 3 |
| App. C | 3 |
| App. F | 3 |
| App. A | 1 |
| App. D | 4 |
| App. B | 2 |
| App. J | 1 |
| App. K | 2 |
| App. H | 4 |
| App. M | 4 |
| App. L | 1 |
| App. I | 2 |

FIG.28

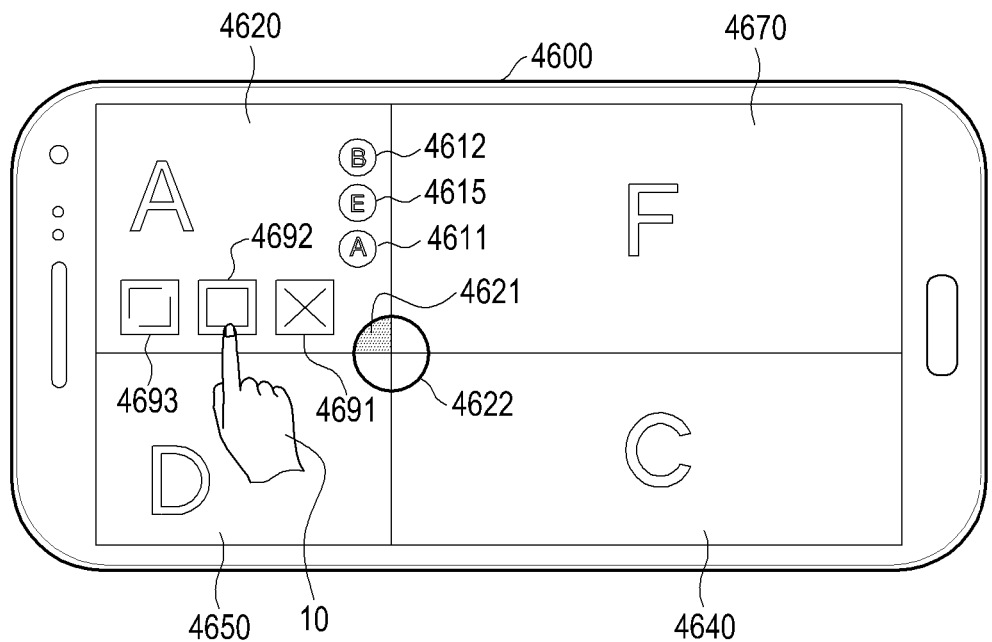
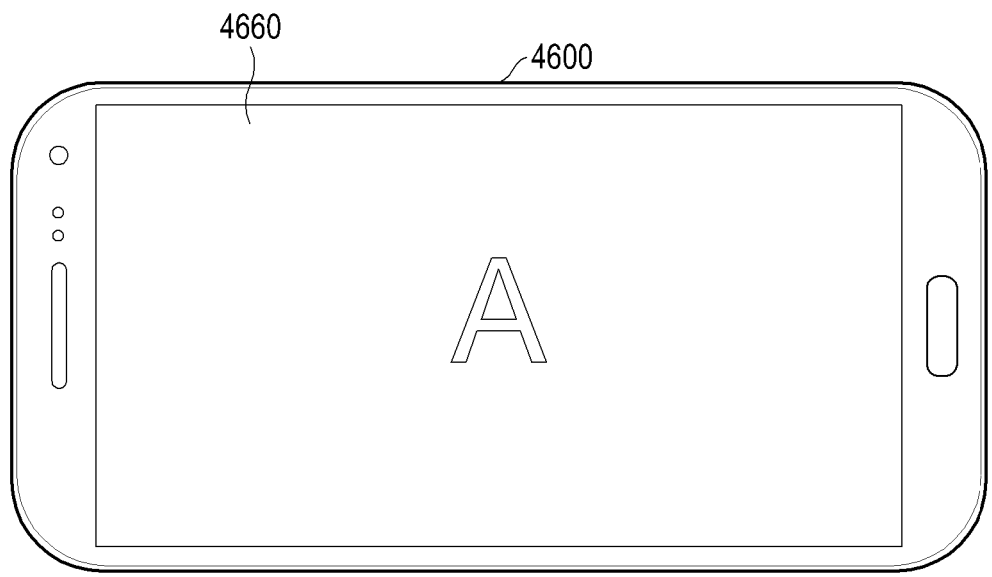
FIG.44W

| A | Region F |
|---|---|
| APPLICATION | REGION |

FIG.45A

| B | Region 6 |
|---|---|
| A | Region 5 |
| APPLICATION | REGION |

FIG.45B

| C | Region 4 |
|---|---|
| B | Region 2 |
| A | Region 5 |
| APPLICATION | REGION |

FIG.45C

| D | Region 3 |
|---|---|
| C | Region 4 |
| B | Region 2 |
| A | Region 1 |
| APPLICATION | REGION |

FIG.45D

| E | Region 7 |
|---|---|
| D | Region 3 |
| C | Region 4 |
| B | Region 7 |
| A | Region 7 |
| APPLICATION | REGION |

FIG.45E

| F | Region 2 |
|---|---|
| E | Region 1 |
| D | Region 3 |
| C | Region 4 |
| B | Region 1 |
| A | Region 1 |
| APPLICATION | REGION |

FIG.45F

| APPLICATION | REGION |
|---|---|
| F | Region 2 |
| E | Region 1 |
| D | Region 3 |
| C | Region 4 |
| B | Region 1 |
| A | Region 1 |

| APPLICATION | REGION |
|---|---|
| E | Region 1 |
| F | Region 2 |
| D | Region 3 |
| C | Region 4 |
| B | Region 1 |
| A | Region 1 |

FIG.45G

| APPLICATION | REGION |
|---|---|
| E | Region 1 |
| F | Region 2 |
| D | Region 3 |
| C | Region 4 |
| B | Region 1 |
| A | Region 1 |

| APPLICATION | REGION |
|---|---|
| A | Region 1 |
| E | Region 1 |
| F | Region 2 |
| D | Region 3 |
| C | Region 4 |
| B | Region 1 |

FIG.45H

| APPLICATION | REGION |
|---|---|
| A | Region 1 |
| E | Region 1 |
| F | Region 2 |
| D | Region 3 |
| C | Region 4 |
| B | Region 1 |

| APPLICATION | REGION |
|---|---|
| B | Region 4 |
| A | Region 1 |
| E | Region 1 |
| F | Region 2 |
| D | Region 3 |
| C | Region 4 |

FIG.45I

DISPLAY DEVICE AND METHOD OF INDICATING AN ACTIVE REGION IN A MULTI-WINDOW DISPLAY

CROSS-REFERENCE TO RELATED APPLICATION(S)

This application is a continuation application of prior application Ser. No. 14/097,788, filed on Dec. 5, 2013, which was based on and claims the benefit under 35 U.S.C. § 119(e) of a U.S. provisional patent application filed on Dec. 6, 2012 in the U.S. Patent and Trademark Office and assigned Ser. No. 61/734,097, a U.S. provisional patent application filed on Dec. 14, 2012 in the U.S. Patent and Trademark Office and assigned Ser. No. 61/737,540, and a U.S. provisional patent application filed on Dec. 21, 2012 in the U.S. Patent and Trademark Office and assigned Ser. No. 61/740,887, and under 35 U.S.C. § 119(a) of a Korean patent application filed on Feb. 1, 2013 in the Korean Intellectual Property Office and assigned Serial No. 10-2013-0012019, a Korean patent application filed on Feb. 28, 2013 in the Korean Intellectual Property Office and assigned Serial No. 10-2013-0022422 and a Korean patent application filed on Aug. 22, 2013 in the Korean Intellectual Property Office and assigned Serial No. 10-2013-0099927, the entire disclosure of each of which is hereby incorporated by reference.

TECHNICAL FIELD

The present disclosure relates to a display device and a method for controlling the same. More particularly, the present disclosure relates to a display device that displays a window in which an application is executed and a method for controlling the display device.

BACKGROUND

A desktop computer is equipped with at least one display device (e.g., a monitor). Similarly, a mobile device having a touch screen (e.g., a portable phone, a smart phone, a tablet Personal Computer (PC), or the like) is also provided with a display device.

A user may use a desktop computer, dividing the screen of a display device (e.g., the screen is divided horizontally or vertically and a plurality of windows are invoked in the divided screens) according to a task environment. When a Web browser is executed, the user may scroll a Web page up or down by means of a page-up button or a page-down button in a keyboard. If the user uses a mouse instead of the keyboard, the user may scroll a Web page up or down by selecting a scroll bar at a side of the Web page using a mouse cursor. The user may also move to the top of the Web page by selecting a top button displayed as text or an icon at the bottom of the Web page.

As compared to a desktop computer, a mobile device has a small screen size and limitations in inputting to the screen. Thus, it is difficult to divide the screen in the mobile device.

A variety of applications may be executed in the mobile device. The applications include basic applications installed in a fabrication process by a manufacturer and additional applications downloaded from application selling Web sites. The additional applications may be developed and registered to the application selling Web sites by ordinary users. Therefore, anyone may sell his or her developed application to mobile users, freely through an application selling Web site. Currently, tens of thousands to hundreds of thousands of free or paid applications are available to mobile devices according to the products.

Although many applications stimulating user interest and satisfying user demands are provided to mobile devices, the mobile devices have limits in display size and User Interface (UI) due to their portable sizes. As a result, users feel inconvenienced in executing a plurality of applications in their mobile devices. For example, when a user executes an application in a mobile device, the application is displayed over the entirety of a display area. If the user is to execute another application during execution of the current application, the user needs to first end the on-going application and then select an execution key to execute the intended application. For example, the user needs to get through a frustrating process of repeating execution and termination of each application in order to execute a plurality of applications. However, a method for executing a plurality of applications simultaneously in a mobile device has yet to be specified.

As described above, although many applications stimulating user interest and satisfying user demands are provided to mobile devices, the mobile devices have limits in display size and UI due to their portable sizes. As a result, users feel inconvenienced in executing a plurality of applications in their mobile devices.

Accordingly, there exists a need for developing a method for displaying a plurality of windows on a single display. In addition, a method for readily invoking a plurality of windows and facilitating arrangement of the windows after the window invocation is needed.

More particularly when a plurality of overlapped windows are displayed, a structure of switching a currently displayed window to another lower-priority window needs to be specified.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a display device of executing a plurality of windows in various sizes on a single display and facilitating switching from one window to another lower-layer window, and a method for controlling the display device.

In accordance with an aspect of the present disclosure, a method for controlling a display device with a touch screen, which executes at least one application, is provided. The method includes receiving an application execution command to execute at least one application, determining at least one of a size and a position of a window that executes the at least one application according to a position at which the application execution command is input, and displaying the window according to the at least one of the size and position of the window.

In accordance with another aspect of the present disclosure, a display device is provided. The display device includes a touch screen configured to receive an application execution command to execute at least one application, and a controller configured to determine of at least one of a size and a position of a window that executes the at least one application according to a position at which the application execution command is input and to control display of the window on the touch screen according to the at least one of the size and position of the window.

In accordance with another aspect of the present disclosure, a method for executing an application in a display device including a touch screen is provided. The method includes displaying an execution window of an application in each of a plurality of regions of the touch screen, displaying a button on at least one boundary that separates the plurality of regions, receiving an input that selects the button, and displaying a list of at least one application executed in a specific region from among the plurality of regions in the specific region according to the received input.

In accordance with another aspect of the present disclosure, a method for executing an application in a display device including a touch screen is provided. The method includes displaying an execution window of an application in each of a plurality of regions of the touch screen, displaying a button on at least one boundary that separates the plurality of regions, displaying a list of at least one application execution icon in a partial area of the touch screen, receiving a drag input of dragging an application execution icon from the list, determining a region for executing a new application based on an end position of the drag input and a position of the button, and displaying an execution window of an application corresponding to the application execution icon in the determined region.

In accordance with another aspect of the present disclosure, a display device is provided. The display device includes a touch screen configured to display an execution window of an application in each of a plurality of regions, to display a button on at least one boundary that separates the plurality of regions, and to receive an input that selects the button, and a controller configured to display a list of at least one application executed in a specific region from among the plurality of regions in the specific region according to the received input.

In accordance with another aspect of the present disclosure, a display device is provided. The display device includes a touch screen configured to display an execution window of an application in each of a plurality of regions, to display a button on at least one boundary that separates the plurality of regions, to display a list of at least one application execution icon in a partial area of the touch screen, and to receive a drag input of dragging an application execution icon from the list, and a controller configured to determine a region for executing a new application based on an end position of the drag input and a position of the button, and to control the touch screen to display an execution window of an application corresponding to the application execution icon in the determined region.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 10A, 10B, 10C, and 10D illustrate screens of a display device according to embodiments of the present disclosure;

FIGS. 11A, 11B, and 11C illustrate screens of a display device according to embodiments of the present disclosure;

FIGS. 13A, 13B, and 13C illustrate screens of a display device according to embodiments of the present disclosure;

FIG. 22 illustrates an activity stack according to an embodiment of the present disclosure;

FIG. 24 illustrates an activity stack according to an embodiment of the present disclosure;

FIG. 28 illustrates an activity stack according to an embodiment of the present disclosure;

FIGS. 44A, 44B, 44C, 44D, 44E, 44F, 44G, 44H, 44I, 44J, 44K, 44L, 44M, 44N, 44O, 44P, 44Q, 44R, 44S, 44T, 44U, 44V, and 44W illustrate a method for executing a plurality of applications according to an embodiment of the present disclosure;

FIGS. 45A, 45B, 45C, 45D, 45E, 45F, 45G, 45H, 45I, and 45J illustrate activity stacks according to embodiments of the present disclosure;

Throughout the drawings, like reference numerals will be understood to refer to like parts, components, and structures.

DETAILED DESCRIPTION

Figure 1:
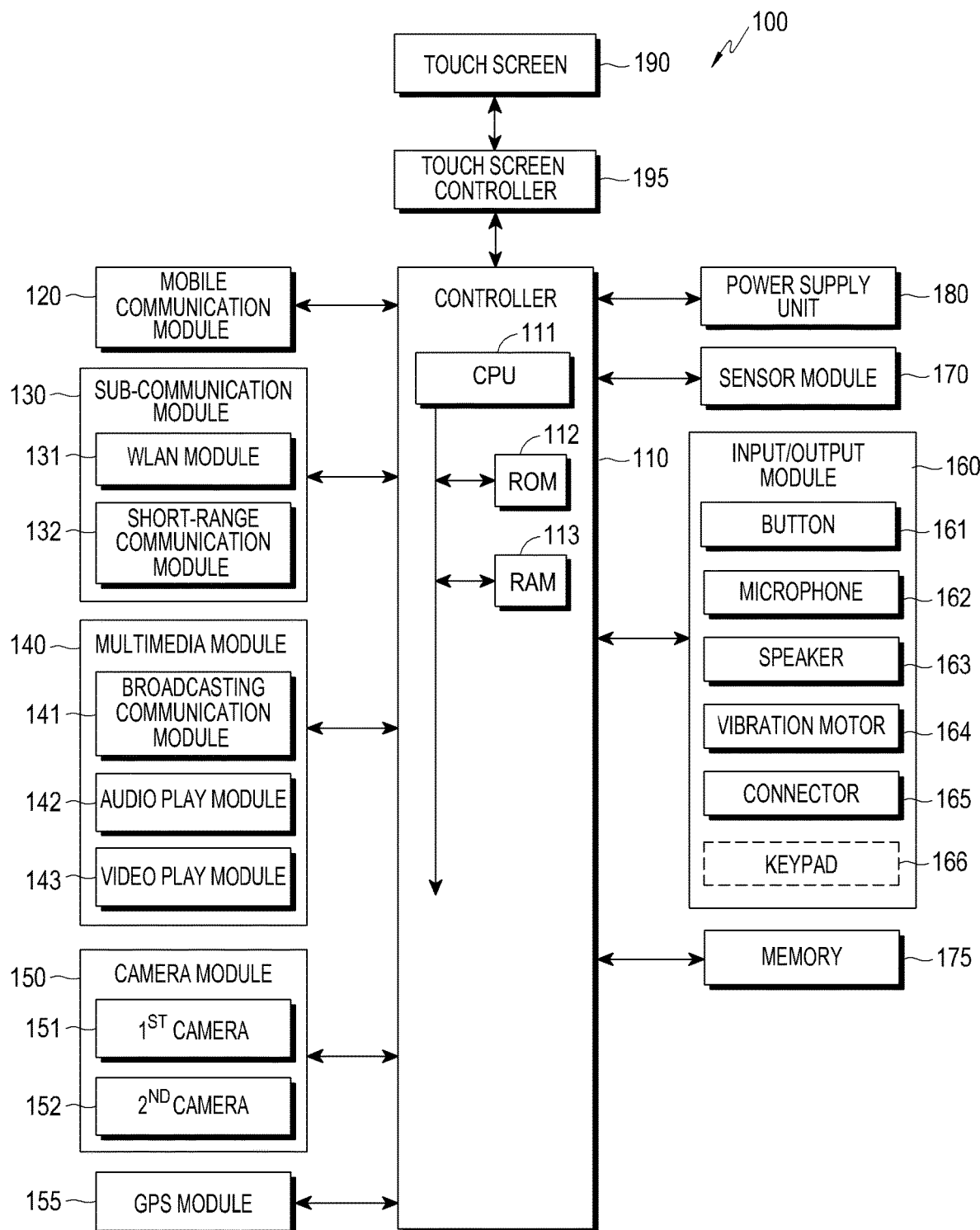
FIG. 1 is a block diagram of a display device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

While ordinal numbers, such as first, second, and the like, can be used to describe a number of components, these components are not limited by the terms. The terms are used to distinguish one component from other components. For example, a first component may be referred to as a second component or vice versa within the scope and spirit of the present disclosure. The term 'and/or' means inclusion of a combination of a plurality of described associated items or one of the items.

The technical terms used herein are provided to describe various embodiments, not intended to restrict the present disclosure. Herein, singular expressions include plural expressions unless otherwise clarified in the context. In this description, the term 'include' or 'have' is not interpreted as necessarily including all of the features, numbers, steps, operations, components, parts, or a combination thereof described in the specification. Rather, it should be understood that there are possibilities of omitting or adding one or more features, numbers, steps, operations, components, parts, or combinations thereof.

Unless otherwise defined, all the terms used herein including technical or scientific terms have the same meanings as terms generally understood by those skilled in the art. In addition, terms defined in a general dictionary should be understood so as to have the same meanings as contextual meanings of the related art. Unless definitely defined herein, the terms should not be interpreted as ideal or excessively formal meanings.

FIG. 1 is a block diagram of a display device according to an embodiment of the present disclosure.

Referring to FIG. 1, a display device 100 may be connected to an external device (not shown) through a mobile communication module 120, a sub-communication module 130, or a connector 165. The term 'external device' covers a variety of devices, such as another device (not shown), a portable phone (not shown), a smart phone (not shown), a tablet Personal Computer (PC) (not shown), a server (not shown), and the like.

The display device 100 includes a touch screen 190 and a touch screen controller 195. The display device 100 further includes a controller 110, the mobile communication module 120, the sub-communication module 130, a multimedia module 140, a camera module 150, a Global Positioning System (GPS) module 155, an Input/Output (I/O) module 160, a sensor module 170, a memory (storage) 175, and a power supply 180. The sub-communication module 130 includes at least one of a Wireless Local Area Network (WLAN) module 131 and a short-range communication module 132. The multimedia module 140 includes at least one of a broadcasting communication module 141, an audio play module 142, and a video play module 143. The camera module 150 includes at least one of a first camera 151 and a second camera 152, and the I/O module 160 includes at least one of buttons 161, a microphone 162, a speaker 163, a vibration motor 164, the connector 165, and a keypad 166.

The controller 110 may include a Central Processing Unit (CPU) 111, a Read Only Memory (ROM) 112 that stores a control program to control the display device 100, and a Random Access Memory (RAM) 113 that is use as a memory space for an operation performed by the display device 100. The CPU 111 may include one or more cores. The CPU 111, the ROM 112, and the RAM 113 may be connected to one another through an internal bus.

The controller 110 may control the mobile communication module 120, the sub-communication module 130, the multimedia module 140, the camera module 150, the GPS module 155, the I/O module 160, the sensor module 170, the memory 175, the power supply 180, the touch screen 190, and the touch screen controller 195.

The mobile communication module 120 connects the display device 100 to an external device through one or more antennas (not shown) by mobile communication under the control of the controller 110. The mobile communication module 120 transmits wireless signals to or receives wireless signals from a portable phone (not shown), a smart phone (not shown), a tablet PC (not shown), or another device (not shown) that has a phone number input to the display device 100, for a voice call, a video call, a Short Message Service (SMS), or a Multimedia Messaging Service (MMS).

The sub-communication module 130 may include at least one of the WLAN module 131 and the short-range communication module 132.

The WLAN module 131 may be connected to the Internet under the control of the controller 110 in a place where a wireless AP (not shown) is installed. The WLAN module 131 supports the WLAN standard, Institute of Electrical and Electronics Engineers (IEEE) 802.11x. The short-range communication module 132 may conduct short-range wireless communication between the display device 100 and an image forming device (not shown) under the control of the controller 110. The short-range communication may conform to Bluetooth, Infrared Data Association (IrDA), Zigbee, or the like.

The display device 100 may include at least one of the mobile communication module 120, the WLAN module 131, and the short-range communication module 132 according to its capabilities. For example, the display device 100 may include a combination of the mobile communication module 120, the WLAN module 131, and the short-range communication module 132 according to its capabilities.

The multimedia module 140 may include the broadcasting communication module 141, the audio play module 142, or the video play module 143. The broadcasting communication module 141 may receive a broadcast signal (e.g., a TV broadcast signal, a radio broadcast signal, or a data broadcast signal) and additional broadcasting information (e.g., an Electronic Program Guide (EPG) or an Electronic Service Guide (ESG)) from a broadcasting station through a broadcasting communication antenna (not shown) under the control of the controller 110. The audio play module 142 may open a stored or received digital audio file (e.g., a file having such an extension as mp3, wma, ogg, or wav) under the control of the controller 110. The video play module 143 may open a stored or received digital video file (for example, a file having an extension, such as mpeg, mpg, mp4, avi, mov, or mkv) under the control of the controller 110. The video play module 143 may also open a digital audio file.

The multimedia module 140 may include the audio play module 142 and the video play module 143 without the broadcasting communication module 141. Alternatively, the audio play module 142 or the video play module 143 of the multimedia module 140 may be incorporated into the controller 110.

The camera module 150 may include at least one of the first camera 151 and the second camera 152, to capture a still image or a video under the control of the controller 110. The first camera 151 or the second camera 152 may include an auxiliary light source (e.g., a flash (not shown)) to provide a light intensity used to capture an image. The first camera 151 may be disposed on the front surface of the display device 100, while the second camera 152 may be disposed on the rear surface of the device 100. Alternatively, the first camera 151 and the second camera 152 may be arranged near to each other (for example, the distance between the first camera 151 and the second camera 152 may be between 1 cm and 8 cm) in order to capture a three-dimensional still image or video.

The GPS module 155 may receive signal waves from a plurality of GPS satellites (not shown) in Earth orbit and calculate a position of the display device 100 based on the Time of Arrivals (ToAs) of satellite signals from the GPS satellites to the display device 100.

The I/O module 160 may include at least one of the plurality of buttons 161, the microphone 162, the speaker 163, the vibration motor 164, the connector 165, and the keypad 166.

The buttons 161 may be formed on the front surface, a side surface, or the rear surface of a housing of the display device 100, and may include at least one of a power/lock button (not shown), a volume button (not shown), a menu button, a home button, a back button, and a search button.

The microphone 162 receives a voice or a sound and converts the received voice or sound to an electrical signal under the control of the controller 110.

The speaker 163 may output sounds corresponding to various signals (e.g., a wireless signal, a broadcast signal, a digital audio file, a digital video file, a photo shot, and the like) received from the mobile communication module 120, the sub-communication module 130, the multimedia module 140, and the camera module 150 to the outside of the display device 100. The speaker 163 may output sounds corresponding to functions (e.g., a button manipulation sound, a ringback tone for a call, and the like) performed by the display device 100. One or more speakers 163 may be disposed at an appropriate position or positions of the housing of the display device 100.

The vibration motor 164 may convert an electrical signal to a mechanical vibration under the control of the controller 110. For example, when the display device 100 receives an incoming voice call from another mobile device (not shown) in a vibration mode, the vibration motor 164 operates. One or more vibration motors 164 may be mounted inside the housing of the display device 100. The vibration motor 164 may operate in response to a user's touch on the touch screen 190 and a continuous movement of the touch on the touch screen 190.

The connector 165 may be used as an interface that connects the display device 100 to an external device (not shown) or a power source (not shown). The connector 165 may transmit data stored in the memory 175 to the external device via a cable connected to the connector 165 or may receive data from the external device via the cable, under the control of the controller 110. The display device 100 may receive power or charge a battery (not shown) from the power source via the cable connected to the connector 165.

The keypad 166 may receive a key input from the user to control the display device 100. The keypad 166 includes a physical keypad (not shown) formed in the display device 100 or a virtual keypad (not shown) displayed on the display 190. The physical keypad may not be provided according to the capabilities or configuration of the display device 100.

The sensor module 170 includes at least one sensor (not shown) to detect a state of the display device 100. For example, the sensor module 170 may include a proximity sensor that detects whether the user is close to the display device 100, an illuminance sensor that detects the amount of ambient light around the display device 100, or a motion sensor that detects a motion of the display device 100 (e.g., a rotation, an acceleration, a vibration, or the like). At least one sensor may detect a state of the display device 100, generate a signal corresponding to the detected state, and transmit the generated signal to the controller 110. A sensor may be added to or removed from the sensor module 170 according to the capabilities of the display device 100.

The memory 175 may store input/output signals or data in accordance with operations of the mobile communication module 120, the sub-communication module 130, the multimedia module 140, the camera module 150, the GPS module 155, the I/O module 160, the sensor module 170, and the touch screen 190 under the control of the controller 110. The memory 175 may store a control program to control the display device 100 or the controller 110, and applications.

The term "memory" covers the memory 175, the ROM 112 and the RAM 113 within the controller 110, or a memory card (not shown) (e.g., a Secure Digital (SD) card or a memory stick) mounted to the display device 100. The memory may include a non-volatile memory, a volatile memory, a Hard Disk Drive (HDD), or a Solid State Drive (SSD).

The power supply 180 may supply power to one or more batteries (not shown) mounted in the housing of the display device 100 under the control of the controller 110. The one or more batteries supply power to the display device 100. Further, the power supply 180 may supply power received from an external power source (not shown) via the cable connected to the connector 165 to the display device 100.

The touch screen 190 may provide User Interfaces (UIs) corresponding to various services (e.g., a call, data transmission, broadcasting, photography, and the like) to the user. The touch screen 190 may transmit an analog signal corresponding to at least one touch on a UI to the touch screen controller 195. The touch screen 190 may receive at least one touch input through a user's body part (e.g., a finger) or a touch input means (e.g., a stylus pen). The touch screen 190 may also receive a touch input signal corresponding to a continuous movement of a touch among one or more touches. The touch screen 190 may transmit an analog signal corresponding to the continuous movement of the input touch to the touch screen controller 195.

As used in this description, 'touch' may include a non-contact touch (i.e., a detectable gap between the touch screen 190 and a user's part or a touch input means is 1 mm or less), and need not be limited to contacts between the touch screen 190 and the user's body part or the touch input tool. A gap detectable to the touch screen 190 may vary according to the capabilities or configuration of the display device 100.

The touch screen 190 may be implemented, for example, as a resistive type, a capacitive type, an infrared type, or an acoustic wave type.

The touch screen controller 195 converts an analog signal received from the touch screen 190 to a digital signal (e.g., X and Y coordinates). The controller 110 may control the touch screen 190 using the digital signal received from the touch screen controller 195. For example, the controller 110 may control selection or execution of a shortcut icon (not shown) displayed on the touch screen 190 in response to a touch. The touch screen controller 195 may be incorporated into the controller 110.

FIGS. 2A, 2B, 2C, 2D, 2E, 2F, 2G, 2H, 2I, 2J, and 2K illustrate a window execution method according to an embodiment of the present disclosure. It will be readily understood to those skilled in the art that a display device 200 may be any of the display device 100 illustrated in FIG. 1, a standard TV, an Internet TV, a medical data display device, and the like. Therefore, as far as it is equipped with a means to display a rendered image, any device may be used as a display device.

Figure 2A:
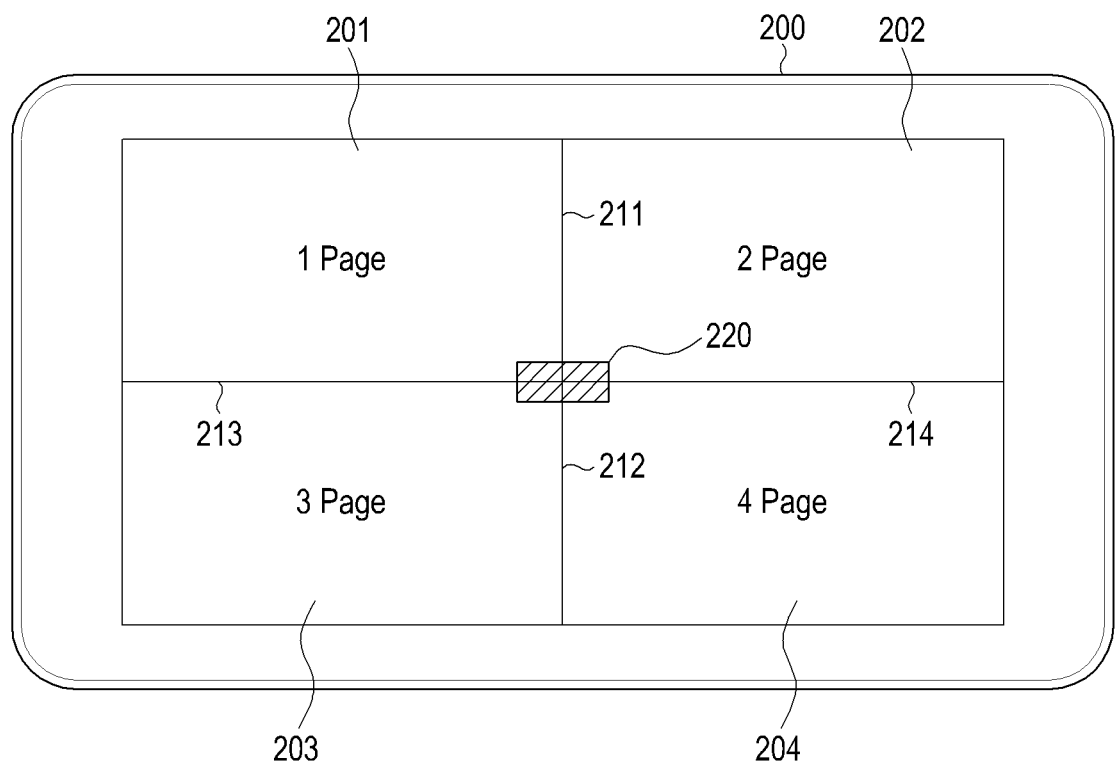
FIGS. 2A, 2B, 2C, 2D, 2E, 2F, 2G, 2H, 2I, 2J, and 2K illustrate a window execution method according to an embodiment of the present disclosure.

Referring to FIG. 2A, the display device 200 may define a plurality of window display areas 201, 202, 203, and 204 on a touch screen. For example, a controller (not shown) may configure a first window display area 201, a second window display area 202, a third window display area 203, and a fourth window display area 204. The controller may set a first boundary 211 between the first and second window display areas 201 and 202, a second boundary 212 between the third and fourth window display areas 203 and 204, a third boundary 213 between the first and third window display areas 201 and 203, and a fourth boundary 214 between the second and fourth window display areas 202 and 204. The first and second boundary lines 211 and 212 may be connected into a single line, and the third and fourth boundary lines 213 and 214 may be connected into a single line. The controller configures the first to fourth window display areas 201, 202, 203, and 204 such that they are not overlapped with one another. Referring to FIG. 2A, for example, the controller defines the first window display area 201 in an upper left-hand corner, the second window display area 202 in an upper right-hand corner, the third window display area 203 in a lower left-hand corner, and the fourth window display area 204 in a lower right-hand corner. The controller divides the screen into left and right halves by the first and second boundary lines 211 and 212 and divides the screen into upper and lower halves by the third and fourth boundary lines 213 and 214.

The controller displays a center button 220 at an intersection where the first and second boundary lines 211 and 212 cross the third and fourth boundary lines 213 and 214. The center button 220 may be a function key that changes the size of an application display area or transitions the display device 200 to a window relocation mode.

The controller controls display of a window in each of the window display areas 201, 202, 203, and 204, to execute an application in the window. For example, the controller controls display of a window in each of the window display areas 201, 202, 203, and 204 as illustrated in FIGS. 2B, 2C, 2D, 2E, 2F, 2G, 2H, 2I, 2J, and 2K.

A window may cover an execution screen of a specific application and a title of the executed application. Objects related to the application may be displayed on the execution screen of the application. The objects may take various forms, such as text, a figure, an icon, a button, a check box, a photo, a video, a Web page, a map, and the like. When a user touches an object, a function or event corresponding to the touched object may be executed in the application. An object may be called a view according to an Operating System (OS). The title bar may include at least one control key that controls display of a window. For example, the at least one control key may include a window minimize button, a window maximize button, and a window close button.

Applications are programs written independently by a manufacturer of the display device 200 or application developers. Accordingly, execution of one application does not need preliminary execution of another application. Even when one application ends, another application may be continuously executed.

As compared to a composite function application (or a dual application) designed by adding some functions (e.g., a memo function, a message transmission/reception function, and the like) available from other applications to one application (e.g., a video application), an application is independently configured. The composite function application is a single application configured to include various functions, unlike existing applications. Accordingly, the composite function application provides only limited functions like the existing applications and a user should purchase such a new composite function application additionally.

Figure 2B:
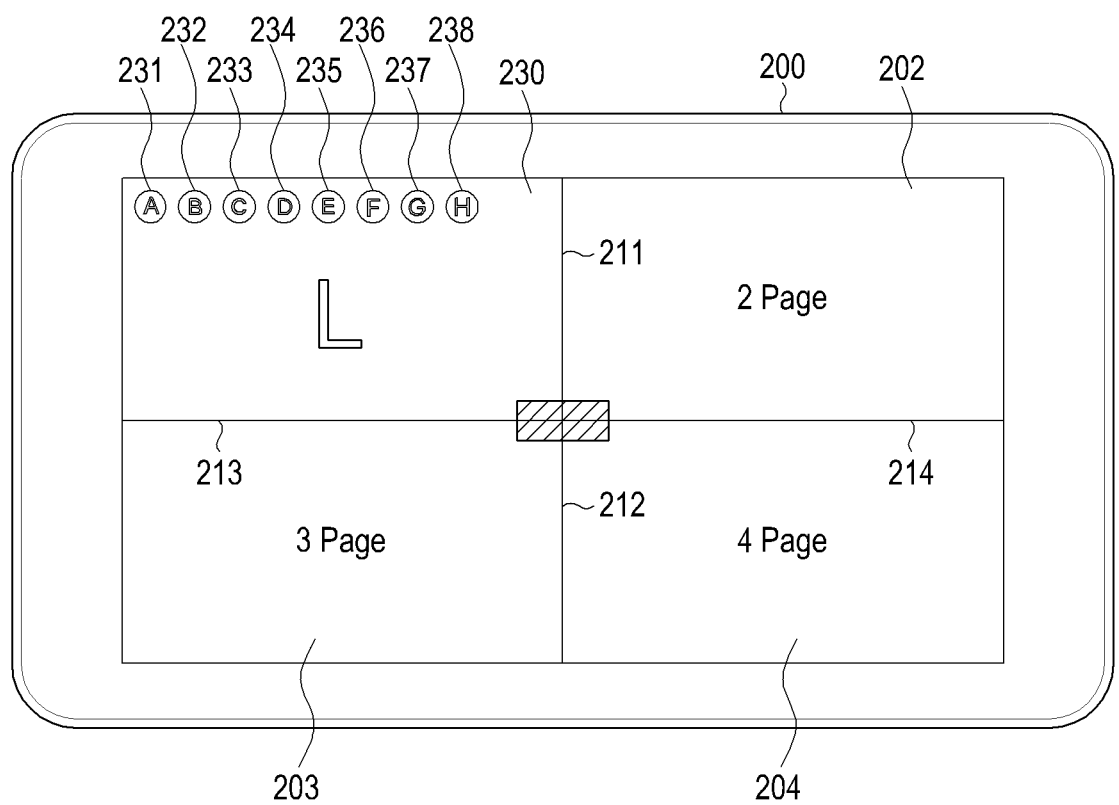

Referring to FIG. 2B, the controller controls display of a first window 230 to execute a launcher application, application L in the first window display area 201. The launcher application, application L displays available application icons 231, 232, 233, 234, 235, 236, 237, and 238 as illustrated in FIG. 2B. Upon receipt of an application execution command through a touch on one of the application icons 231, 232, 233, 234, 235, 236, 237, and 238, the launcher application, application L displays an application corresponding to the touched icon in one of the first to fourth display areas 201, 202, 203, and 204.

FIGS. 3A, 3B, 3C, 3D, 3E, 3F, 3G, 3H, and 3I illustrate activity stacks managed in a display device according to embodiments of the present disclosure.

Figure 3A:
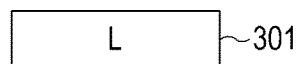
FIGS. 3A, 3B, 3C, 3D, 3E, 3F, 3G, 3H, and 3I illustrate activity stacks managed in a display device according to embodiments of the present disclosure.

Referring to FIG. 3A, the controller generates and manages a launcher application stack 301 in an activity stack in response to execution of the launcher application.

Figure 2C:
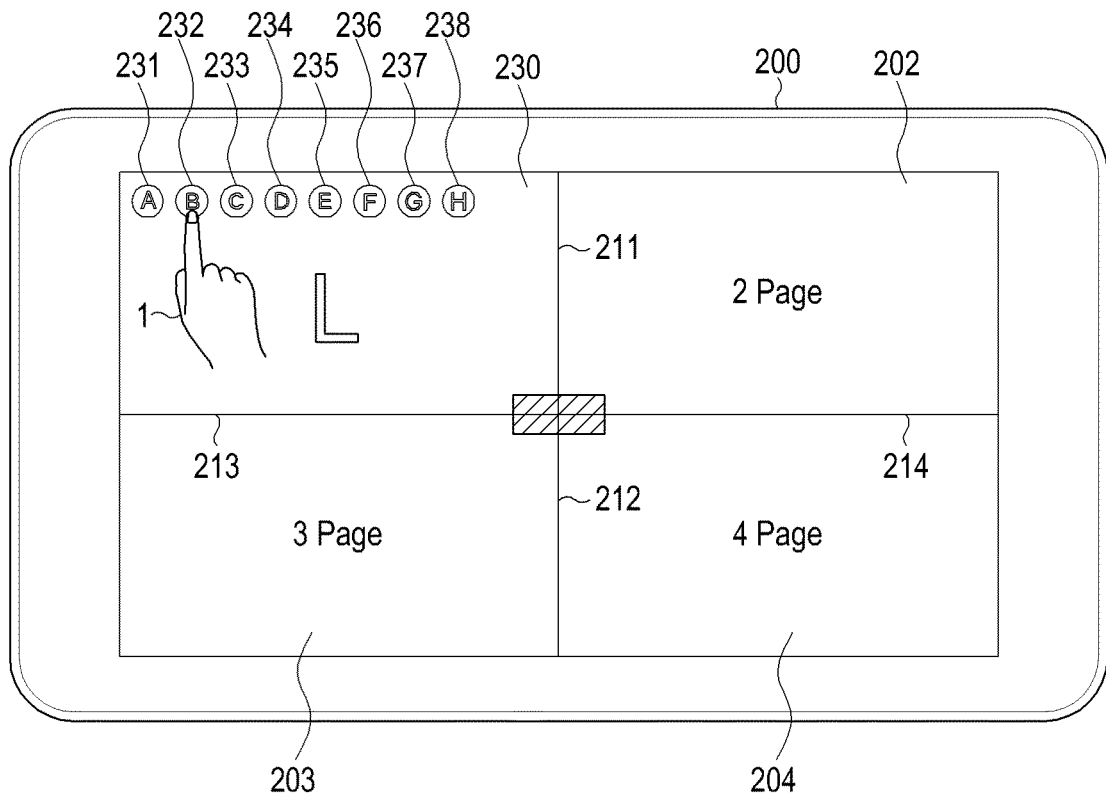
Figure 2D:
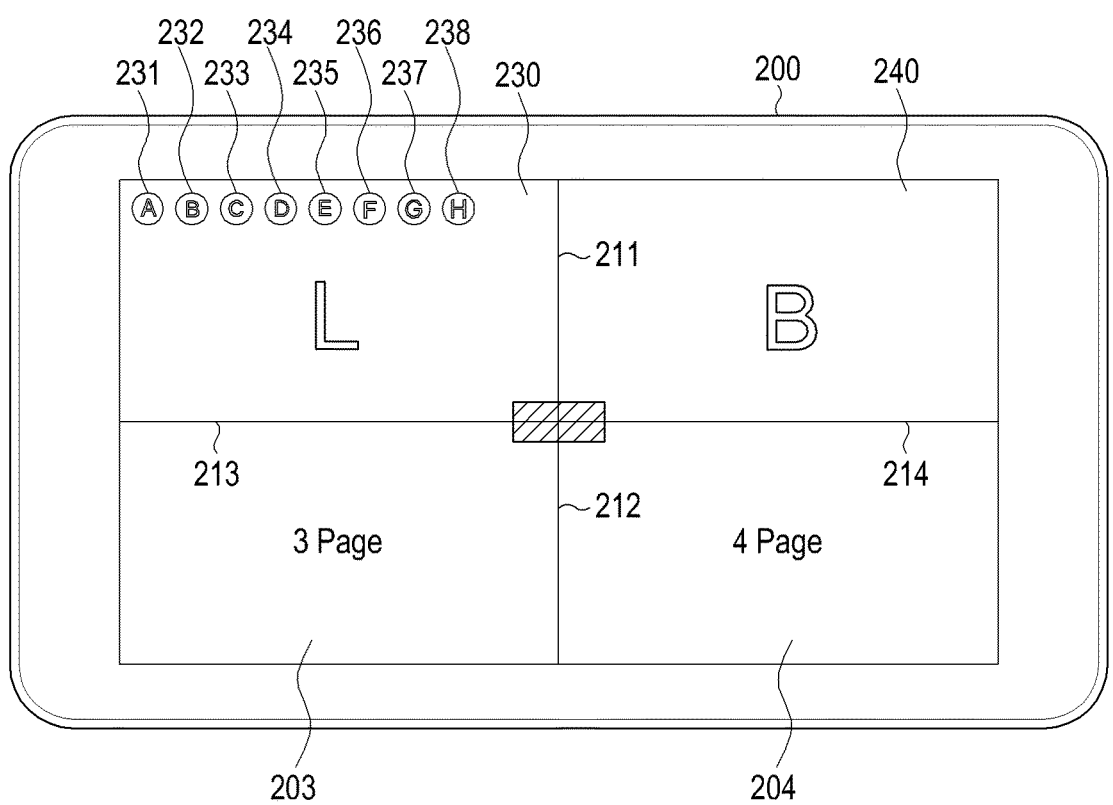

Referring to FIGS. 2C and 2D, a user 1 may touch an icon 232 representing application B. When the icon 232 representing application B is touched, the controller controls display of a second window 240 in the second window display area 202, in which application B is executed. The controller may display windows in the first to fourth window display areas 201, 202, 203, and 204 in order. For example, the controller may control display of new windows in a clockwise order of the second, third, and fourth window display areas 202, 203 and 204. The clockwise window display order is one example of controlling display of new windows and thus, the controller may control display of new windows in a counterclockwise order. The order of displaying new windows in the window display areas 201, 202, 203, and 204 may be changed.

Figure 3B:
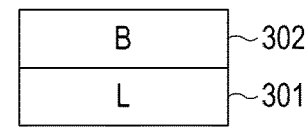

FIG. 3B illustrates an activity stack corresponding to the windows displayed in FIG. 2D. The controller generates an application B stack 302 in the activity stack in response to execution of application B. The controller places the latest executed application B stack 302 on the launcher application stack 301. This may imply that the Z-order (which may also be described as an order, rank, or priority) of application B is higher than the Z-order of the launcher application, application L.

Figure 2E:
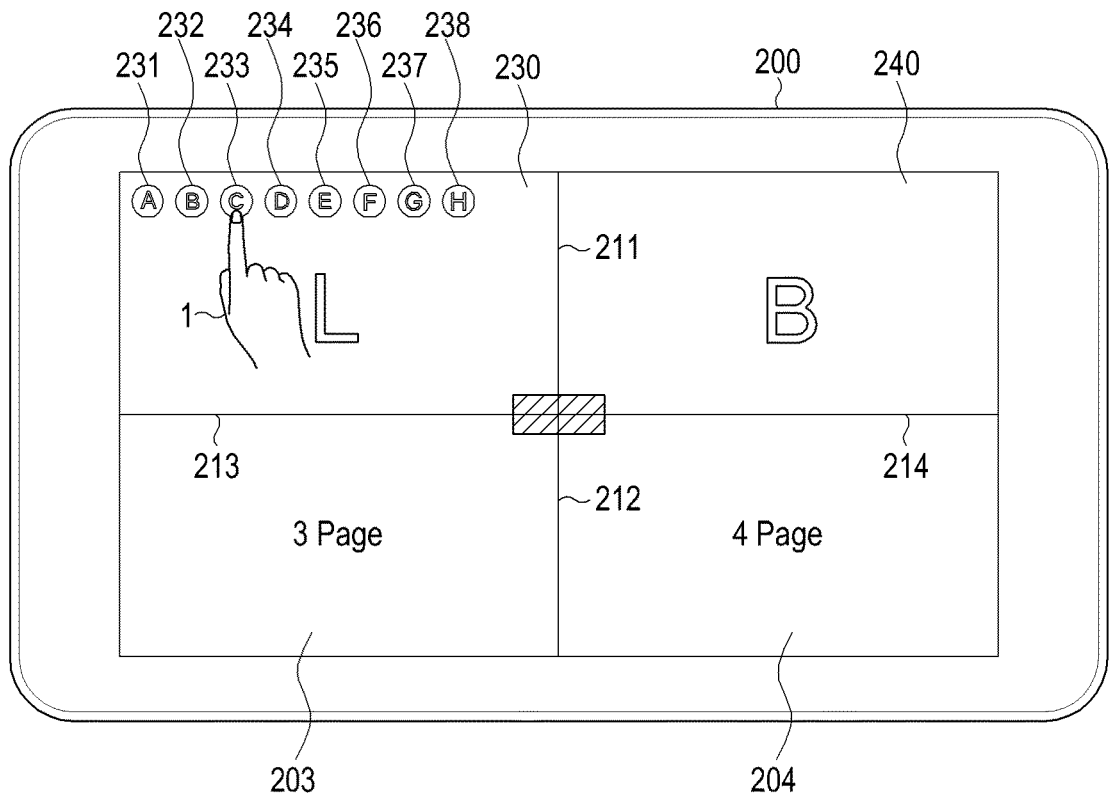

Referring to FIG. 2E, the user 1 may touch an icon 233 corresponding to application C.

Figure 3C:
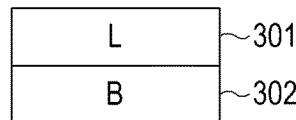

FIG. 3C illustrates an activity stack corresponding to the windows illustrated in FIG. 2E. Since the user 1 inputs an application execution command to the launcher application, application L, as illustrated in FIG. 2E, it is noted from FIG. 3C that the Z-order of the launcher application, application L is higher than the Z-order of application B.

Figure 2F:
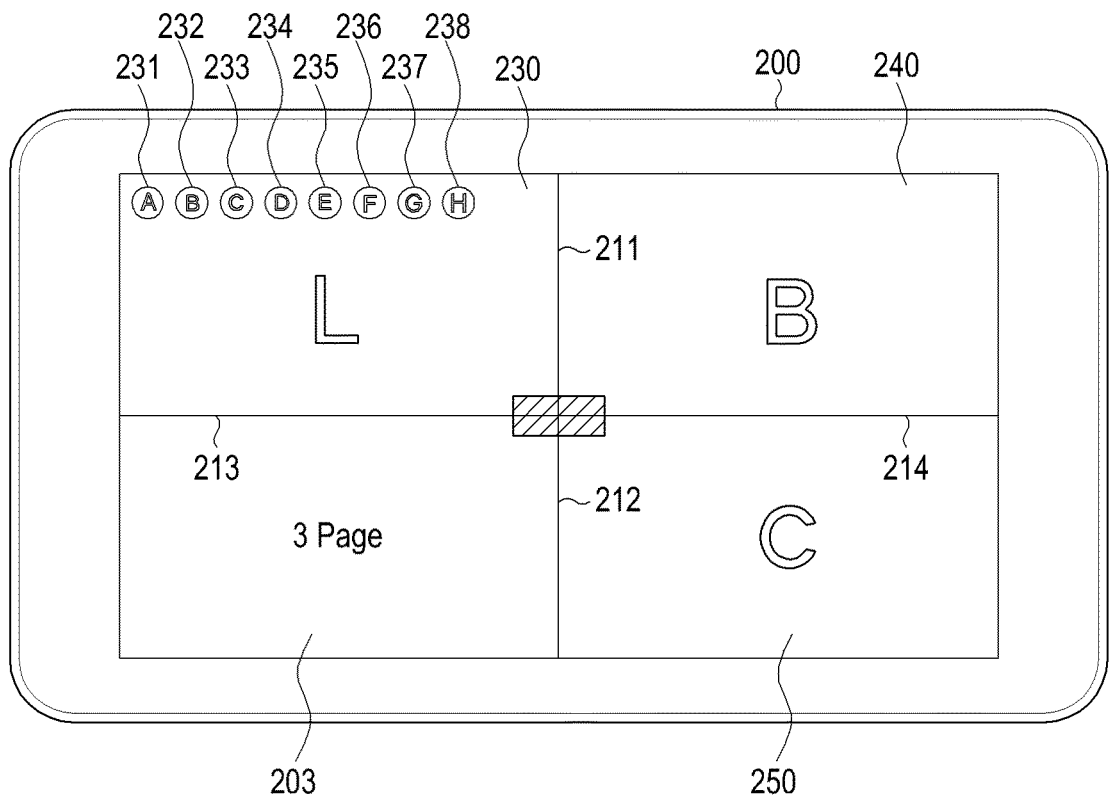

Referring to FIG. 2F, when the icon 233 representing application C is touched, the controller controls display of a third window 250 in the fourth window display area 204, in which application C is executed.

Figure 3D:
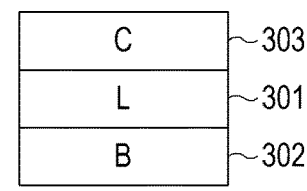

FIG. 3D illustrates an activity stack corresponding to the windows illustrated in FIG. 2F. The controller generates an application C stack 303 in the activity stack in response to execution of application C. The controller places the latest executed application C stack 303 on the launcher application stack 301. This may imply that the Z-order of application C is higher than the Z-order of the launcher application, application L.

Figure 2G:
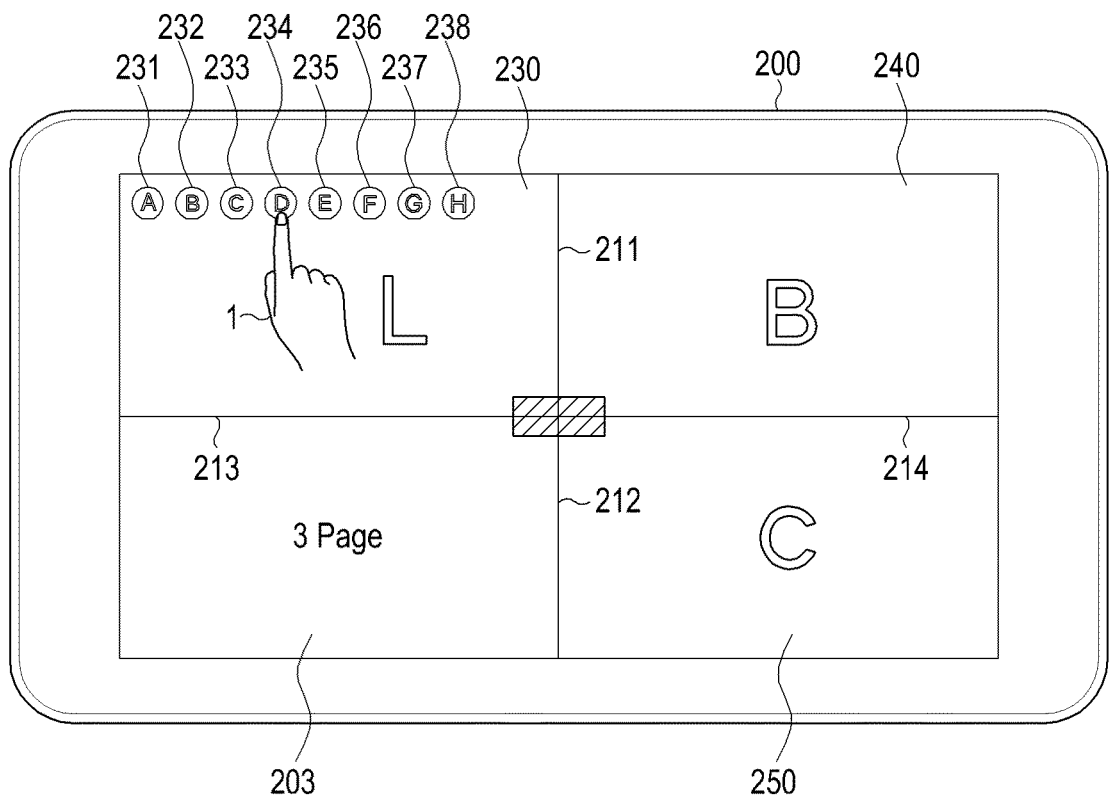

Referring to FIG. 2G, the user 1 may touch an icon 234 representing application D.

Figure 3E:
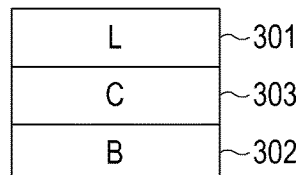

FIG. 3E illustrates an activity stack corresponding to the windows illustrated in FIG. 2G. Since the user inputs an application execution command to the launcher application, application L as illustrated in FIG. 2G, it is noted from FIG. 3E that the Z-order of the launcher application, application L is higher than the Z-order of application C.

Figure 2H:
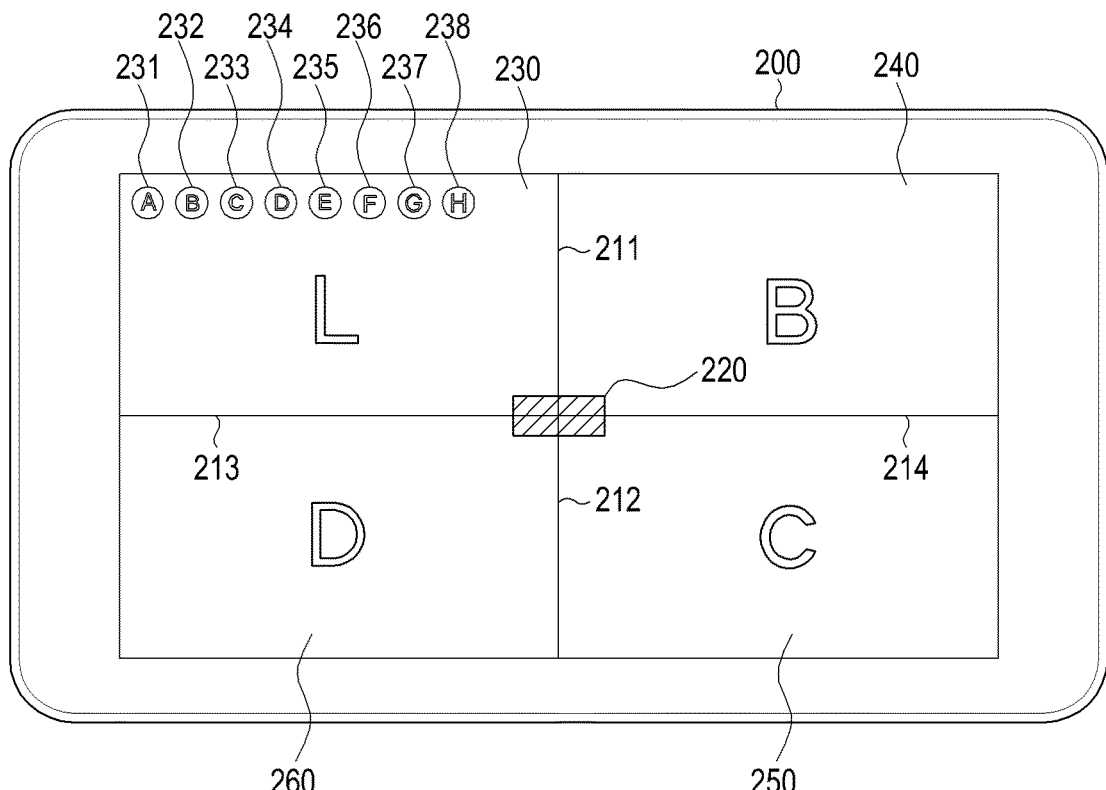

Referring to FIG. 2H, when the icon 234 representing application D is touched, the controller controls display of a fourth window 260 in the third window display area 203, in which application D is executed.

Figure 3F:
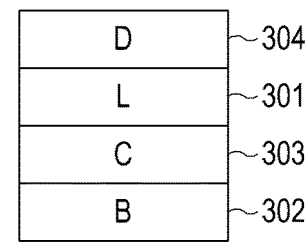

FIG. 3F illustrates an activity stack corresponding to the windows illustrated in FIG. 2H. The controller generates an application D stack 304 in the activity stack in response to execution of application D. The controller places the latest executed application D stack 304 on the launcher application stack 301. This may imply that the Z-order of application D is higher than the Z-order of the launcher application, application L.

Figure 2I:
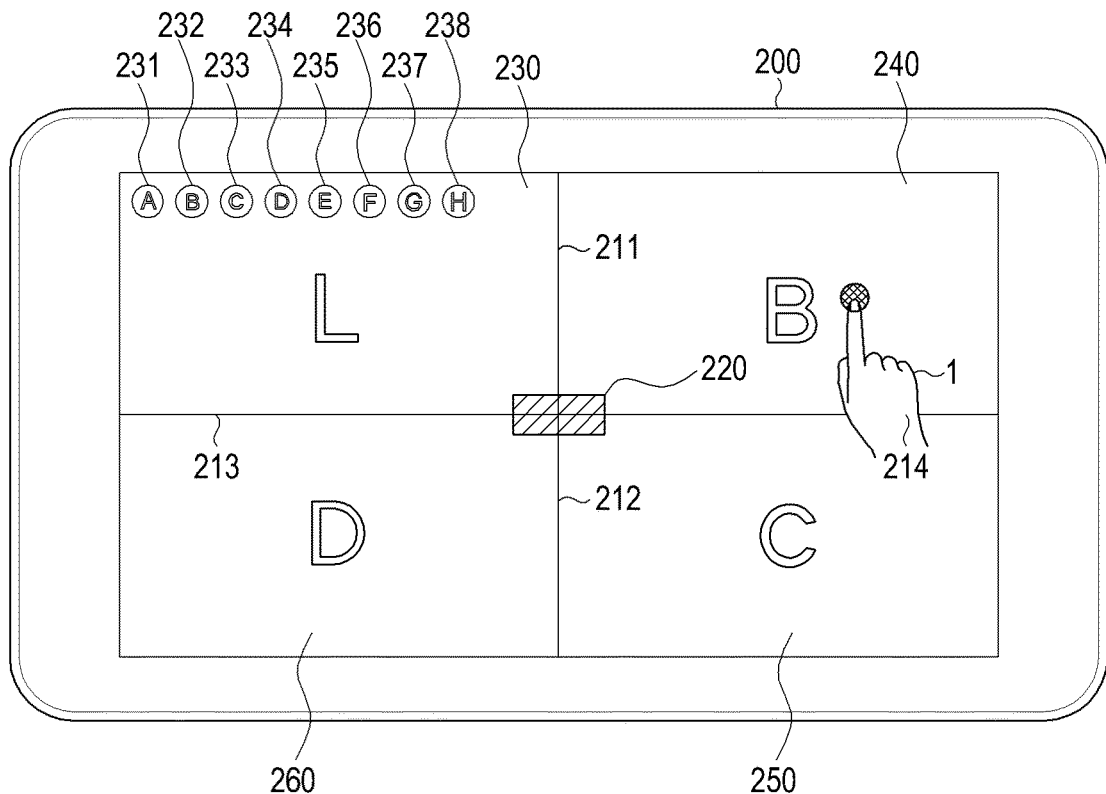

Referring to FIG. 2I, the user 1 may manipulate application B.

Figure 3G:
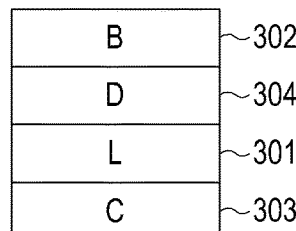

FIG. 3G illustrates an activity stack corresponding to the windows illustrated in FIG. 2I. The controller places the application B stack 302 on top of the activity stack in response to a user input to application B.

Figure 2J:
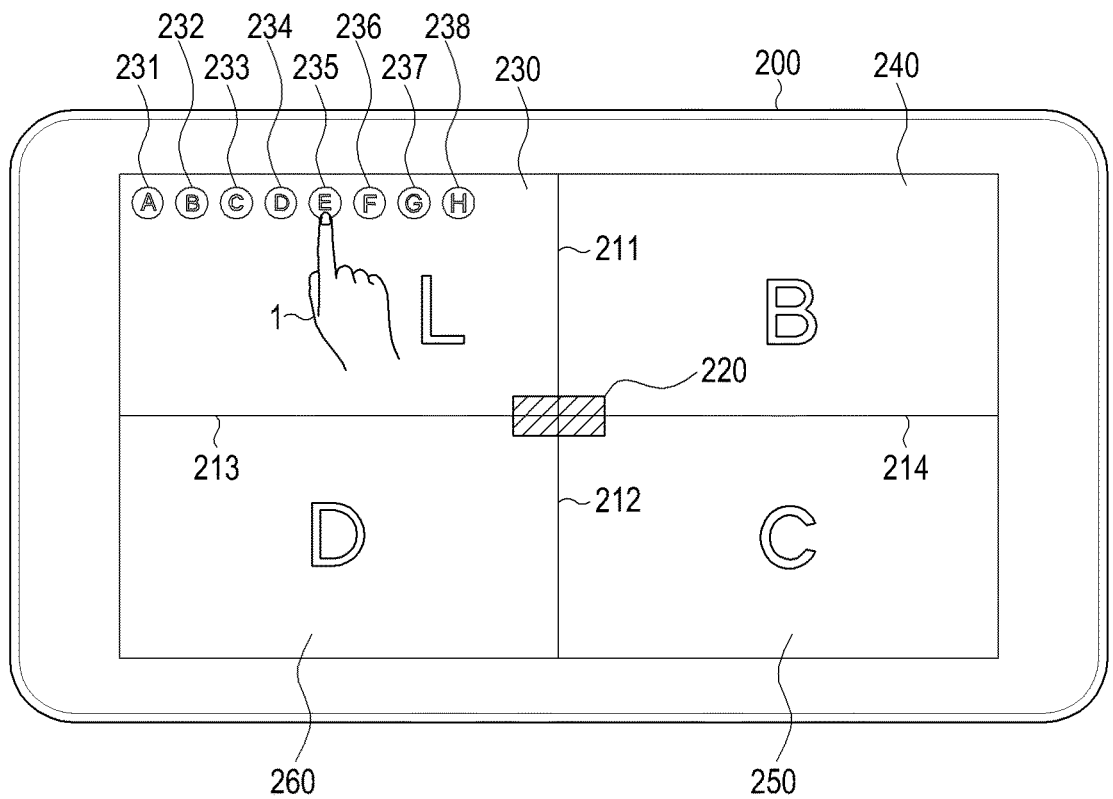

Referring to FIG. 2J, the user 1 may touch an icon 235 representing application E.

Figure 3H:
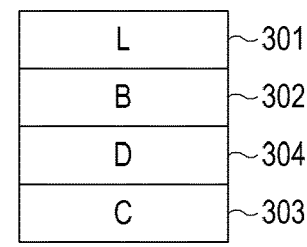

FIG. 3H illustrates an activity stack corresponding to FIG. 2J. Since the user 1 inputs an application execution command to the launcher application, application L as illustrated in FIG. 2J, it is noted from FIG. 3H that the Z-order of the launcher application, application L is higher than the Z-order of application D.

Figure 2K:
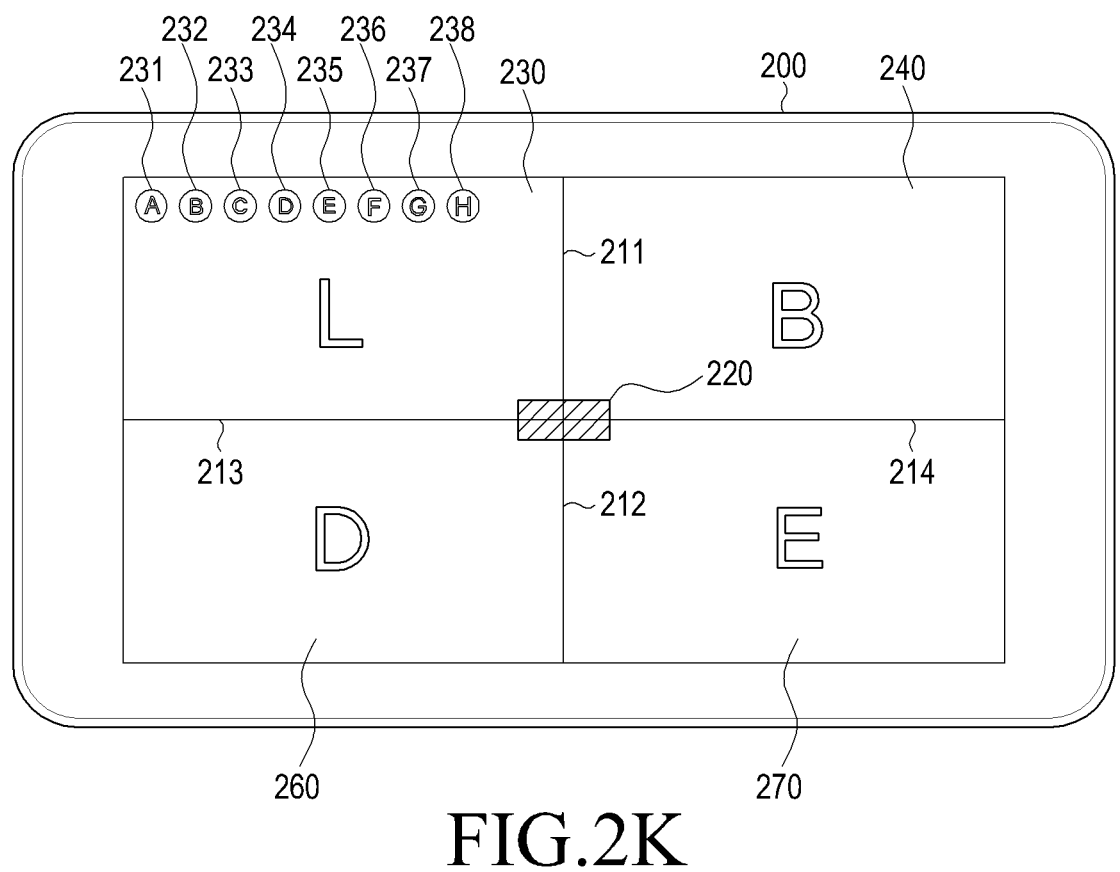

Referring to FIG. 2K, when the icon 235 representing application E is touched, the controller controls display of a fifth window 270 in the fourth window display area 204, in which application E is executed. In the absence of an empty window display area, the controller may refer to the activity stack illustrated in FIG. 3H. The controller may determine the application having the lowest Z-order in the activity stack. For example, the controller may determine that the Z-order of application C is lowest in the activity stack of FIG. 3H. The controller controls display of the fifth window 270 that executes application E, substituting for application C having the lowest Z-order, in the fourth window display area 204.

Figure 3I:
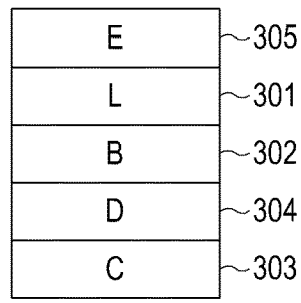

FIG. 3I illustrates an activity stack corresponding to the windows illustrated in FIG. 2K. The controller generates an application E stack 305 in the activity stack in response to execution of application E. The controller places the latest executed application E stack 305 on the launcher application stack 301. This may imply that the Z-order of application E is higher than the Z-order of the launcher application, application L.

Figure 4A:
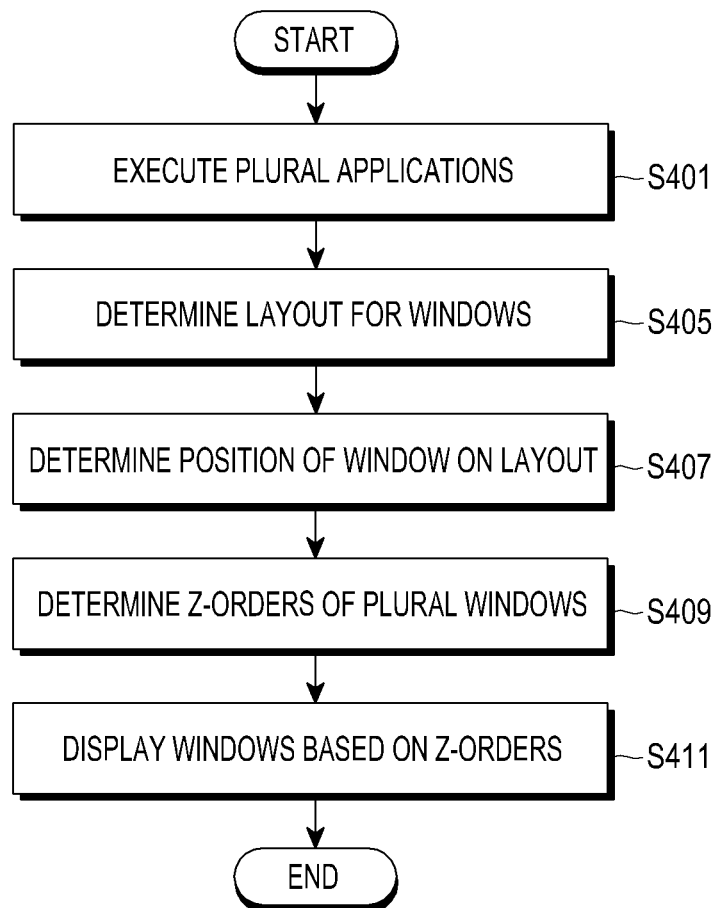
FIG. 4A is a flowchart illustrating a method for controlling a display device according to an embodiment of the present disclosure.

FIG. 4A is a flowchart illustrating a method for controlling a display device according to an embodiment of the present disclosure.

Referring to FIG. 4A, the display device may execute a plurality of applications in operation S401. For example, the display device may execute an application in response to an application execution command triggered by a user touch on an icon representing the application. The display device, particularly a window manager of the display device, may generate a window in which the application is executed.

The display device may determine a layout to dispose the window. The layout defines window display areas in which windows may be arranged. For example, two modes are available for the layout, i.e., a split mode and a freestyle mode.

In the split mode, a screen is divided in such a manner that a plurality of windows are displayed without overlap. For example, if the display device displays first and second windows, the display may divide a screen, such as a touch screen, in a set layout and define the divided screen parts as window display areas. The display device may display a window in each window display area. Since each window display area is a screen segment, the display device may display a plurality of windows without overlap.

The display device may allocate a plurality of windows to one window display area in the split mode. For example, the display device may allocate the first and second windows to the first window display area. In this case, the display device may compare the Z-orders (orders, rankings, positions in a stack) of the first and second windows. If the Z-order of the first window is higher than the Z-order of the second window, the display device may display the first window in the first window display area. In this case, although the display device manages the second window as disposed in the first window display area, the display device does not display the second window in the first window display area.

On the other hand, a plurality of windows may be displayed overlapped according to their display priority levels in the freestyle mode. For example, if the display area of the first window is overlapped with the display area of the second window, the display device may compare the Z-orders of the first and second windows. The Z-order of a window may refer to the display ordering of the window. For example, if the Z-order of the first window is higher than the Z-order of the second window, the display device may control display of the first window in the overlapped part, instead of the second window.

In the split mode, various layouts are available, such as a 2-top/down area split layout, a 2-left/right area split layout, a 3-area split layout, a 4-area split layout, and the like. The display device may determine whether the layout of windows is in the split mode or the freestyle mode in operation S405. If the layout is in the split mode, the display device may further determine whether the layout is the 2-top/down area split layout, the 2-left/right area split layout, the 3-area split layout, or the 4-area split layout.

Once the mode of the layout is determined in operation S405, the display device may determine a window position in the layout in operation S407. In the case of the 2-top/down area layout, the display device may determine to arrange the first and third windows in an upper window display area and the second window in a lower window display area. Alternatively, in the freestyle mode, the display device may determine a coordinates area for the first window and a coordinates area for the second window.

The display device may determine the Z-orders of a plurality of applications in operation S409 and may display a plurality of windows based on the Z-orders of the applications in operation S411. For example, in the case of the 2-top/down area split mode, the display device may compare the Z-orders of the first and third windows. In addition, the display device may control display of a window having a relatively high Z-order in a corresponding window display area. In the freestyle mode, the display device may compare the Z-orders of the first and second windows and may control display of a window having a relatively high Z-order in an overlapped area.

Figure 4B:
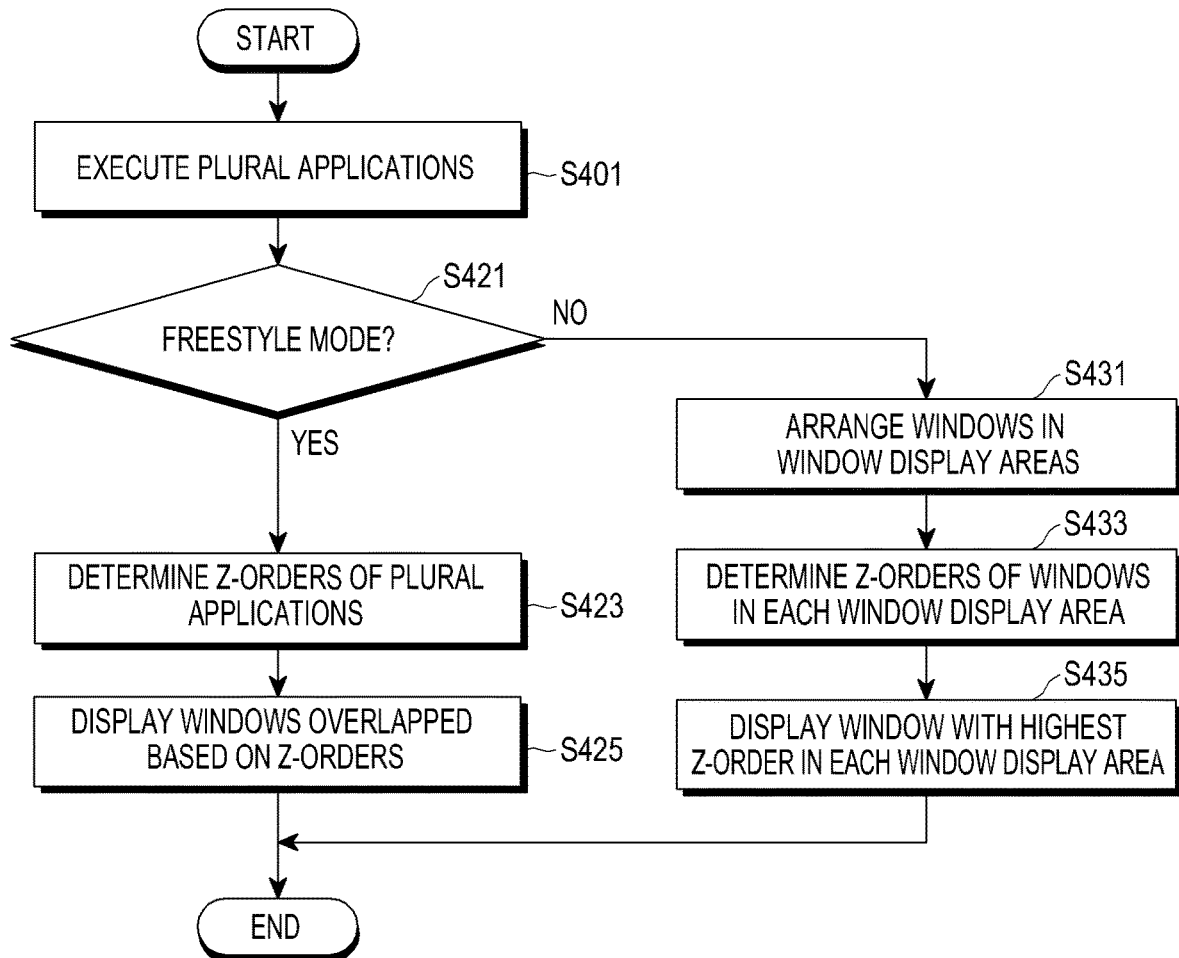
FIG. 4B is a flowchart illustrating a method for controlling a display device according to an embodiment of the present disclosure.

FIG. 4B is a flowchart illustrating a method for controlling a display device according to an embodiment of the present disclosure.

Referring to FIG. 4B, the display device may execute a plurality of applications in operation S401. An application execution command may be triggered by, for example, a drag gesture of dragging an icon representing an application to a point where a window is to be displayed for the application. The drag gesture input is one example of an application execution command and thus, applications may be executed in various manners. Those skilled in the art will readily understand that the present disclosure is not limited to a specific application execution method.

The display device may determine whether a current layout is in the freestyle mode in operation S421. In the case of the freestyle-mode layout, the display device may determine the Z-order of each of windows in which the plurality of applications are executed in operation S423. The display device may display the windows overlapped according to the Z-orders of the windows in operation S425.

In the case of the split-mode layout in operation S421, the display device may dispose windows in window display areas in operation S431. In addition, the display device may determine the Z-order of windows in each window display area in operation S433. For example, the display device may determine the Z-orders of the windows as illustrated in Table 1.

TABLE 1

| Window | Window display area (page) | Z-order |
|---|---|---|
| A | 1 | 1 |
| B | 2 | 5 |
| C | 3 | 6 |
| D | 2 | 2 |
| E | 1 | 3 |
| F | 4 | 4 |

As described above, the display device may control display of window A having a relatively high Z-order, not window E, in a first window display area. The display device may control display of window D having a relatively high Z-order, not window B, in a second window display area. In addition, the display device may display window C in a third window display area and window F in a fourth window display area. For example, the display device may display a window having a highest Z-order in each window display area, from among the windows allocated to the window display area in operation S435.

Figure 5:
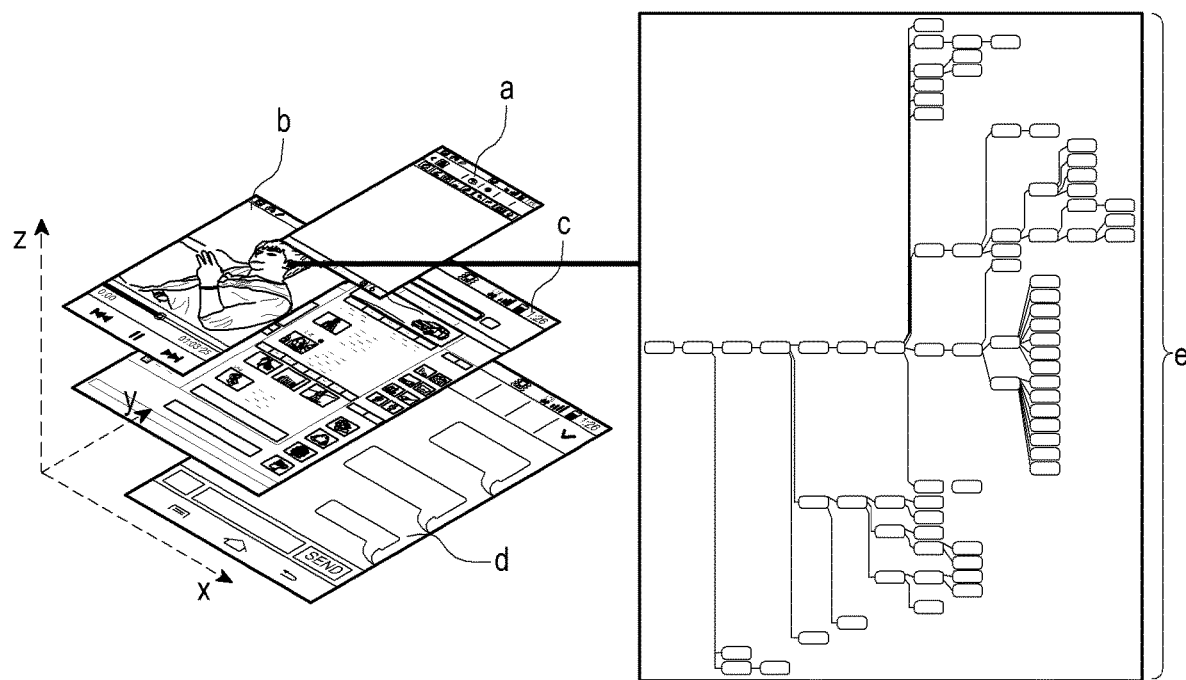
FIG. 5 illustrates a display ordering of windows (Z-order) according to an embodiment of the present disclosure.

FIG. 5 illustrates a display ordering of windows (Z-order) according to an embodiment of the present disclosure.

Referring to FIG. 5, the Z-order of a screen may be divided into N layers and an $N^{th}$ layer may be an upper layer placed on an (N−1)th layer. A window may exist in each layer and an application may be executed in the window. For example, upon execution of a first application, the first application is executed in a window of a first layer. Upon execution of a second application, the second application is executed in a window of a second layer, and upon execution of a third application, the third application is executed in a window of a third layer. Thus, the first, second, and third layers are created hierarchically. The last created layer may be on top of the layer stack and thus, may be displayed in the top layer of the screen. For example, a plurality of windows (a) to (d) may be displayed overlapped on a main screen. For example, the first window (a) is displayed overlapped over the second, third and fourth windows (b), (c) and (d), the second window (b) is displayed overlapped over the third and fourth windows (c) and (d), and the third window (c) is displayed overlapped over the fourth window (d). For example, when the plurality of windows (a) to (d) are displayed overlapped, the ordering of displaying the windows (a) to (d) is the Z-orders of the windows (a) to (d). The Z-order may be the order of displaying windows along the Z axis. A layer viewer (e) may be a screen that displays the Z-orders of windows hierarchically. A Z-order may be referred to as a display order.

FIGS. 6A, 6B, 6C, and 6D illustrate an application execution method according to an embodiment of the present disclosure. More particularly, FIGS. 6A, 6B, 6C, and 6D illustrate a method for executing applications in a freestyle-mode layout.

Referring to FIGS. 6A, 6B, 6C, and 6D, a display device 600 displays a window display area 620. The display device 600 displays a tray 610 containing available application icons 611, 612, 613, 614, 615, 616, and 617 to the left of the window display area 620. A user 10 may manipulate the display device 600 to execute a first application A1. For example, the user 10 may make a drag gesture 625 of dragging an icon 611 representing the first application A1 to a first point in the window display area 620 in FIG. 6B. The display device 600 may display a first window 630 at the first point in the window display area 620 in response to the drag gesture 625 to execute the first application A1 in the first window 630. The first window 630 may be displayed in a default size and shape or in a size and shape set by the user 10 before termination.

Figure 6A:
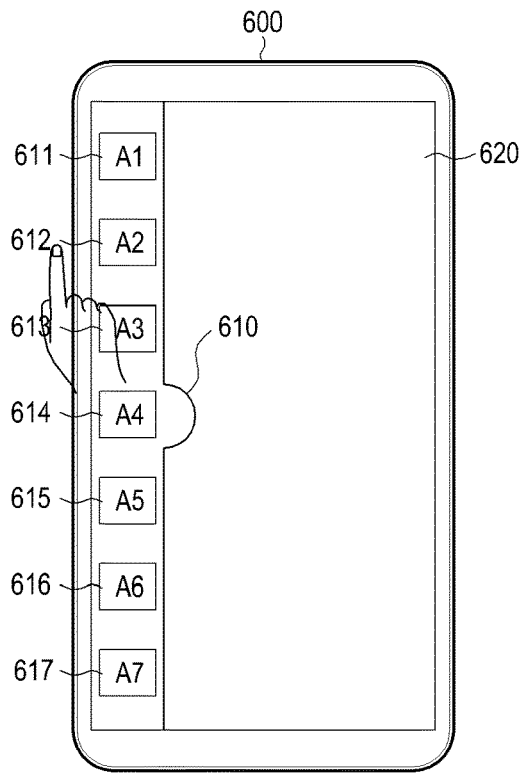
FIGS. 6A, 6B, 6C, and 6D illustrate an application execution method according to an embodiment of the present disclosure.
Figure 6B:
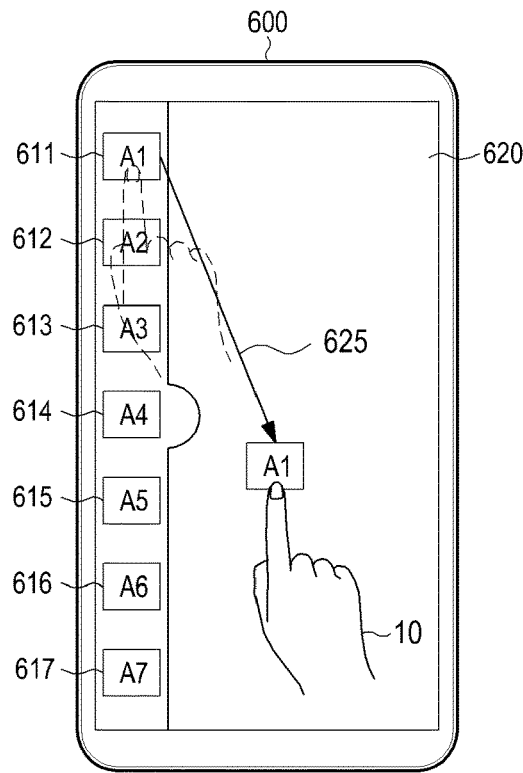
Figure 6C:
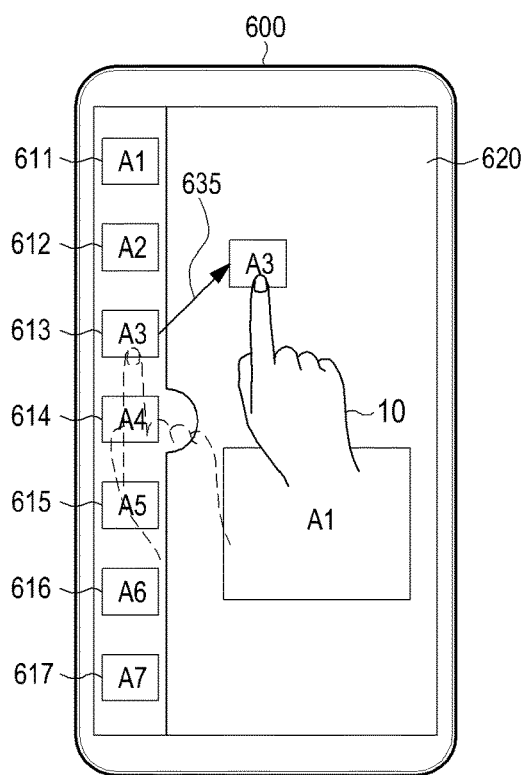
Figure 6D:
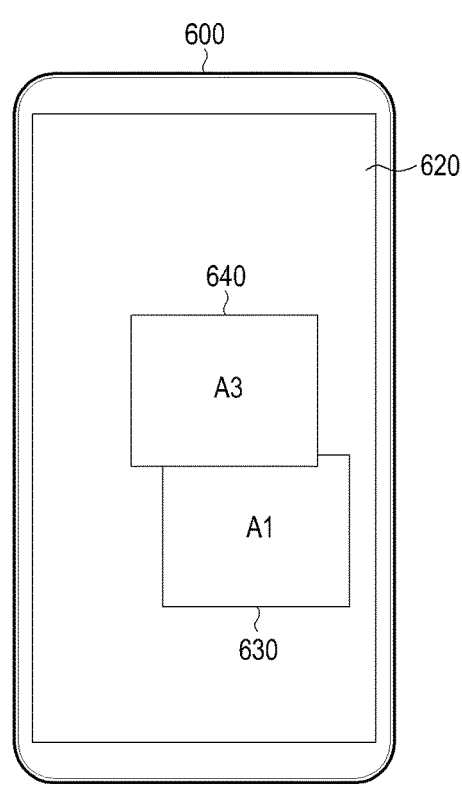

The user 10 may manipulate the display device 600 to additionally execute a third application A3. For example, the user 10 may make a drag gesture 635 of dragging an icon 613 representing the third application A3 to a second point in the window display area 620 as illustrated in FIG. 6C. The display device 600 may display a third window 640 at the second point in the window display area 620 in response to the input execution command, that is, the drag gesture 635 to execute the third application A3 in the third window 640. The third window 640 may be displayed in a default size and shape or in a size and shape set by the user 10 before termination. Because the third window 640 is the latest window for which the user 10 has applied a gesture input, a controller (not shown) may assign a higher task priority level to the third application A3 than the first application A1. Accordingly, the controller may control display of the third application A3 over the first application A1.

Figure 7:
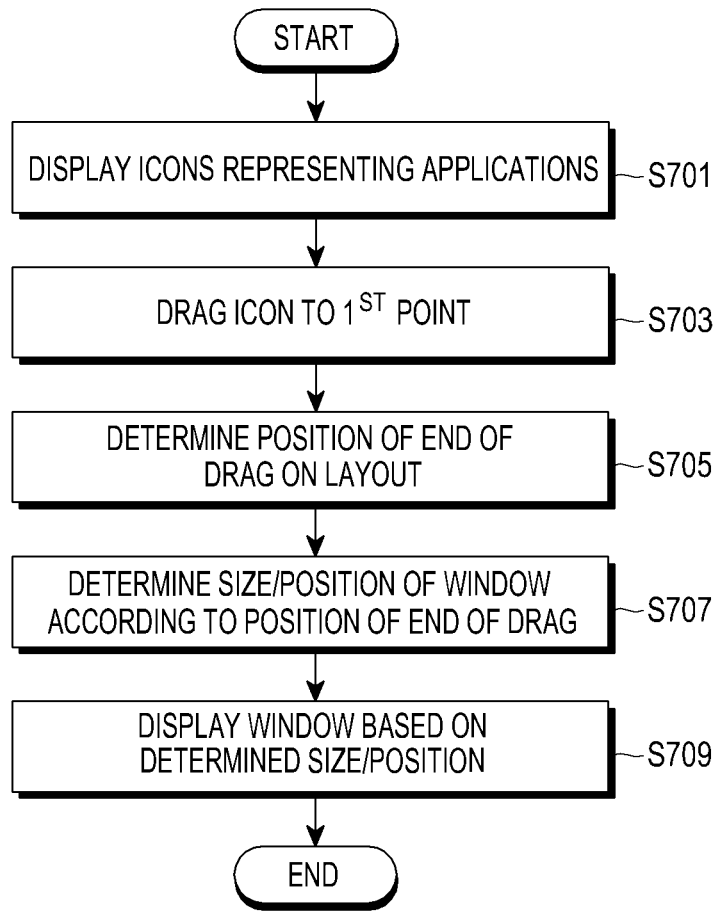
FIG. 7 is a flowchart illustrating a method for controlling a display device according to an embodiment of the present disclosure.

FIG. 7 is a flowchart illustrating a method for controlling a display device according to an embodiment of the present disclosure.

Referring to FIG. 7, the display device may display at least one icon representing an application in operation S701. For example, the display device may display a tray containing at least one icon in a part of a touch screen.

When a user drags an icon to a first point at which a window is to be disposed, the display device may receive the drag gesture input in operation S703. The display device may recognize the drag gesture from the icon to the first point as a command to execute an application corresponding to the icon. More particularly, the display device may determine the position of the first point at which the drag gesture has ended, on a layout in operation S705. For example, if the split mode has been set for the layout, the display device may determine a window area to which the first point corresponds on the layout.

The display device may determine at least one of the size and position of the window according to the position of the first point on the layout in operation S707. The display device may display the window according to the determined size and/or position in operation S709.

FIGS. 8A, 8B, 8C, 8D, 8E, 8F, 8G, 8H, 8I, 8J, 8K, 8L, and 8M illustrate a method for displaying a plurality of windows according to an embodiment of the present disclosure.

Referring to FIGS. 8A, 8B, 8C, 8D, 8E, 8F, 8G, 8H, 8I, 8J, 8K, 8L, and 8M, a display device 800 displays a menu screen 817. The menu screen 817 may be an execution screen of a launcher program and may include icons representing applications. In addition, the menu screen 817 may include information about a current time and may further include widgets. The display device 800 displays a tray 810 containing available icons 811, 812, 813, 814, 815, and 816 to the left of a touch screen.

Figure 8A:
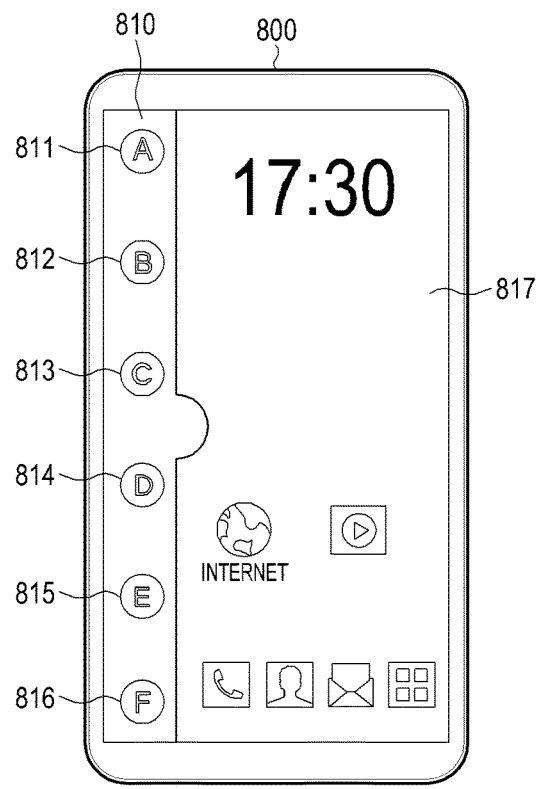
FIGS. 8A, 8B, 8C, 8D, 8E, 8F, 8G, 8H, 8I, 8J, 8K, 8L, and 8M illustrate a method for displaying a plurality of windows according to an embodiment of the present disclosure.
Figure 8B:
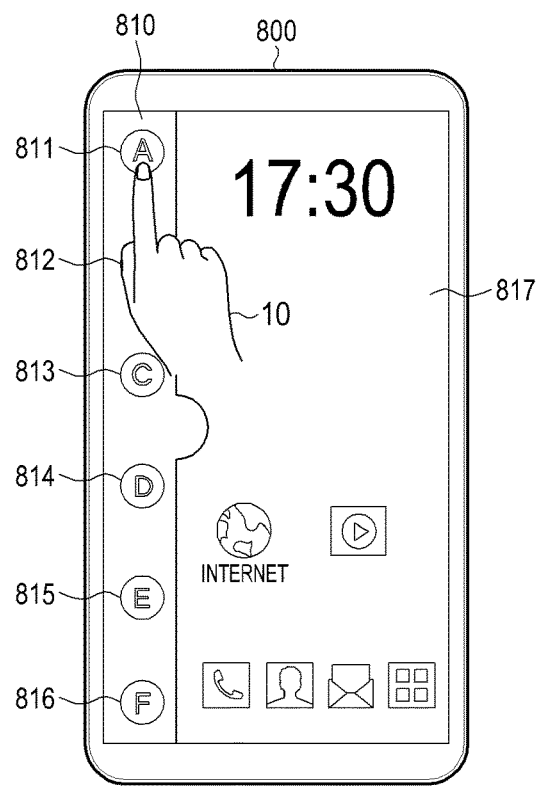
Figure 8C:
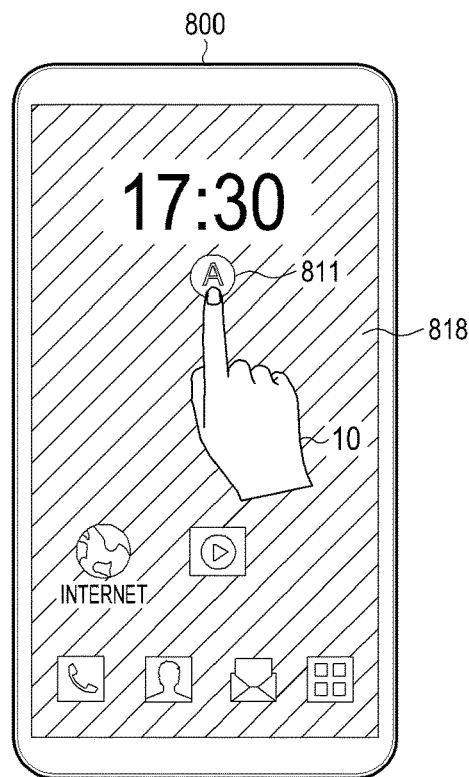

The user 10 may manipulate the display device 800 to execute a first application A as illustrated in FIG. 8B. For example, the user 10 may touch the icon 811 representing the first application A and drag the touched icon 811 to the menu screen 817 as illustrated in FIG. 8C. A controller (not shown) may control display of the icon 811 at the dragged point. The controller may further control display of a ghost view 818 at the dragged point. The ghost view 818 refers to a preview of the size and shape of a window in which the first application A will be executed so that the user 10 may select a window position. Because no window has been displayed, the controller may display the ghost view 818 in full screen. As described below, the controller may control display of a full-screen ghost view in the absence of any window already displayed on the touch screen. If a single window is already displayed on the touch screen, the controller may display the ghost view in a size and shape corresponding to a half of the touch screen. If two windows are already displayed on the touch screen, the controller may display the ghost view in a size and shape corresponding to a half of one of the two windows on the touch screen. If three windows are already displayed on the touch screen, the controller may display the ghost view in a size and shape corresponding to a half of the largest of the three windows.

Figure 8D:
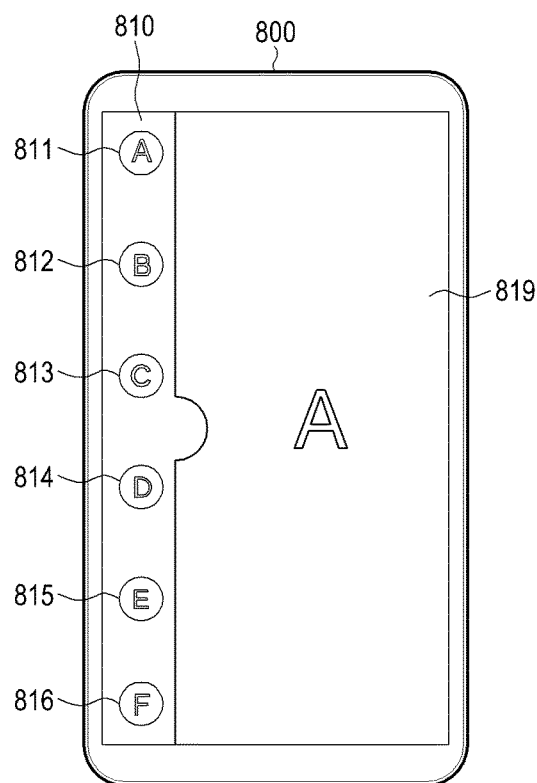

The controller may recognize the foregoing drag gesture as a command to execute a new application. The controller may generate a first window 819 to execute the first application A. The controller may control display of the first window 819 in full screen as illustrated in FIG. 8D.

Figure 8E:
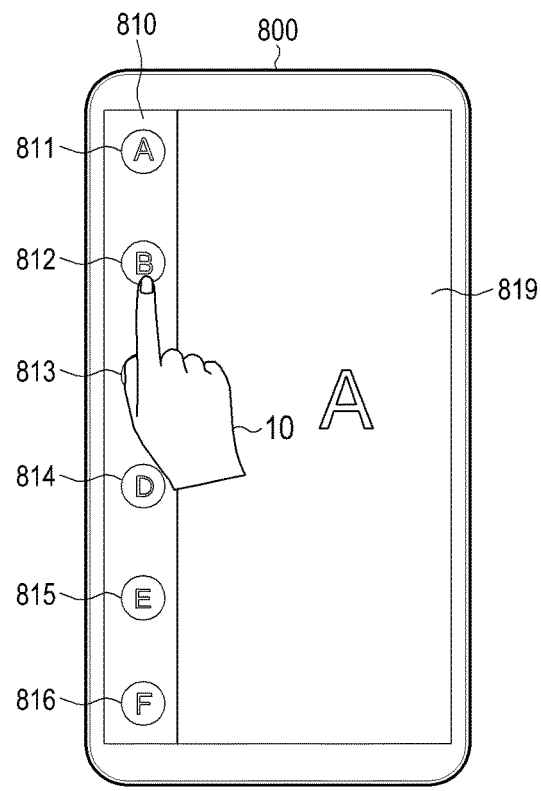
Figure 8F:
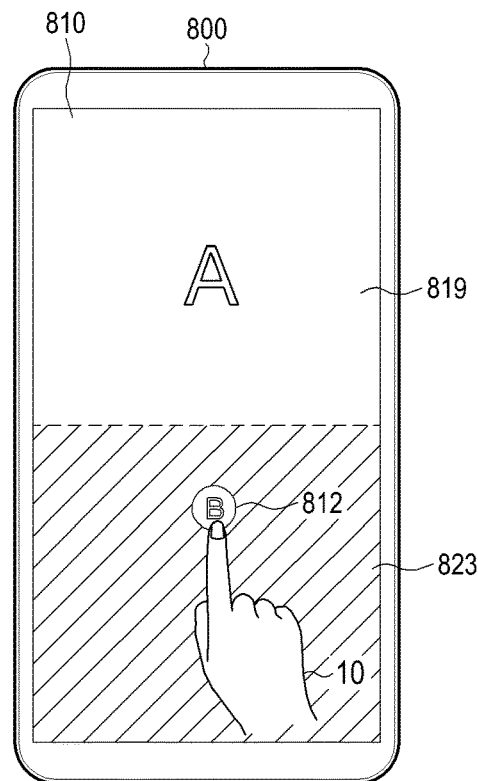

The user 10 may manipulate the display device 800 to additionally execute a second application B. For example, the user may touch the icon 812 representing the second application B as illustrated in FIG. 8E and drag the touched icon 812 to a lower part of the first window 819 as illustrated in FIG. 8F. The controller may control display of the icon 812 at the dragged point. In addition, the controller may control display of a ghost view 823 at the dragged point. As described before, since the single window 819 is already displayed on the touch screen, the controller may control display of the ghost view 823 in a size and shape corresponding to a half of the touch screen. While not shown, if the user 10 drags the touched icon 812 to an upper part of the touch screen, the controller controls display of the ghost view 823 in an upper half of the touch screen. Displaying the ghost view in a lower half of the touch screen is merely one example of displaying the ghost view and thus, the controller may divide the touch screen into left and right halves and may control display of the ghost view in one of the left and right halves of the touch screen.

Figure 8G:
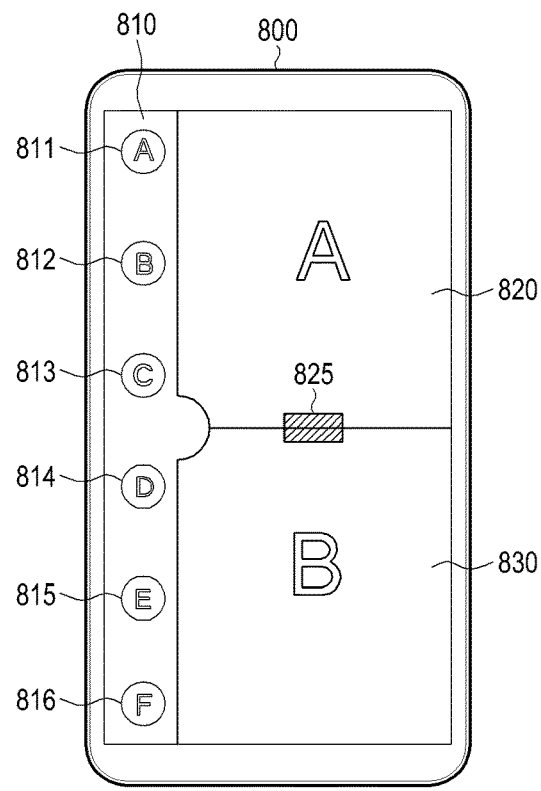

If the user ends the drag in a lower part of the touch screen as illustrated in FIG. 8F, the controller determines that a new application execution command has been received. As illustrated in FIG. 8G, the controller controls display of a second window 830 in the lower half of the touch screen in correspondence with the ghost view 823 illustrated in FIG. 8F. Further, the controller shrinks down the first window 819 in size and shape to a first window 820 so that the first window 820 may be displayed in the upper half of the touch screen. The controller generates and displays a center button 825 at the boundary between the first and second windows 820 and 830.

Figure 8H:
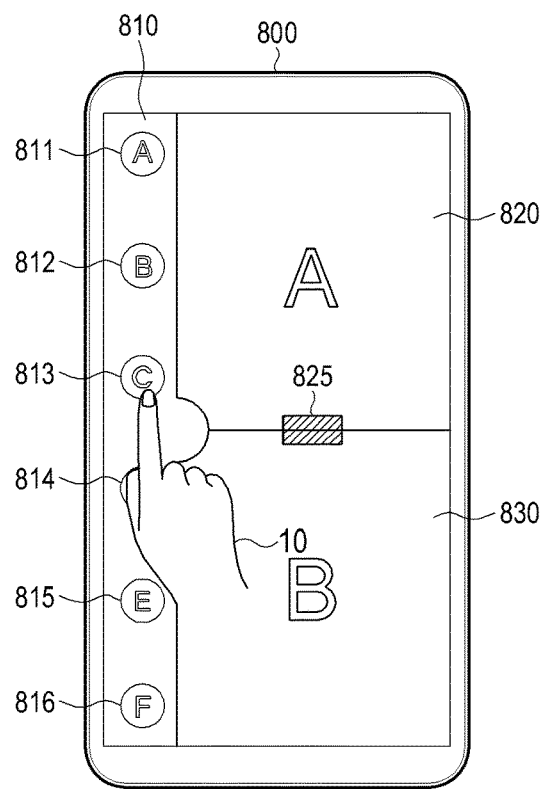
Figure 8I:
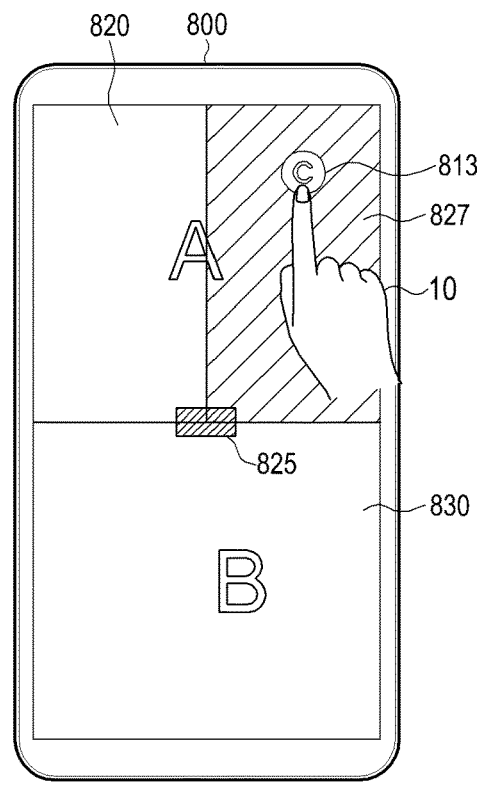

The user 10 may manipulate the display device 800 to additionally execute a third application C. For example, the user may touch the icon 813 representing the third application C as illustrated in FIG. 8H and drag the touched icon 813 to a right part of the first window 820 as illustrated in FIG. 8I. The controller controls display of the icon 813 at the dragged point. In addition, the controller may control display of a ghost view 827 at the dragged point. As described before, since the two windows 820 and 830 are already displayed on the touch screen, the controller may control display of the ghost view 827 in a size and shape corresponding to a half of the first window 820. While not shown, if the user 10 drags the touched icon 813 to a left part of the first window 820, the controller controls display of the ghost view 827 in a left half of the first screen 820. Displaying the ghost view 827 in the right half of the first window 820 is merely one example of displaying the ghost view and thus, the controller may divide the first window 820 into upper and lower halves and may control display of the ghost view 827 in one of the upper and lower halves of the first screen 820. Displaying the ghost view 827 in a half of the first window 820 is another example of displaying the ghost view. The controller may determine the size and shape of the ghost view 827 with respect to the center button 825 and display the ghost view 827 accordingly.

Figure 8J:
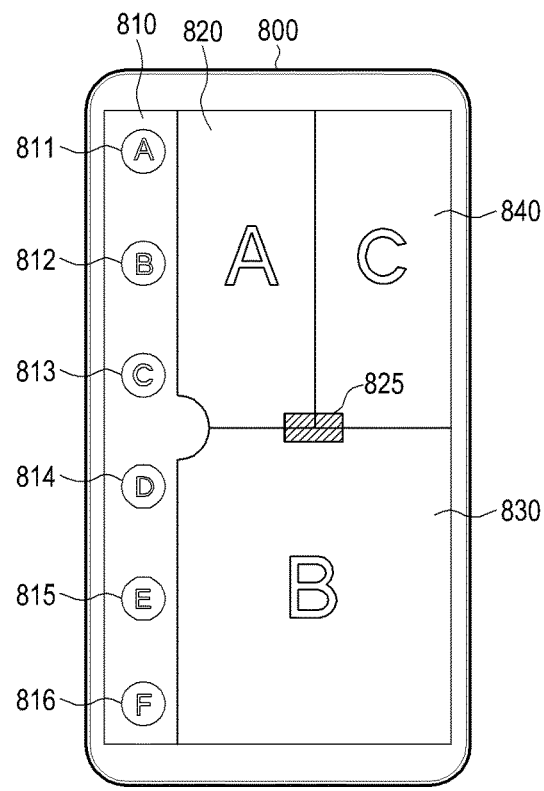

If the user ends the drag in the right part of the first window 820 as illustrated in FIG. 8I, the controller determines that a new application execution command has been received. As illustrated in FIG. 8J, the controller controls display of a third window 840 in the right half of the first screen 820 in correspondence with the ghost view 827 illustrated in FIG. 8I. Alternatively, the controller may control display of the third window 840 in correspondence with the position of the center button 825. Thus, as further applications are selected for execution, portions of the screen may be progressively subdivided so as to allocate a respective portion of the screen to each executed application.

Further, the controller shrinks down the first window 820 in size and shape in correspondence with creation of the third window 840. For example, the controller may control display of the first window 820 in an area other than the display area of the third window 840.

Figure 8K:
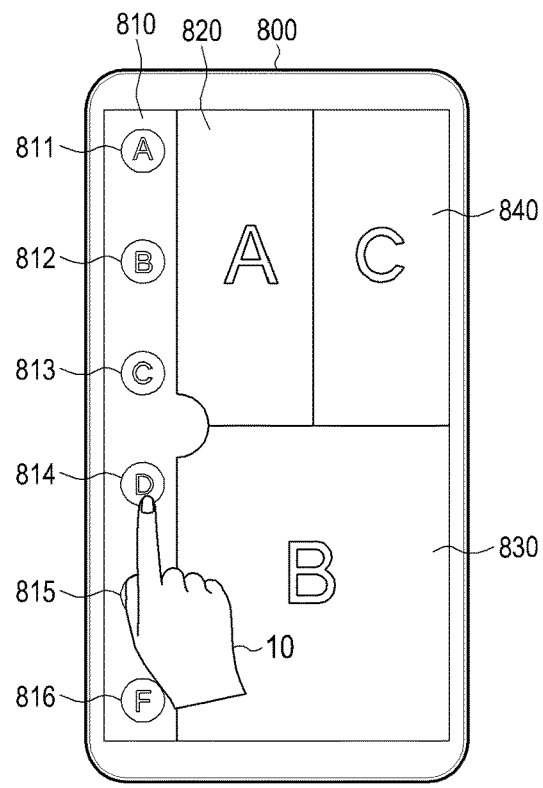
Figure 8L:
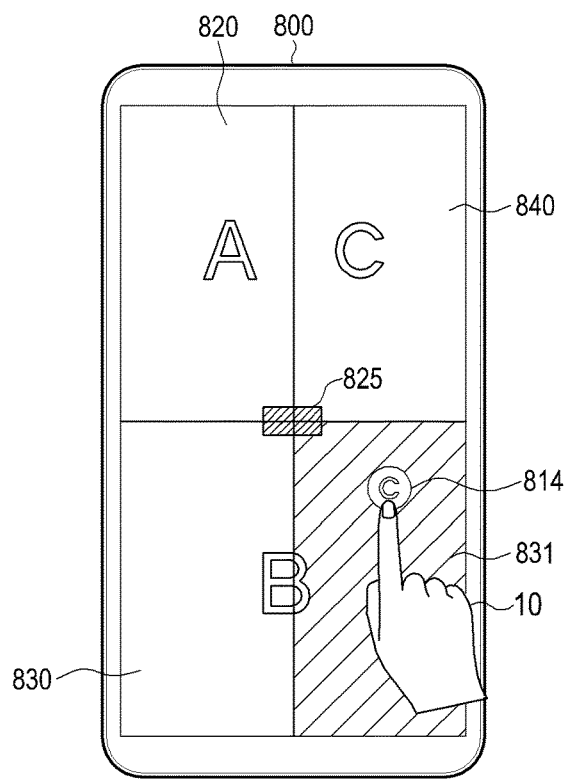
Figure 8M:
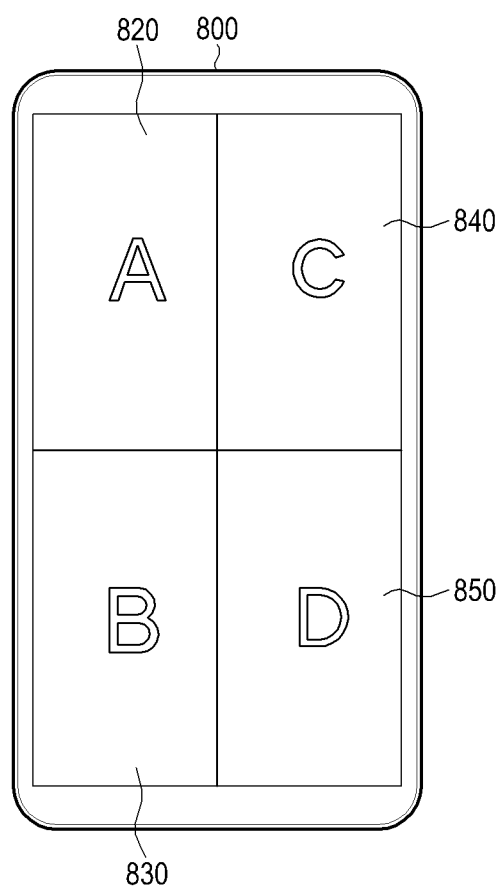

The user 10 may manipulate the display device 800 to additionally execute a fourth application D. For example, the user may touch the icon 814 representing the fourth application D as illustrated in FIG. 8K and drag the touched icon 814 to a right part of the second window 830 as illustrated in FIG. 8L. The controller controls display of the icon 814 at the dragged point. In addition, the controller may control display of a ghost view 831 at the dragged point. As described before, since the three windows 820, 830 and 840 are already displayed on the touch screen, the controller may control display of the ghost view 831 in a size and shape corresponding to a half of the second window 830. While not shown, if the user 10 drags the touched icon 814 to a left part of the second window 830, the controller controls display of the ghost view 831 in a left half of the second screen 830. Displaying the ghost view 831 in a right half of the second window 820 is merely one example of displaying the ghost view and thus, the controller may divide the second window 830 into upper and lower halves and control display of the ghost view 831 in one of the upper and lower halves of the second screen 830. Displaying the ghost view 831 in a half of the second window 830 is merely another example of displaying the ghost view. The controller may determine the size and shape of the ghost view 831 with respect to the center button 825 and display the ghost view 831 accordingly.

If the user 10 ends the drag in the right part of the second window 830 as illustrated in FIG. 8L, the controller determines that a new application execution command has been received. As illustrated in FIG. 8J, the controller controls display of a fourth window 850 in the right half of the second screen 830 in correspondence with the ghost view 831 illustrated in FIG. 8L. Alternatively, the controller may control display of the fourth window 850 in correspondence with the position of the center button 825.

Further, the controller shrinks down the second window 830 in size and shape in correspondence with creation of the fourth window 850.

As described above, the display device may control display of a window in a window display area where a drag gesture ends. In FIGS. 8A, 8B, 8C, 8D, 8E, 8F, 8G, 8H, 8I, 8J, 8K, 8L, and 8M, windows are displayed in the same size at different positions. With reference to FIGS. 9A, 9B, 9C, 9D, 9E, 9F, 9G, 9H, 10A, 10B, 10C, 10D, 11A, 11B, 11C, 12A, 12B, 12C, 13A, 13B, 13C, 14A, 14B, 14C, 15A, 15B, 15C, 16A, 16B, 16C, 16D, 16E, 16F, 16G, 16H, 17A, and 17B, various embodiments of configuring windows in different sizes at different positions will be described below.

FIGS. 9A, 9B, 9C, 9D, 9E, 9F, 9G, and 9H illustrate layouts according to embodiments of the present disclosure.

Figure 9A:
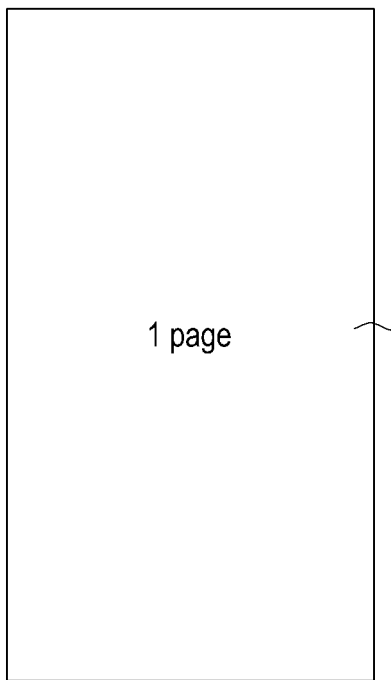
FIGS. 9A, 9B, 9C, 9D, 9E, 9F, 9G, and 9H illustrate layouts according to embodiments of the present disclosure.

FIG. 9A illustrates a full-screen layout for a case where the split mode is not set. A display device defines a first window display area 901 over an entire screen in FIG. 9A.

Figure 9B:
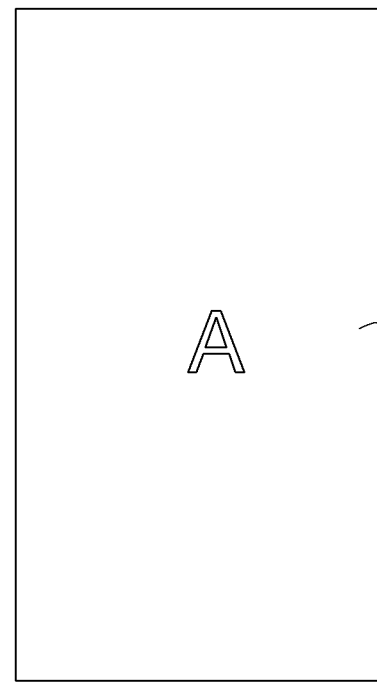

FIG. 9B illustrates an input area 902 corresponding to the first window display area 901.

Figure 9C:
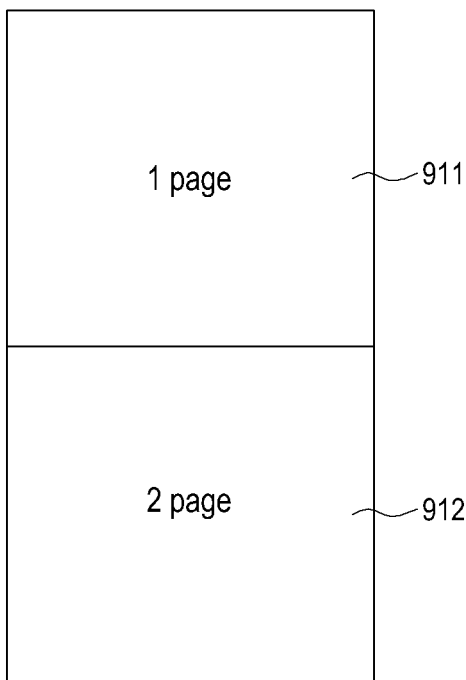

FIG. 9C illustrates a screen layout in a 2-top/down area split mode. In FIG. 9C, the display device may divide the screen into upper and lower areas and define first and second window display areas 911 and 912 in the upper and lower areas, respectively.

Figure 9D:
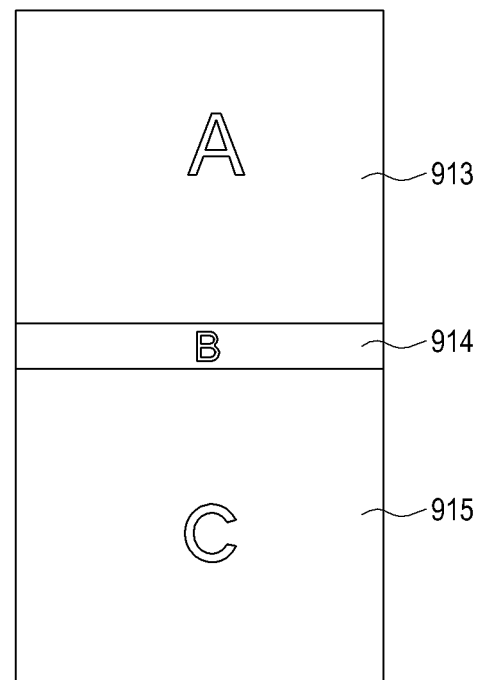

FIG. 9D illustrates input areas in the 2-top/down area split mode. A first input area 913 may correspond to the first window display area 911 and a third input area 915 may correspond to the second window display area 912. A second input area 914 may correspond to the boundary between the first and second window display areas 911 and 912. For example, when a user makes a drag gesture of dragging an icon to the first input area 913, the display device may display a window in the first window display area 911 illustrated in FIG. 9C. For example, when the user drags an icon to the third input area 915, the display device may display a window in the second window display area 912 illustrated in FIG. 9C. For example, when the user drags an icon to the second input area 912, the display device may display a window over the entirety of the first and second window display areas 911 and 912 illustrated in FIG. 9C.

Figure 9E:
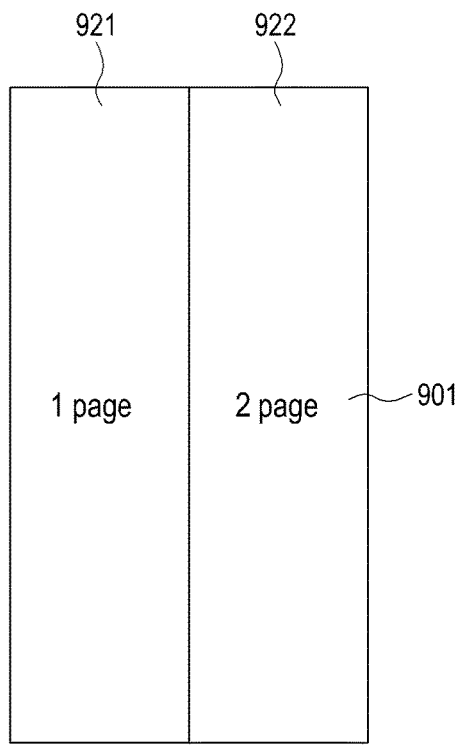

FIG. 9E illustrates a screen layout in a 2-left/right area split mode. In FIG. 9E, the display device may divide the screen into left and right areas and define first and second window display areas 921 and 922 in the left and right areas, respectively.

Figure 9F:
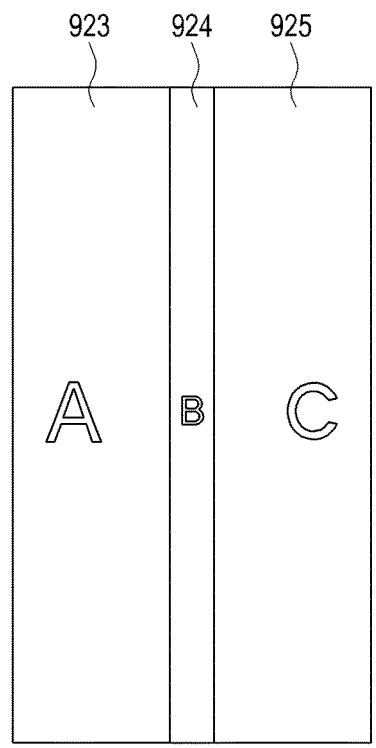

FIG. 9F illustrates input areas in the 2-left/right area split mode. A first input area 923 may correspond to the first window display area 921 and a third input area 925 may correspond to the second window display area 922. A second input area 924 may correspond to the boundary between the first and second window display areas 921 and 922. For example, when a user makes a drag gesture of dragging an icon to the first input area 923, the display device may display a window in the first window display area 921 illustrated in FIG. 9E. For example, when the user drags an icon to the third input area 925, the display device may display a window in the second window display area 922 illustrated in FIG. 9E. For example, when the user drags an icon to the second input area 924, the display device may display a window over the entirety of the first and second window display areas 921 and 922 illustrated in FIG. 9E.

Figure 9G:
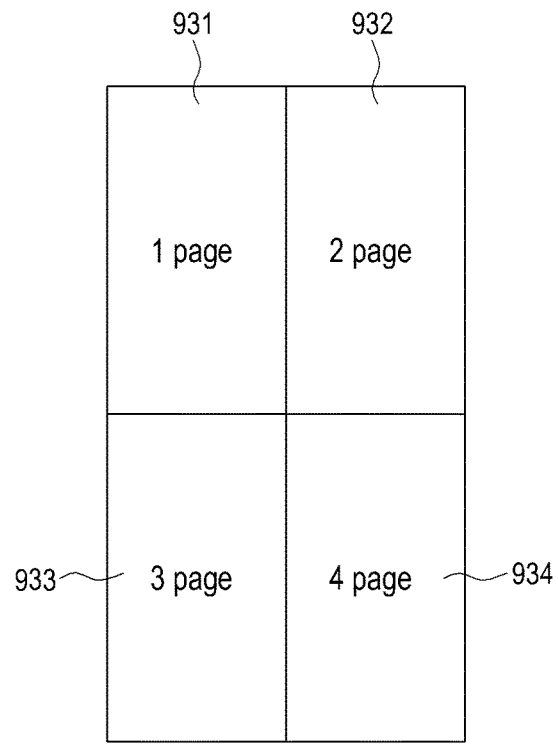
Figure 9H:
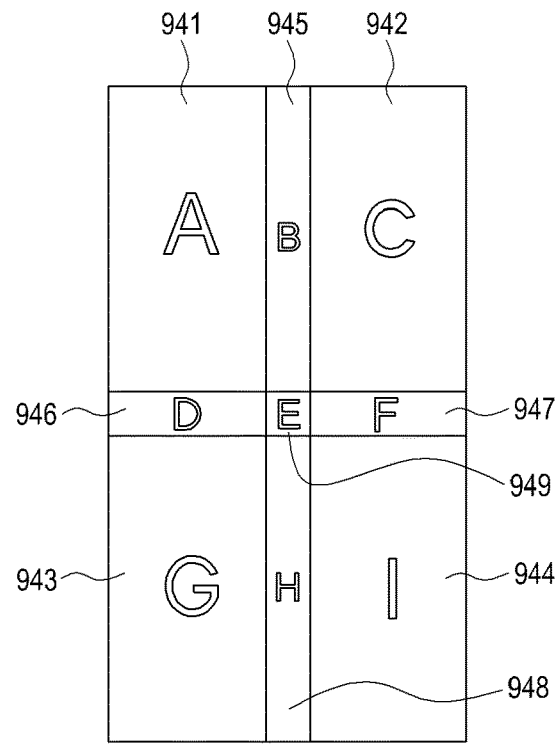

FIG. 9G illustrates a layout in a 4-area split mode according to an embodiment of the present disclosure and FIG. 9H illustrates input areas defined according to the layout of the 4-area split mode illustrated in FIG. 9G.

Referring to FIGS. 9G and 9H, the display device defines first to fourth window display areas 931, 932, 933, and 934. Accordingly, the user may manipulate the display device to execute a window in any of the first to fourth window display areas 941, 942, 943, and 944. For example, when the user drags an icon representing an application to the second window display area 932, the display device may arrange and display a window in the second window display area 932. If the user finishes the drag gesture at the boundary between the first and second display areas 931 and 932, the display device may display a window over the entirety of the first and second window display areas 931 and 932. For example, the display device may define a first input area 941 corresponding to the first window display area 931 and a second input area 942 corresponding to the second window display area 932. The display device may further define a fifth input area 945 at the boundary between the first and second window display areas 931 and 932. Similarly, the display device may define third and fourth input areas 943 and 944 corresponding to the third and fourth window display areas 933 and 934, respectively. The display device may further define a six input area 946 at the boundary between the first and third window display areas 931 and 933, a seventh input area 947 at the boundary between the second and fourth window display areas 932 and 934, and an eighth input area 948 at the boundary between the third and fourth window display areas 933 and 934. The display device may further define a ninth input area 949 at an intersection where the first to fourth window display areas 931, 932, 933, and 934 meet. When a drag gesture ends in a specific input area, the display device determines a window display area to display a window based on a mapping relationship illustrated in Table 2.

TABLE 2

| Input area | Window display area |
| --- | --- |
| $1^{st}$ input area | $1^{st}$ window display area |
| $2^{nd}$ input area | $2^{nd}$ window display area |
| $3^{rd}$ input area | $3^{rd}$ window display area |
| $4^{th}$ input area | $4^{th}$ window display area |
| $5^{th}$ input area | $1^{st}$ and $2^{nd}$ window display areas |
| $6^{th}$ input area | $1^{st}$ and $3^{rd}$ window display areas |
| $7^{th}$ input area | $2^{nd}$ and $4^{th}$ window display areas |
| $8^{th}$ input area | $3^{rd}$ and $4^{th}$ window display areas |
| $9^{th}$ input area | $1^{st}$, $2^{nd}$, $3^{rd}$, and $4^{th}$ window display areas |

As described above, the display device may define an input area to determine an application display area in which a drag gesture ends. More particularly, the display device may define an input area corresponding to the boundary between a plurality of window display areas or an input area corresponding to an intersection where a plurality of window display areas meet. When a drag gesture ends in an input area corresponding to the boundary between window display areas, the display device may display a window over the entirety of the window display areas. When a drag gesture ends in an input area corresponding to an intersection where a plurality of window display areas meet, the display device may display a window over the entirety of the window display areas. The display device may display a window at a different position in a different size. With reference to FIGS. 10A, 10B, 10C, 10D, 11A, 11B, 11C, 12A, 12B, 12C, 13A, 13B, 13C, 14A, 14B, 14C, 15A, 15B, 15C, 16A, 16B, 16C, 16D, 16E, 16F, 16G, 16H, 17A, and 17B, the above-described configurations of displaying windows at different positions in different sizes are described in greater detail. More particularly, FIGS. 10A, 10B, 10C, 10D, 11A, 11B, 11C, 12A, 12B, 12C, 13A, 13B, 13C, 14A, 14B, 14C, 15A, 15B, 15C, 16A, 16B, 16C, 16D, 16E, 16F, 16G, 16H, 17A, and 17B illustrate layouts in a 4-area split mode. Thus, FIGS. 9G and 9H will also be referred to in the following description.

FIGS. 10A, 10B, 10C, and 10D illustrate screens of a display device according to embodiments of the present disclosure.

Referring to FIGS. 10A, 10B, 10C, and 10D, a controller controls display of a window display area 1000 and a tray 1010 containing available icons 1011, 1012, 1013, 1014, 1015, 1016, and 1017 representing applications. The controller may display the tray 1010 all the time. Alternatively, the controller may display the tray 1010 only upon receipt of a tray invoke command. The tray invoke command may be generated in response to an edge flick received from a left edge of the touch screen. Those skilled in the art will readily understand that the present disclosure is not limited to input types that trigger a tray invoke command. It is assumed that the display device is displaying a first window that executes application A in the window display area 1000 (alternatively referred to as A window 1000). In FIGS. 10A, 10B, and 10C, when the tray is displayed in response to an invoke command, the tray may partially overlap the A window 1000 so as to partially occlude the A window 1000. In FIG. 10D, when the tray is displayed in response to an invoke command, the tray may partially overlap the A window 1000 and an F window 1024 so as to partially occlude the A window 1000 and the F window 1024.

Referring to FIG. 10B, the user 10 may make a drag gesture 1021 of dragging the icon 1016 representing application F to a first point 1027 in a lower part of the window display area 1000. In FIG. 10C, the controller may determine a window display area. In the case of a 4-area layout, the controller may determine an input area in which the drag gesture 1021 ends. For example, if the first point 1027 is located in the eighth input area 948 of FIG. 9H, the controller may determine to display the F window 1024 over the entirety of the third and fourth window display areas 933 and 934 as illustrated in Table 2. Thereafter, the controller may display a ghost view 1023 in the determined areas.

The user 10 may determine whether a window will be displayed at an intended position by viewing the ghost view 1023. The user 10 may release the drag gesture 1021 and the F window 1024 may be displayed over the entirety of the third and fourth window display areas 933 and 934 as illustrated in FIG. 10D. As the F window 1024 is displayed, the controller may reduce the size of the A window 1000 to a half and display the contracted A window 1000. The controller may scale down the A window 1000 at the same horizontal-to-vertical ratio or at a new horizontal-to-vertical ratio.

FIGS. 11A, 11B, and 11C illustrate screens of a display device according to embodiments of the present disclosure. More particularly, FIGS. 11A, 11B and 11C illustrate a subsequent operation to the operation of FIGS. 10A, 10B, 10C, and 10D.

Referring to FIG. 11A, the display device displays A window 1000 and the F window 1024, respectively in the upper and lower parts of the screen in the split mode. The user 10 may manipulate the display device to additionally execute application E. The user 10 may make a drag gesture 1032 by dragging the icon 1015n representing application E to a second point 1033.

Referring to FIGS. 11B and 11C, the controller may determine an input area corresponding to the second point 1033. If the controller determines that the second point 1033 corresponds to the eighth input area 948 illustrated in FIG. 9H, the controller may determine to display an E window 1034 over the entirety of the third and fourth window display areas 933 and 934, as illustrated in Table 2. Accordingly, the controller may display the determined window display areas as a ghost view 1031.

The user 10 may determine whether the window will be displayed at an intended position by viewing the ghost view 1031. The user 10 may release the drag gesture 1032. The E window 1034 may be displayed over the entirety of the third and fourth window display areas 933 and 934.

Figure 12C:
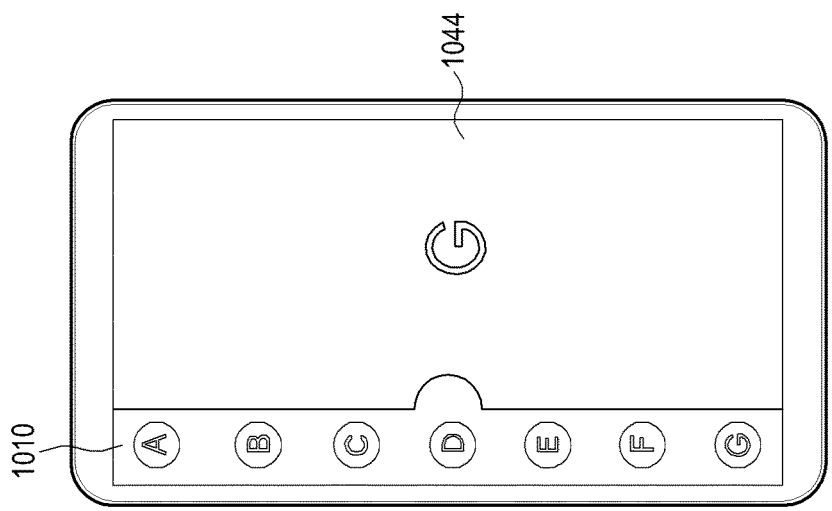
FIGS. 12A, 12B, and 12C illustrate screens of a display device according to embodiments of the present disclosure.
Figure 12B:
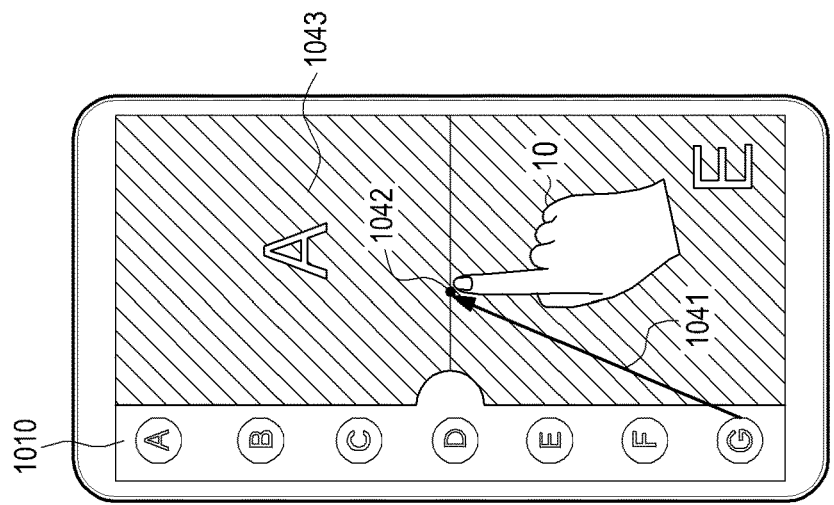
Figure 12A:
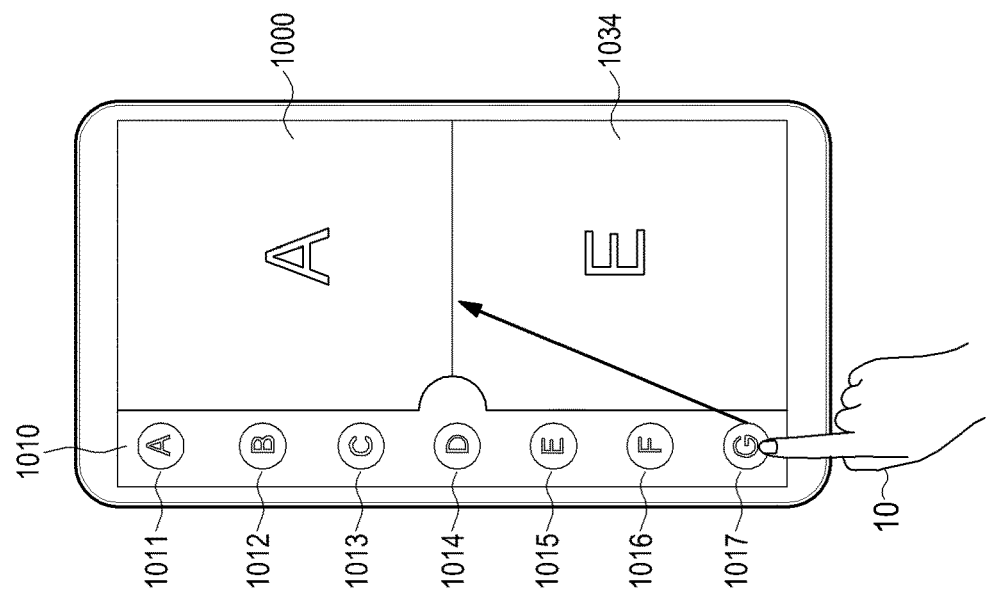

FIGS. 12A, 12B, and 12C illustrate screens of a display device according to embodiments of the present disclosure. More particularly, FIGS. 12A, 12B and 12C illustrate a subsequent operation to the operation of FIGS. 11A, 11B and 11C.

Referring to FIG. 12A, the display device displays the A window 1000 and the E window 1034, respectively in the upper and lower parts of the screen in the split mode. The user 10 may manipulate the display device to additionally execute application G. The user 10 may make a drag gesture 1041 of dragging the icon 1017 representing application G to a third point 1042.

Referring to FIGS. 12B and 12C, the controller may determine an input area corresponding to the third point 1042. If the controller determines that the third point 1042 corresponds to the ninth input area 949 illustrated in FIG. 9H, the controller may determine to display a G window 1044 over the entirety of the first to fourth window display areas 931 to 934, as illustrated in Table 2. Accordingly, the controller may display the determined window display areas as a ghost view 1043.

The user 10 may determine whether the window will be displayed at an intended position by viewing the ghost view 1043. The user 10 may release the drag gesture 1042. The G window 1044 may be displayed in full screen, as illustrated in FIG. 12C.

FIGS. 13A, 13B, and 13C illustrate screens of a display device according to embodiments of the present disclosure. More particularly, FIGS. 13A, 13B and 13C illustrate a subsequent operation to the operation of FIGS. 12A, 12B and 12C.

Referring to FIGS. 13A, 13B, and 13C, the display device is displaying the G window 1044. The user 10 may make a drag gesture 1051 of dragging the icon 1012 representing application B to a fourth point 1052 in a lower part of the G window 1044 in FIG. 13B. When the controller determines that the fourth point 1052 corresponds to the eighth input area 948 illustrated in FIG. 9H, the controller may determine to display a B window 1054 over the entirety of the third and fourth window display areas 933 and 934, as illustrated in Table 2. Accordingly, the controller may display the determined window display areas as a ghost view 1053.

The user 10 may determine whether the window will be displayed at an intended position by viewing the ghost view 1053. The user 10 may release the drag gesture 1052. The B window 1054 may be displayed over the entirety of the third and fourth window display areas 933 and 934, as illustrated in FIG. 13C. As the B window 1054 is displayed, the controller may shrink down the G window 1044 to a half of the screen and display the contracted G window 1044 in the upper half of the screen.

Figure 14C:
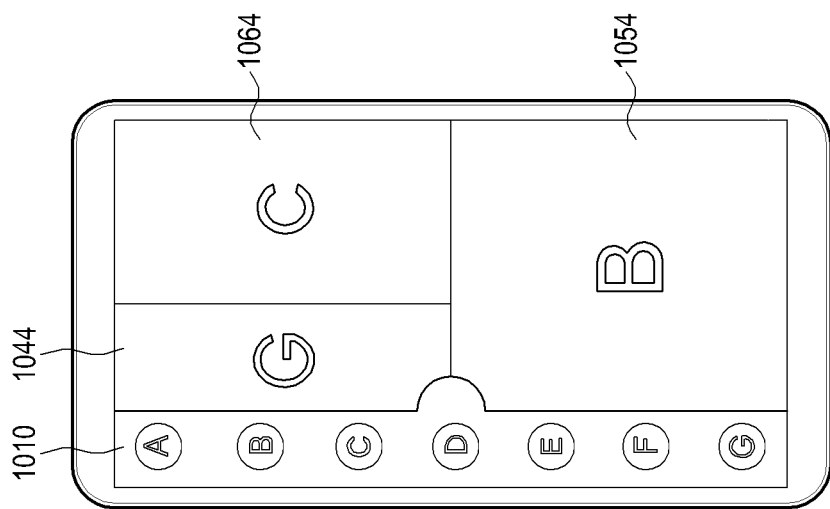
FIGS. 14A, 14B, and 14C illustrate screens of a display device according to embodiments of the present disclosure.
Figure 14B:
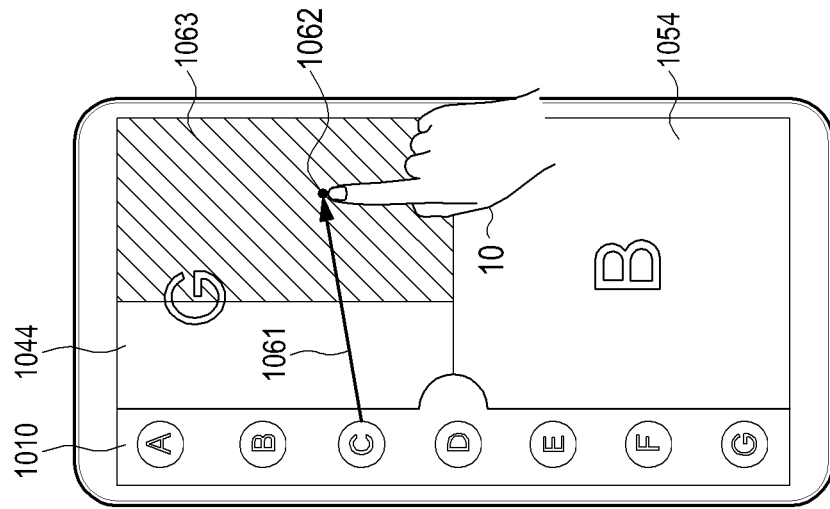
Figure 14A:
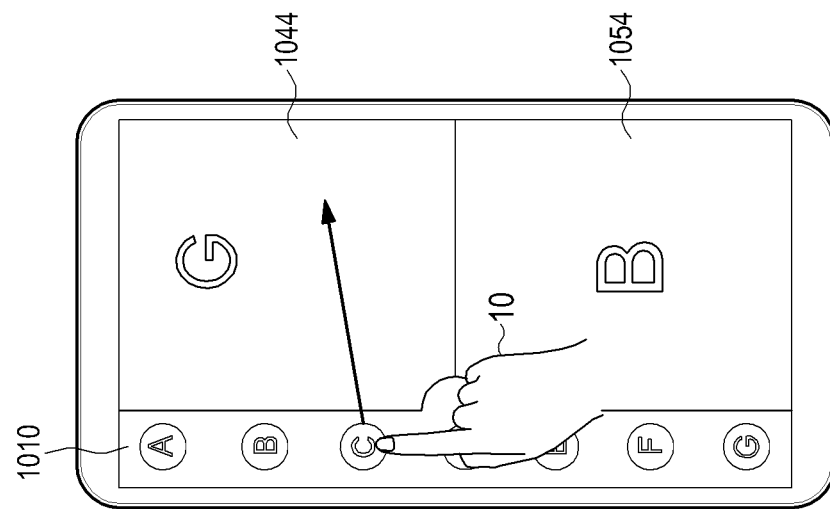

FIGS. 14A, 14B, and 14C illustrate screens of a display device according to embodiments of the present disclosure. More particularly, FIGS. 14A, 14B and 14C illustrate a subsequent operation to the operation of FIGS. 13A, 13B and 13C.

Referring to FIG. 14A, the display device displays the G window 1044 and the B window 1054, respectively in the upper and lower parts of the screen in the split mode. The user 10 may manipulate the display device to additionally execute application C. The user 10 may make a drag gesture 1061 of dragging the icon 1013 representing application B to a fifth point 1062.

Referring to FIGS. 14B and 14C, the controller may determine an input area corresponding to the fifth point 1062. If the controller determines that the fifth point 1062 corresponds to the second input area 942 illustrated in FIG. 9H, the controller may determine to display a C window 1064 in the second window display area 932, as illustrated in Table 2. Accordingly, the controller may display the determined window display area as a ghost view 1063.

The user 10 may determine whether the window will be displayed at an intended position by viewing the ghost view 1063. The user 10 may release the drag gesture 1061. The C window 1064 may be displayed in the second window display area 932 as illustrated in FIG. 14C.

Figure 15C:
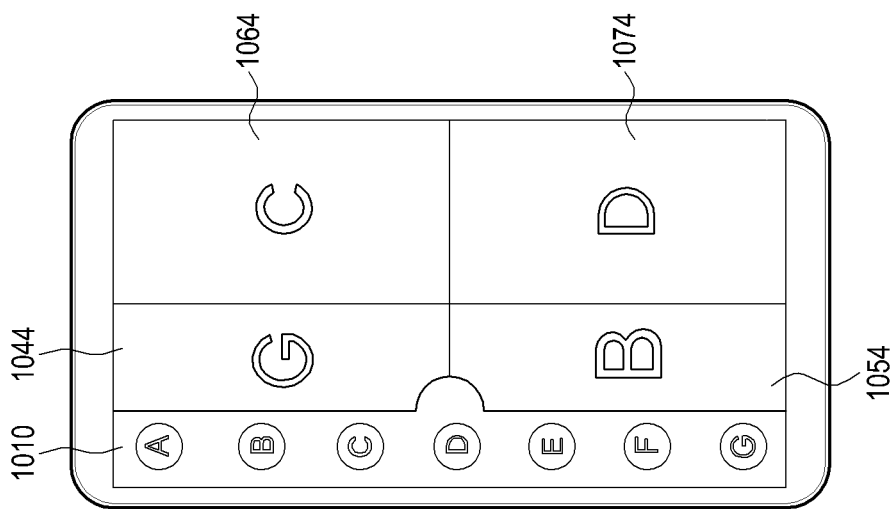
FIGS. 15A, 15B, and 15C illustrate screens of a display device according to embodiments of the present disclosure.
Figure 15B:
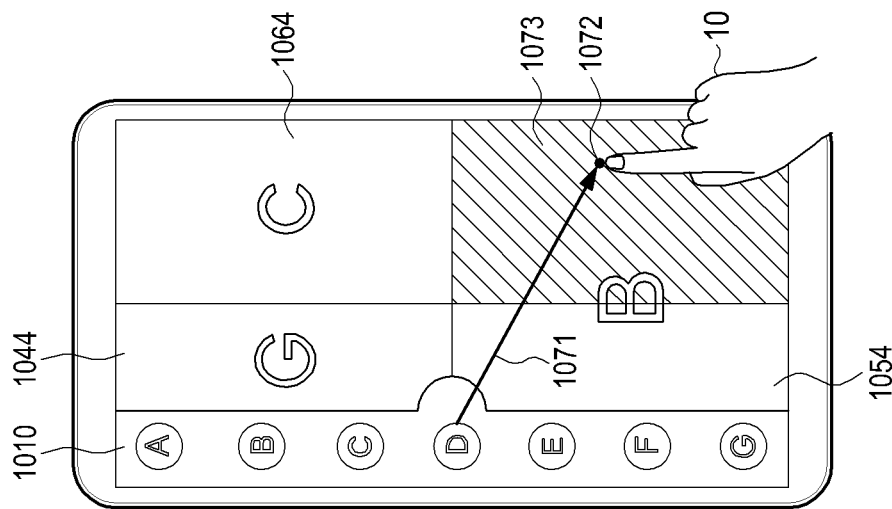
Figure 15A:
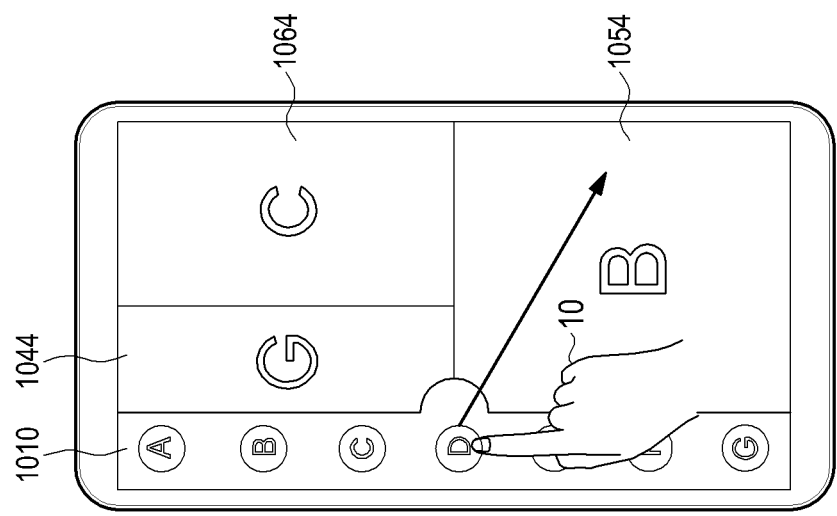

FIGS. 15A, 15B, and 15C illustrate screens of a display device according to embodiments of the present disclosure. More particularly, FIGS. 15A, 15B, and 15C illustrate a subsequent operation to the operation of FIGS. 14A, 14B, and 14C.

Referring to FIG. 15A, the display device displays the G window 1044, the B window 1054, and the C window 1064 in a 3-area split mode. The user 10 may manipulate the display device to additionally execute application D. The user 10 may make a drag gesture 1071 of dragging the icon 1014 representing application D to a sixth point 1072.

Referring to FIGS. 15B and 15C, the controller may determine an input area corresponding to the sixth point 1072. If the controller determines that the sixth point 1072 corresponds to the fourth input area 944 illustrated in FIG. 9H, the controller may determine to display a D window 1074 in the fourth window display area 934, as illustrated in Table 2. Accordingly, the controller may display the determined window display area as a ghost view 1073.

The user 10 may determine whether the window will be displayed at an intended position by viewing the ghost view 1073. The user 10 may release the drag gesture 1071. The D window 1074 may be displayed in the fourth window display area 934 as illustrated in FIG. 15C.

FIGS. 16A, 16B, 16C, 16D, 16E, 16F, 16G, and 16H illustrate screens of a display device according to embodiments of the present disclosure.

Figures 16A, 16B:
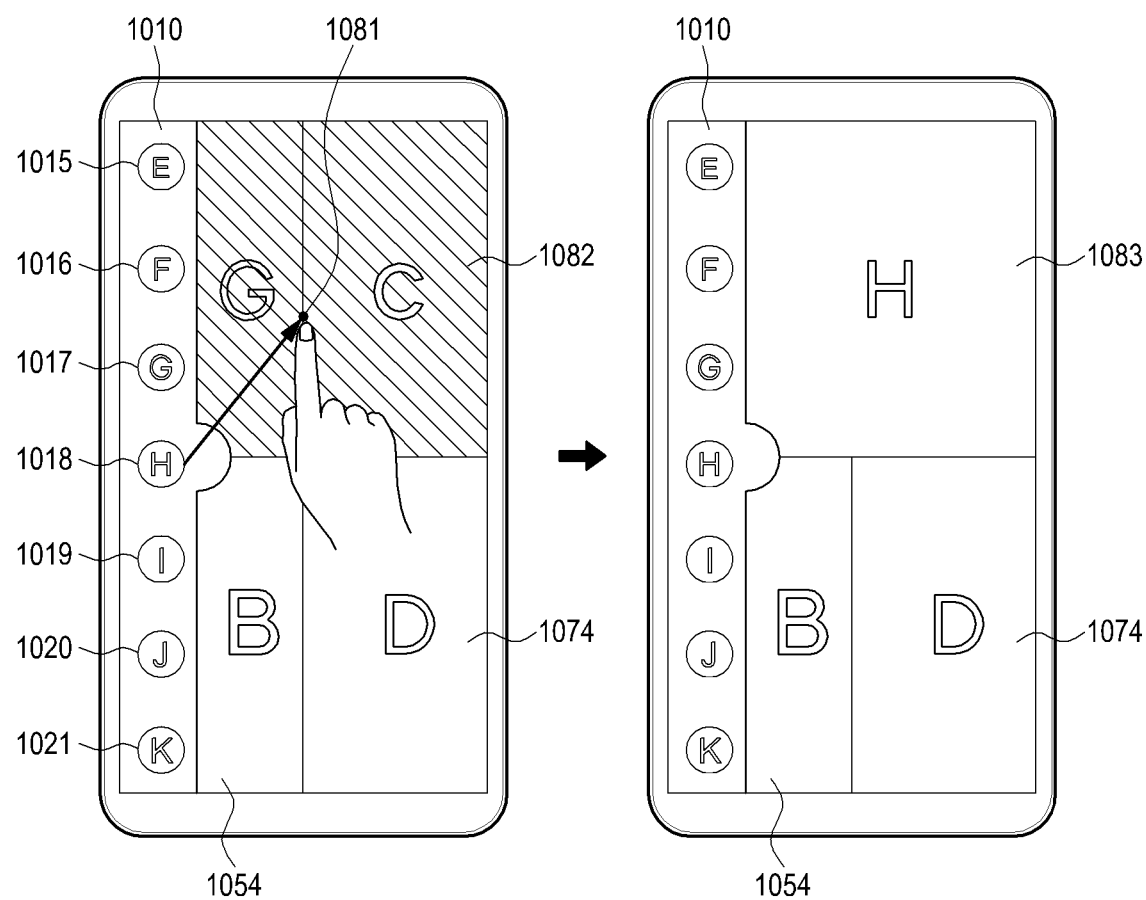
FIGS. 16A, 16B, 16C, 16D, 16E, 16F, 16G and 16H illustrate screens of a display device according to embodiments of the present disclosure.

FIGS. 16A and 16B illustrate screens of a display device according to an embodiment of the present disclosure. More particularly, FIGS. 16A and 16B illustrate a subsequent operation to the operation of FIGS. 15A, 15B and 15C.

Referring to FIG. 16A, the display device displays the G window 1044, the B window 1054, the C window 1064, and the D window 1074 in a 4-area split mode. The user 10 may manipulate the display device to additionally execute application H. The user 10 may make a drag gesture of dragging an icon 1018 representing application H to a seventh point 1081.

Referring to FIG. 16B, the controller may determine an input area corresponding to the seventh point 1081. If the controller determines that the seventh point 1081 corresponds to the fifth input area 945 illustrated in FIG. 9H, the controller may determine to display an H window 1083 in the first and second window display areas 931 and 932, as illustrated in Table 2. Accordingly, the controller may display the determined window display areas as a ghost view 1082. Icons 1015, 1016, 1017, 1018, 1019, 1020, and 1021 representing applications E to K may be arranged in the tray 1010. The user 10 may input, for example, an upward drag gesture across the tray 1010 so that the hidden icons 1018, 1019, 1020, and 1021 representing applications H to K may show up in the tray 1010.

The user 10 may determine whether the window will be displayed at an intended position by viewing the ghost view 1082. The user 10 may release the drag gesture. The H window 1083 may be displayed in the first and second window display areas 931 and 932 as illustrated in FIG. 16B.

Figures 16C, 16D:
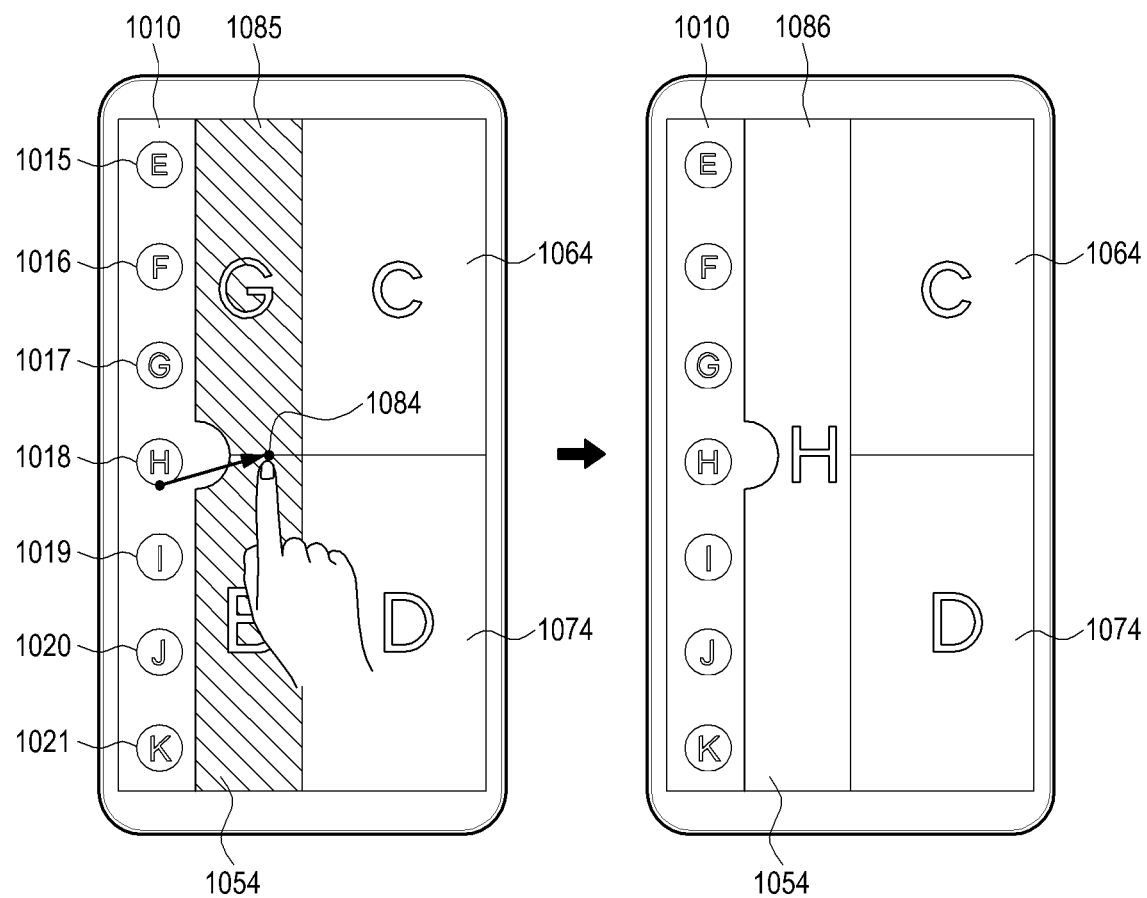

FIGS. 16C and 16D illustrate screens of a display device according to an embodiment of the present disclosure. More particularly, FIGS. 16C and 16D illustrate a subsequent operation to the operation of FIGS. 15A, 15B and 15C.

Referring to FIG. 16C, the display device displays the G window 1044, the B window 1054, the C window 1064, and the D window 1074 in the 4-area split mode. The user 10 may manipulate the display device to additionally execute application H. The user 10 may make a drag gesture by dragging the icon 1018 representing application H to an eighth point 1084.

Referring to FIG. 16D, the controller may determine an input area corresponding to the eighth point 1084. If the controller determines that the eighth point 1084 corresponds to the sixth input area 946 illustrated in FIG. 9H, the controller may determine to display an H window 1086 in the first and third window display areas 931 and 933, as illustrated in Table 2. Accordingly, the controller may display the determined window display areas as a ghost view 1085.

The user 10 may determine whether the window will be displayed at an intended position by viewing the ghost view 1085. The user 10 may release the drag gesture. The H window 1086 may be displayed in the first and third window display areas 931 and 933 as illustrated in FIG. 16D.

Figures 16E, 16F:
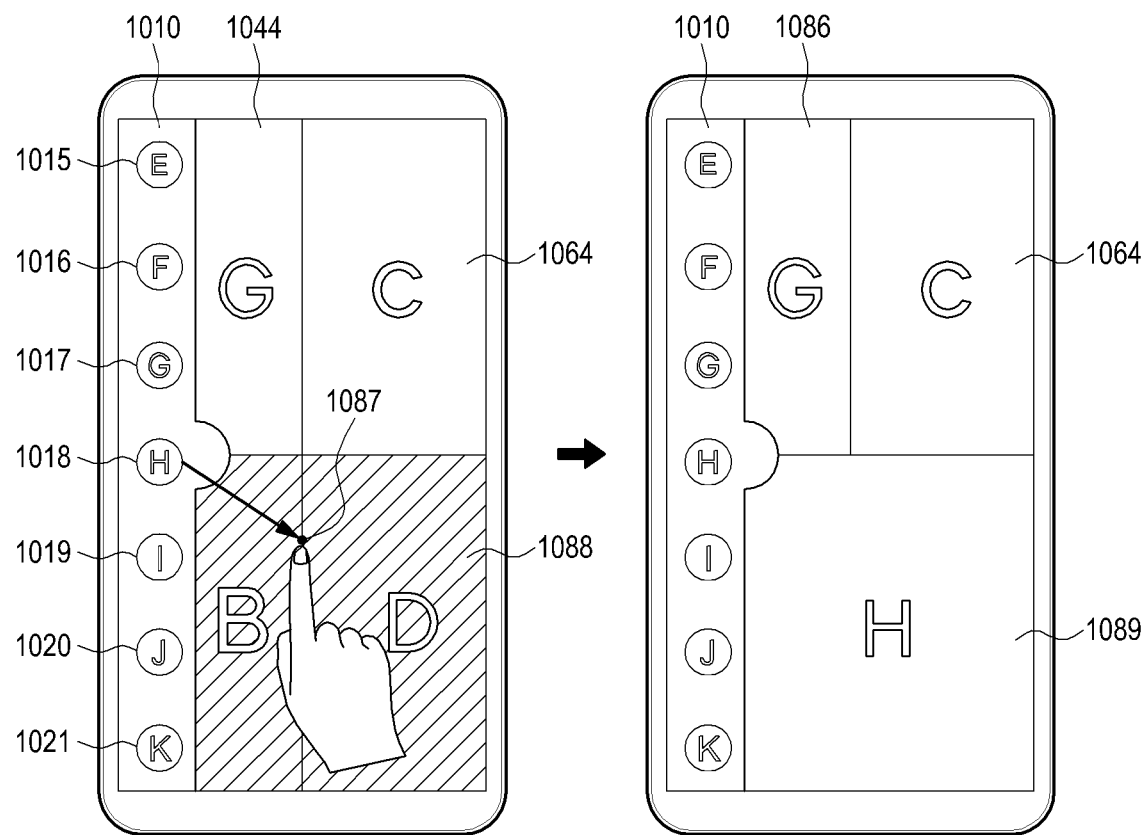

FIGS. 16E and 16F illustrate screens of a display device according to an embodiment of the present disclosure. More particularly, FIGS. 16E and 16F illustrate a subsequent operation to the operation of FIGS. 15A, 15B and 15C.

Referring to FIG. 16E, the display device displays the G window 1044, the B window 1054, the C window 1064, and the D window 1074 in the 4-area split mode. The user 10 may manipulate the display device to additionally execute application H. The user 10 may make a drag gesture of dragging the icon 1018 representing application H to a ninth point 1087.

Referring to FIG. 16F, the controller may determine an input area corresponding to the ninth point 1087. If the controller determines that the ninth point 1087 corresponds to the eighth input area 948 illustrated in FIG. 9H, the controller may determine to display an H window 1089 in the third and fourth window display areas 933 and 934, as illustrated in Table 2. Accordingly, the controller may display the determined window display areas as a ghost view 1088.

The user 10 may determine whether the window will be displayed at an intended position by viewing the ghost view 1088. The user 10 may release the drag gesture. The H window 1089 may be displayed in the third and fourth window display areas 933 and 934 as illustrated in FIG. 16F.

Figures 16G, 16H:
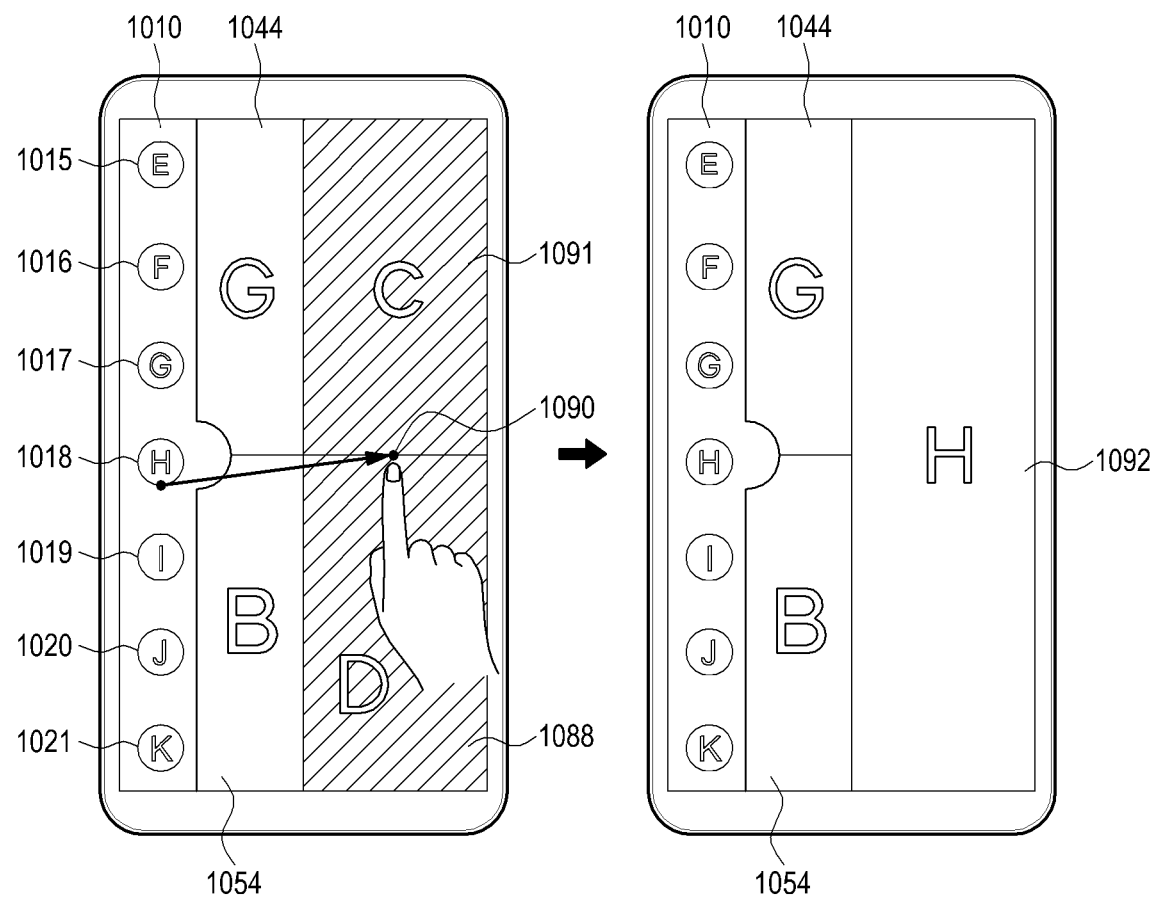

FIGS. 16G and 16H illustrate screens of a display device according to an embodiment of the present disclosure. More particularly, FIGS. 16G and 16H illustrate a subsequent operation to the operation of FIGS. 15A, 15B and 15C.

Referring to FIG. 16G, the display device displays the G window 1044, the B window 1054, the C window 1064, and the D window 1074 in the 4-area split mode. The user 10 may manipulate the display device to additionally execute application H. The user 10 may make a drag gesture of dragging the icon 1018 representing application H to a tenth point 1090.

Referring to FIG. 16H, the controller may determine an input area corresponding to the tenth point 1090. If the controller determines that the tenth point 1090 corresponds to the seventh input area 947 illustrated in FIG. 9H, the controller may determine to display an H window 1092 in the second and fourth window display areas 932 and 934, as illustrated in Table 2. Accordingly, the controller may display the determined window display areas as a ghost view 1091.

The user 10 may determine whether the window will be displayed at an intended position by viewing the ghost view 1091. The user 10 may release the drag gesture. The H window 1092 may be displayed in the second and fourth window display areas 932 and 934 as illustrated in FIG. 16H.

Figures 17A, 17B, 18A, 18B:
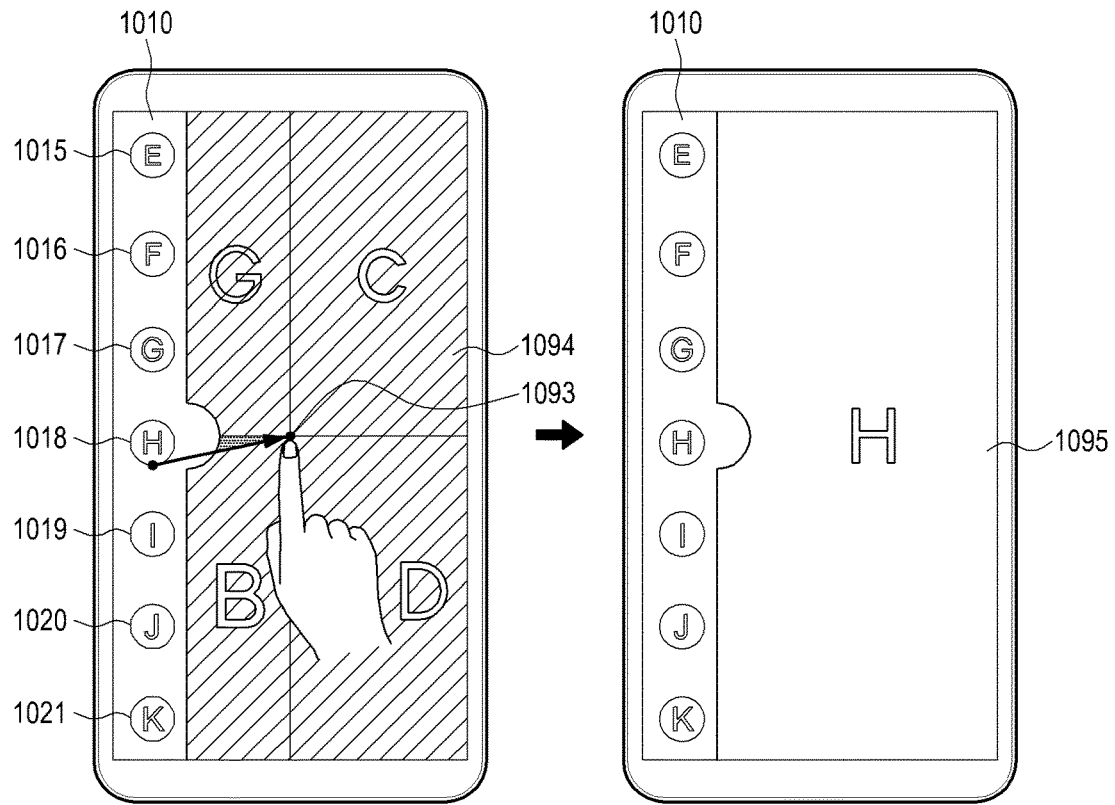
FIGS. 17A and 17B illustrate screens of a display device according to embodiments of the present disclosure.
FIGS. 18A and 18B illustrate a 9-area split mode according to embodiments of the present disclosure.

FIGS. 17A and 17B illustrate screens of a display device according to embodiments of the present disclosure. More particularly, FIGS. 17A and 17B illustrate a subsequent operation to the operation of FIGS. 15A, 15B and 15C.

Referring to FIG. 17A, the display device displays the G window 1044, the B window 1054, the C window 1064, and the D window 1074 in the 4-area split mode. The user 10 may manipulate the display device to additionally execute application H. The user 10 may make a drag gesture of dragging the icon 1018 representing application H to an eleventh point 1093.

Referring to FIG. 17B, the controller may determine an input area corresponding to the eleventh point 1093. If the controller determines that the eleventh point 1093 corresponds to the ninth input area 949 illustrated in FIG. 9H, the controller may determine to display an H window 1095 in the third and fourth window display areas 932 and 934, as illustrated in Table 2. Accordingly, the controller may display the determined window display areas as a ghost view 1094.

The user 10 may determine whether the window will be displayed at an intended position by viewing the ghost view 1094. The user 10 may release the drag gesture. The H window 1095 may be displayed in full screen.

As described above, the display device may provide a window in a different size at a different position according to the ending point of a drag gesture. While the 4-area split mode has been described above, the above description may be extended to a 9-area split mode or the like.

FIGS. 18A and 18B illustrate a 9-area split mode according to embodiments of the present disclosure.

Referring to FIGS. 18A and 18B, the display device may define 9 split window display areas. In addition, the display device may define input areas A, C, E, K, M, O, U, W, and Y corresponding to the respective window display areas, input areas B, D, F, H, J, L, N, P, R, T, V, and X corresponding to boundaries between window display areas, and input areas G, I, Q, and S corresponding to intersections at which the window display areas meet. When the ending point of a drag gesture is positioned in an input area corresponding to the boundary between window display areas, the display device may display a window over the entirety of the window display areas. When the ending point of a drag gesture is positioned in an input area corresponding to an intersection at which window display areas meet, the display device may display a window over the entirety of the window display areas. In this manner, the display device may display a window in a different size at a different position according to the position of the ending point of a drag gesture.

Figure 19:
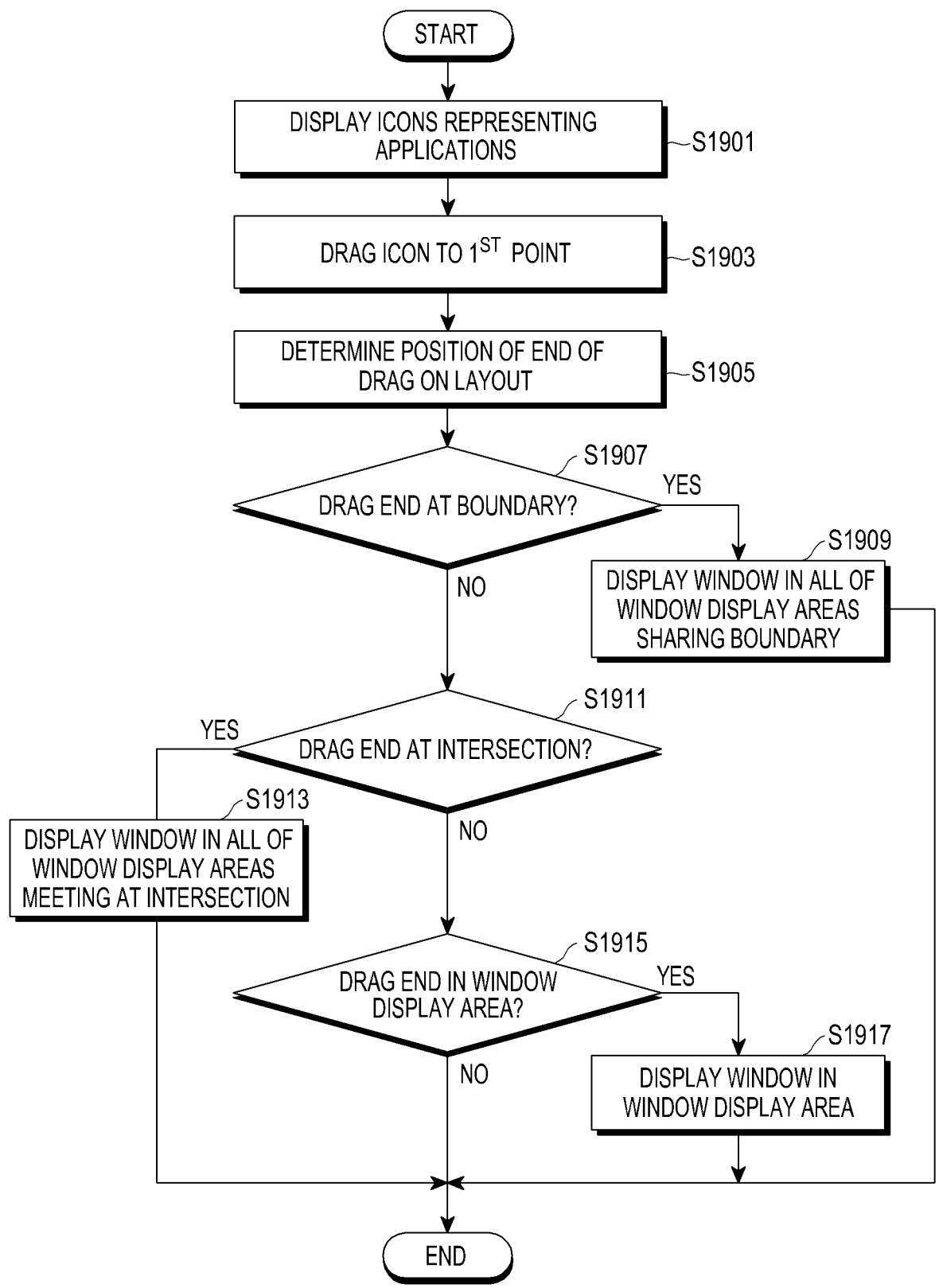
FIG. 19 is a flowchart illustrating a method for controlling a display device according to an embodiment of the present disclosure.

FIG. 19 is a flowchart illustrating a method for controlling a display device according to an embodiment of the present disclosure.

Referring to FIG. 19, the display device may display at least one icon representing an application in operation S1901. The display device may receive a drag gesture of dragging an icon to a first point in operation S1903. The display device may determine the position of the end of the drag gesture on a layout in operation S1905.

The display device may determine whether the drag gesture ends at the boundary between window display areas in operation S1907. If the drag gesture ends at the boundary between window display areas, the display device may display a window over the entirety of the window display areas in operation S1909.

The display device may determine whether the drag gesture ends at an intersection where window display areas meet in operation S1911. If the drag gesture ends at an intersection where window display areas meet, the display device may display a window over the entirety of the window display areas in operation S1913.

The display device may determine whether the drag gesture ends in a window display area in operation S1915. If the drag gesture ends in a window display area, the display device may display a window in the window display area in operation S1917.

Figure 20:
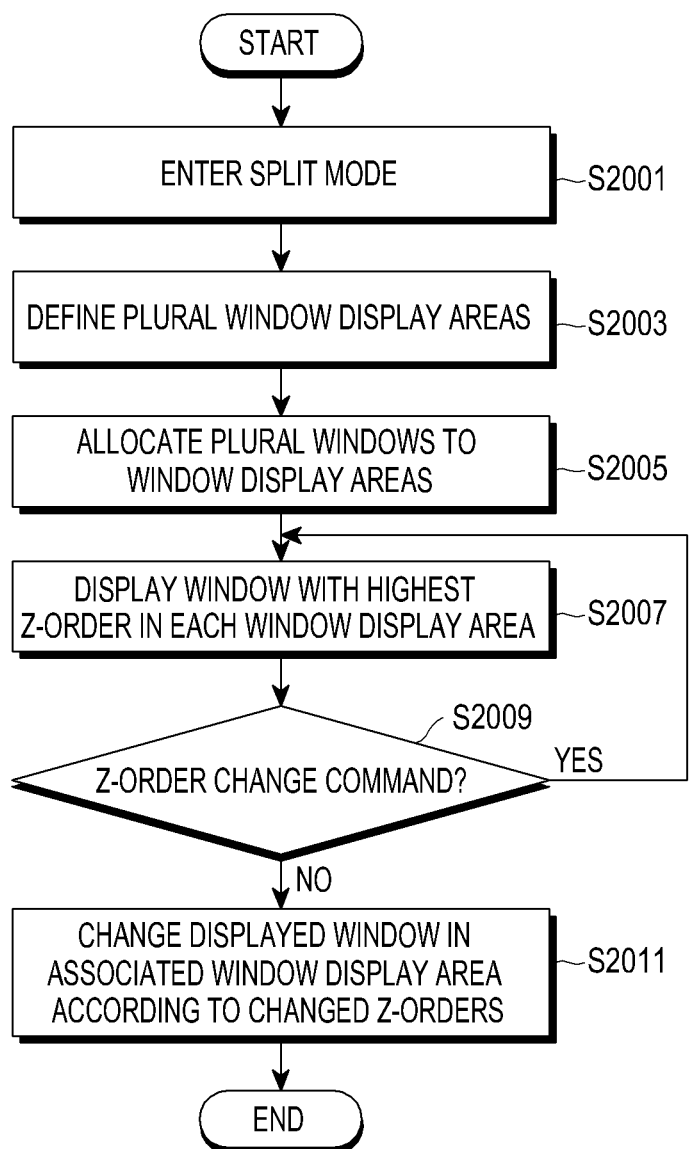
FIG. 20 is a flowchart illustrating a method for controlling a display device according to an embodiment of the present disclosure.

FIG. 20 is a flowchart illustrating a method for controlling a display device according to an embodiment of the present disclosure.

Referring to FIG. 20, the controller may set a layout in a split mode in operation S2001. The controller may define a plurality of window display areas according to the split mode in operation S2003. In addition, the controller may allocate a plurality of windows to the window display areas in operation S2005. More particularly, the controller may allocate a plurality of windows to one window display area.

The controller may control display of a window with a highest Z-order in each window display area from among the windows allocated to the window display area in operation S2007. For example, if a plurality of windows are allocated to the first window display area, the controller may control display of a window having the highest of the Z-orders of the allocated windows.

The controller may determine whether a Z-order change command has been received through the touch screen in operation S2009. The Z-order change command is a command requesting changing the Z-order of a window. For example, the Z-order change command may be triggered by a flick gesture on the touch screen. Upon receipt of the Z-order change command in operation S2009, the controller may change at least one Z-order and display windows based on the changed Z-order in operation S2011.

Figure 21A:
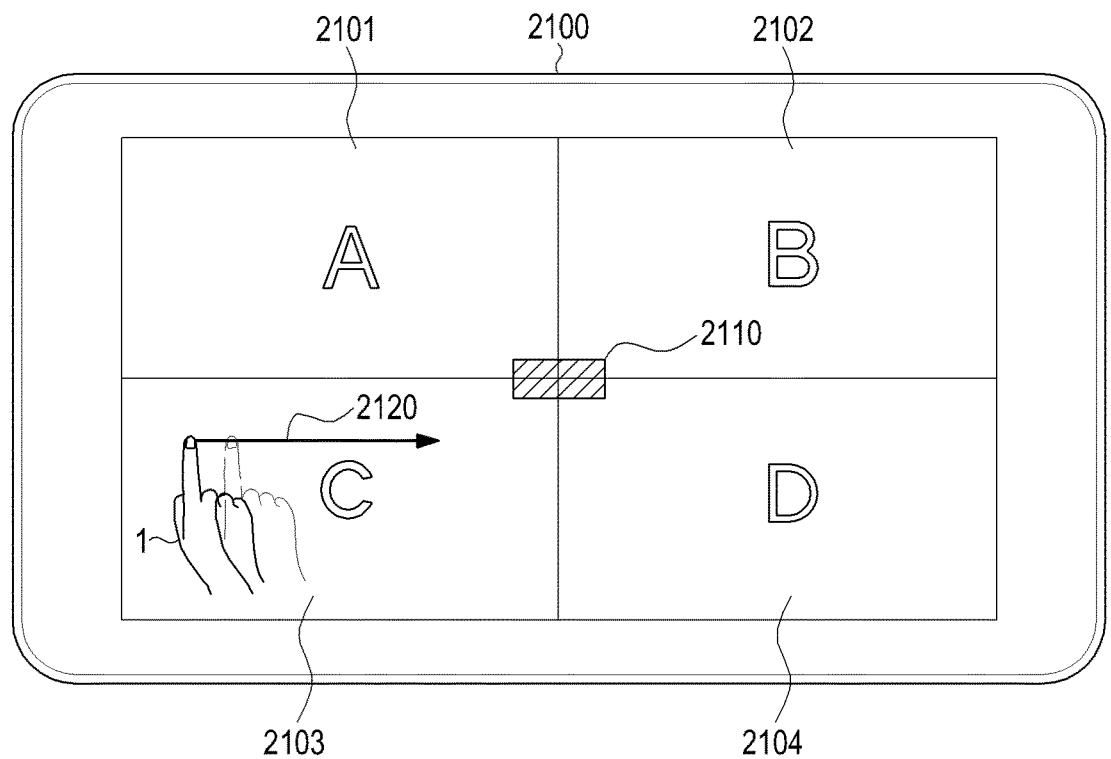
FIGS. 21A, 21B, and 21C screens of a display device according to embodiments of the present disclosure.
Figure 21B:
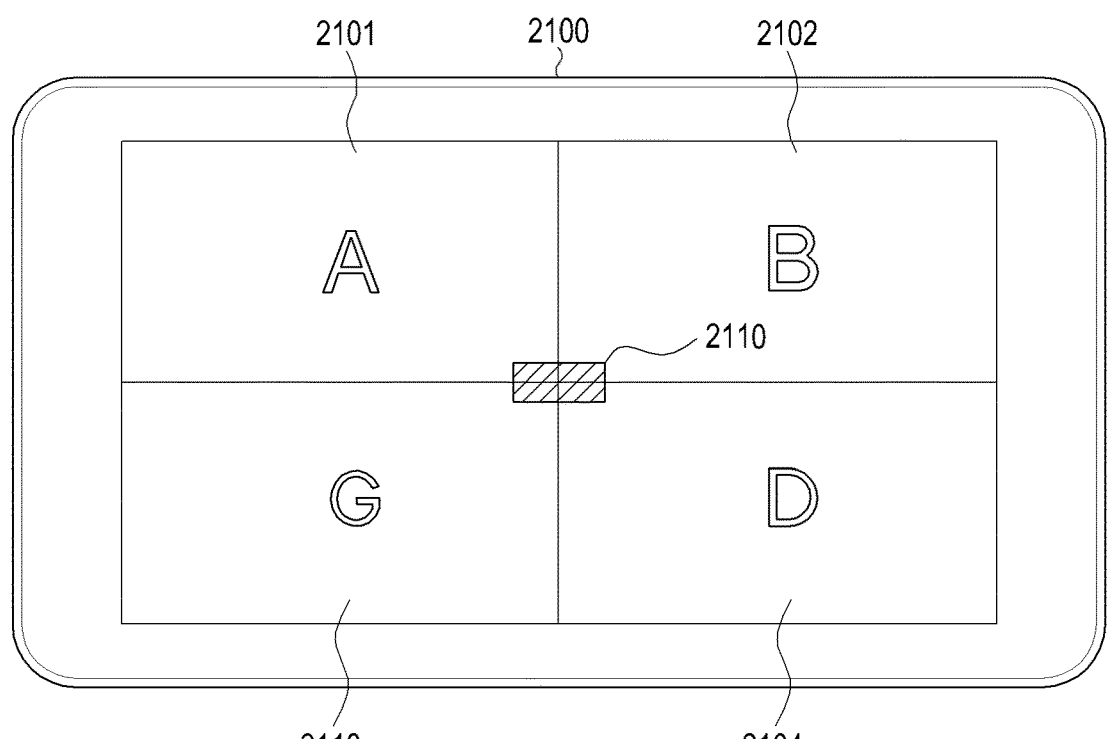
Figure 21C:
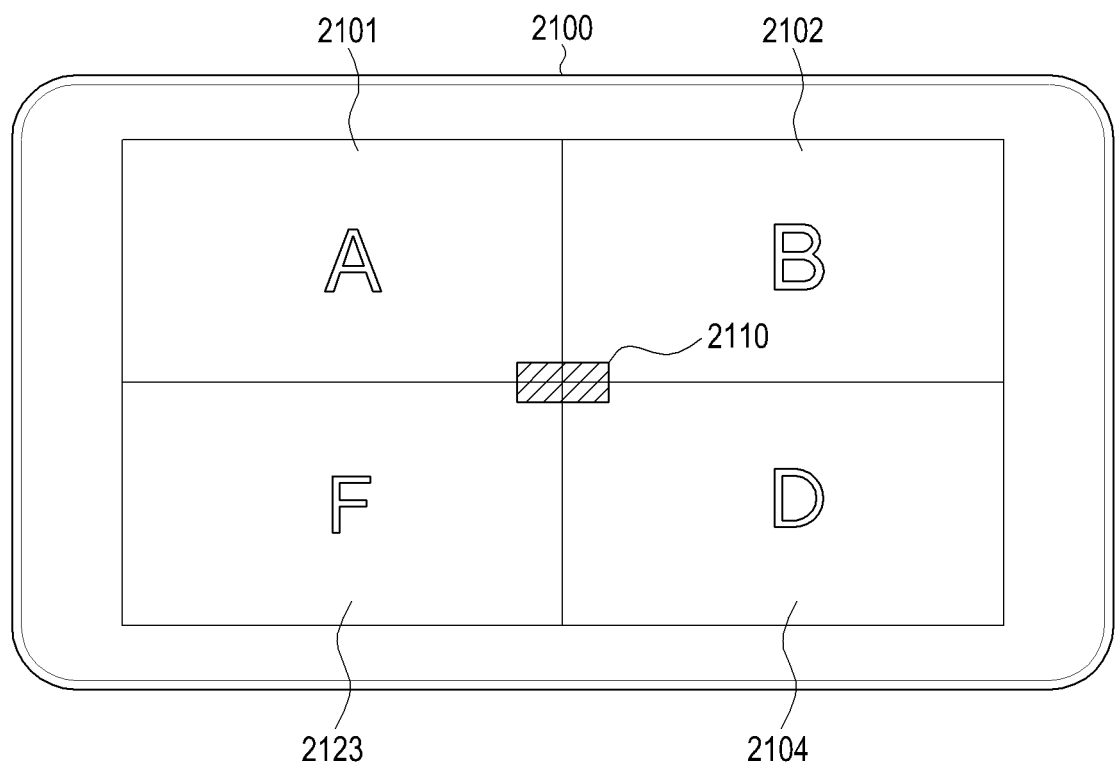

FIGS. 21A, 21B, and 21C illustrate display devices according to embodiments of the present disclosure.

Referring to FIG. 21A, a display device 2100 displays a first window 2101 in a first area to execute application A, a second window 2102 in a second area to execute application B, a third window 2103 in a third area to execute application C, and a fourth window 2104 in a fourth area to execute application D. The display device 2100 further displays a center button 2110.

FIG. 22 illustrates an activity stack according to an embodiment of the present disclosure.

Referring to FIG. 22, a controller (not shown) may manage the left activity stack. The controller may manage the Z-orders of windows in the order of applications C, F, G, A, D, B, J, K, H, M, L, and I. The controller allocates windows for applications C, F, and G to the third area, windows for applications A, J, and L to the first area, windows for applications D, H, and M to the fourth area, and windows for applications B, K, and I to the second area.

The controller detects applications that are supposed to be executed in the first area and compares the Z-orders of the detected applications. The controller may determine that application A has a highest Z-order in the first area. Thus, the controller controls display of the first window 2101 in which application A is executed, in the first area. The controller detects applications that are supposed to be executed in the second area and compares the Z-orders of the detected applications. The controller may determine that application B has a highest Z-order in the second area. Thus, the controller controls display of the second window 2102 in which application B is executed, in the second area. The controller detects applications that are supposed to be executed in the third area and compares the Z-orders of the detected applications. The controller may determine that application C has a highest Z-order in the third area. Thus, the controller controls display of the third window 2103 in which application B is executed, in the third area. The controller detects applications that are supposed to be executed in the fourth area and compares the Z-orders of the detected applications. The controller may determine that application D has a highest Z-order in the fourth area. Thus, the controller controls display of the fourth window 2104 in which application D is executed, in the fourth area.

With continued reference to FIG. 21A, the user 1 may input a Z-order change command to the third area. For example, the user 1 may make a rightward flick gesture 2120 across the third area. The controller may recognize the rightward flick gesture 2120 as the Z-order change command. The rightward flick gesture 2120 may be set as a command to assign a highest Z-order to an application having a lowest Z-order in a window display area. The Z-order change is reflected in a right activity stack illustrated in FIG. 22. It is noted from the right activity stack illustrated in FIG. 22 that application G is placed on top of the activity stack. The rightward flick gesture 2120 is one example of assigning a Z-order in a window display area and thus, those skilled in the art will readily understand that the Z-order change command may be defined by a gesture made in a direction other than to the right. For example, the Z-order change command may be defined by various gestures, such as a leftward flick gesture, a downward flick gesture, an upward flick gesture, and the like. Besides, many other gestures than flick gestures, including tilting, drag, shake, and the like, may be defined as the Z-order change command, which should not be construed as limiting the present disclosure. Herein, the rightward direction may be referred to as a first direction, while the first direction is not limited to the rightward direction.

Referring to FIGS. 21B and 21C, the controller may control display of a fifth window 2113 in the third area in order to execute application G. Upon receipt of a Z-order change command by a rightward flick gesture across the third area, the controller may determine that application F has a lowest Z-order in the third area, as illustrated in FIG. 21C. The controller may control display of a sixth window 2123 in the third area in order to execute application F.

Figure 23A:
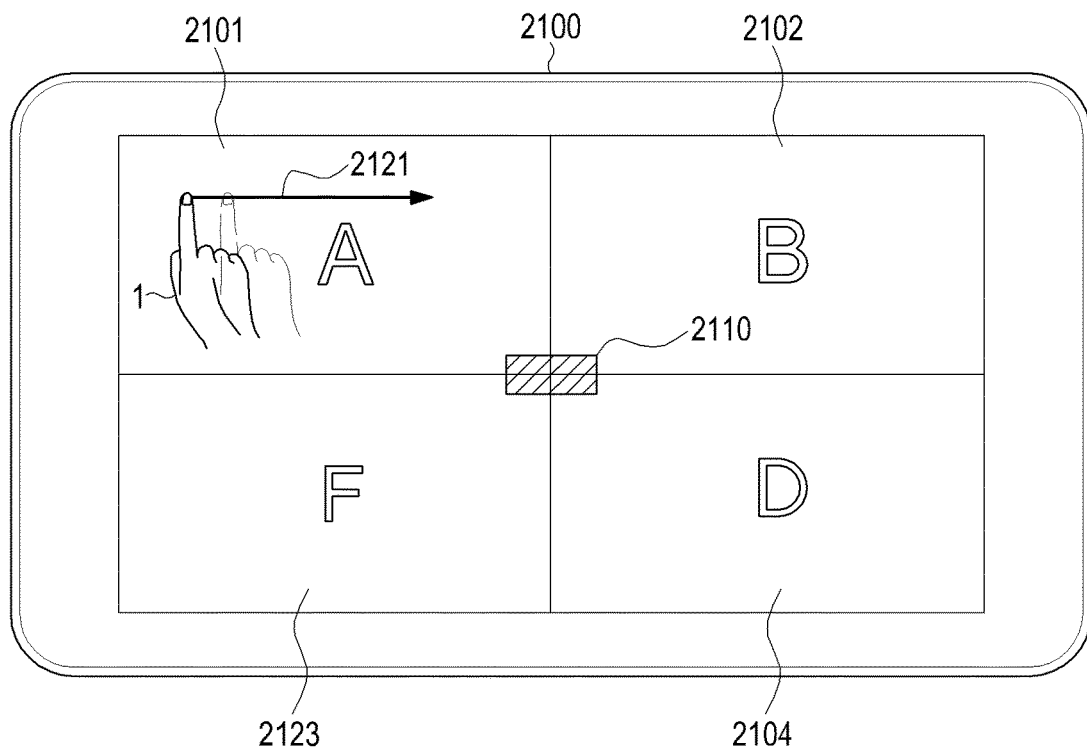
FIGS. 23A and 23B illustrate screens of a display device describing a Z-order change command according to an embodiment of the present disclosure.
Figure 23B:
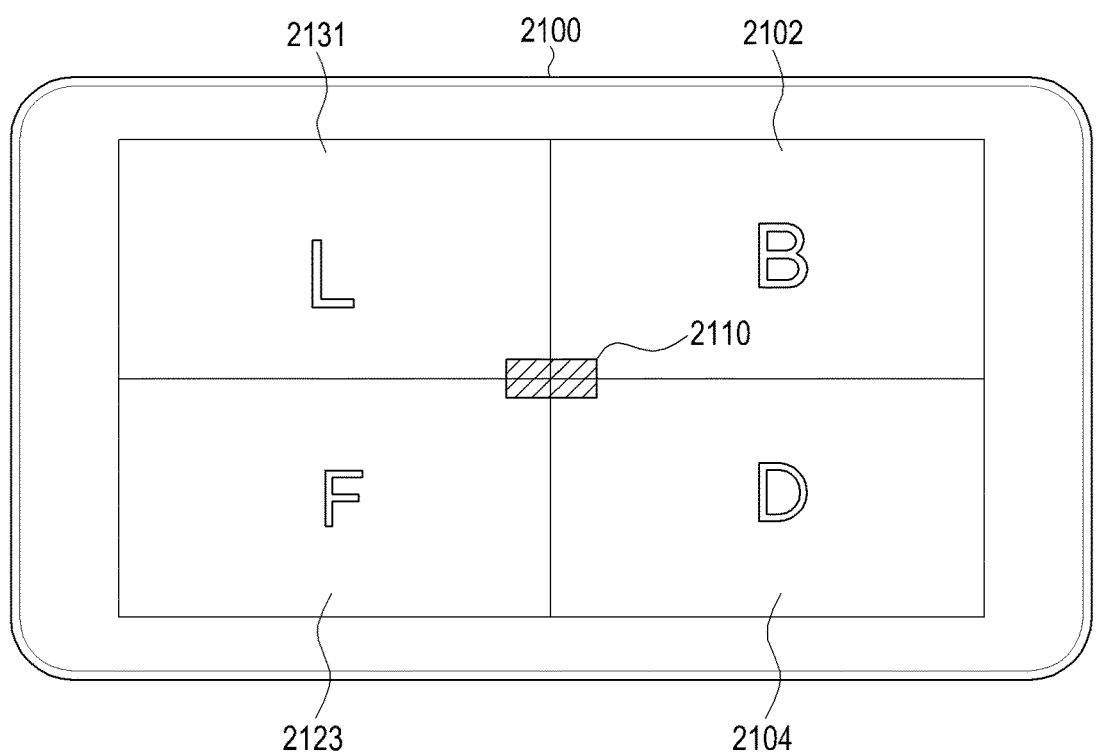

FIGS. 23A and 23B illustrate screens of a display device describing a Z-order change command according to an embodiment of the present disclosure. FIG. 24 illustrates an activity stack according to an embodiment of the present disclosure. FIG. 23A may be substantially identical to FIG. 21C and a left activity stack illustrated in FIG. 24 may describe the Z-orders of windows displayed in FIG. 23A.

Referring to FIG. 23A, the user 1 may input a Z-order change command to the first area by making a rightward flick gesture 2121 across the first area. A controller (not shown) may determine that application L has a lowest Z-order in the first area. The controller may assign the highest Z-order to application L as illustrated in a right activity stack illustrated in FIG. 24.

Referring to FIG. 23B, the controller may control display of a seventh window 2131 in the first area in order to execute application L.

Figure 25A:
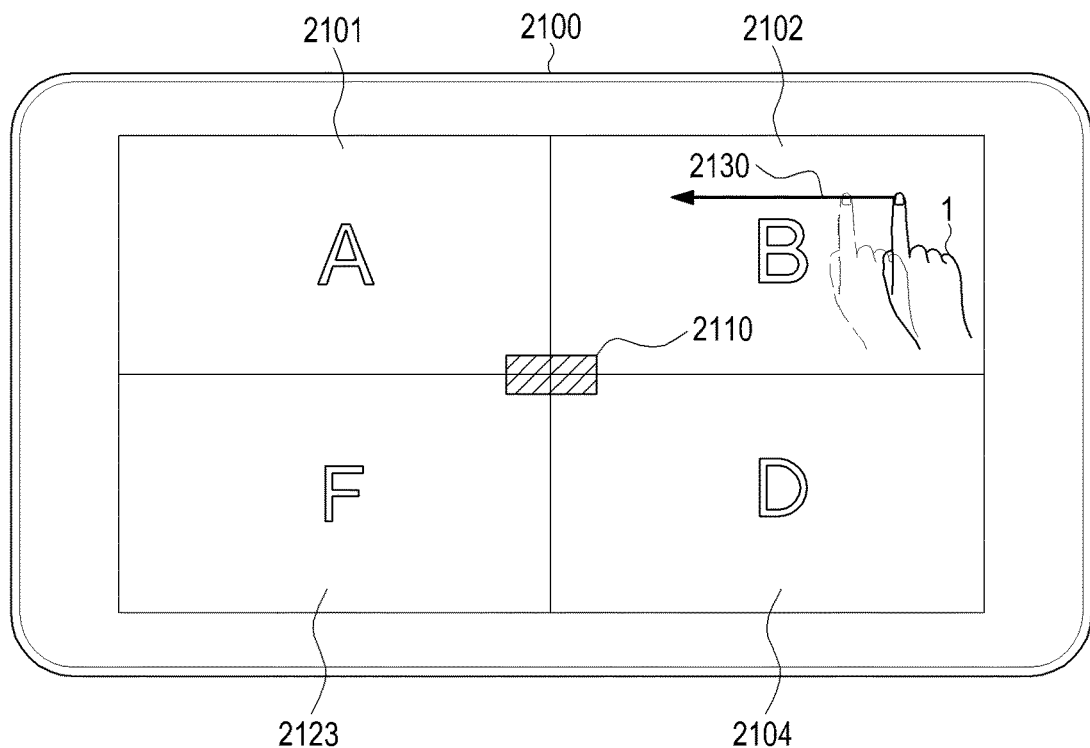
FIGS. 25A and 25B illustrate screens of display device describing a Z-order change command according to an embodiment of the present disclosure.
Figure 25B:
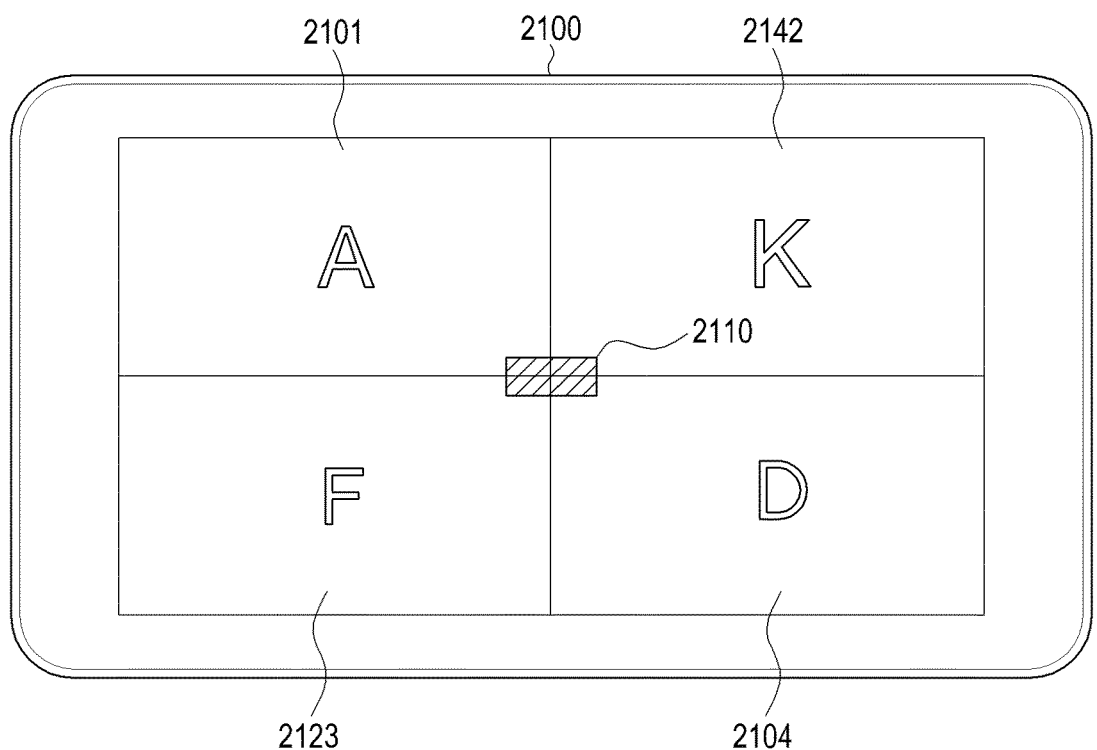
Figure 26:
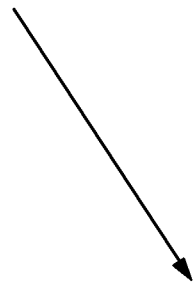
FIG. 26 illustrates an activity stack according to an embodiment of the present disclosure.

FIGS. 25A and 25B illustrate screens of a display device describing a Z-order change command according to an embodiment of the present disclosure. FIG. 26 illustrates an activity stack according to an embodiment of the present disclosure.

Referring to FIGS. 25A and 25B, the user 1 may input a Z-order change command to the second area by making a leftward flick gesture 2130 across the second area. A controller (not shown) may recognize the leftward flick gesture as the Z-order change command. The leftward flick gesture may be set as a command to assign a lowest Z-order to an application having a highest Z-order in a window display area. The leftward direction may be referred to as a second direction.

Thus, the controller may assign the lowest Z-order to an application having the highest Z-order in the second area, as illustrated in a right activity stack illustrated in FIG. 26. As application B is assigned the lowest Z-order, the controller may control assignment of the highest Z-order to application J in the second area.

Therefore, the controller may display of an eighth window 2142 in the second area in order to execute application K as illustrated in FIG. 25B. The resulting activity stack change is illustrated in FIG. 26.

As described before, the controller may recognize a leftward flick gesture as a command to assign a highest Z-order to an application having a lowest Z-order in a window display area. In addition, the controller may recognize a rightward flick gesture as a command to assign a lowest Z-order to an application having a second-highest Z-order in a window display area. Accordingly, a user can easily switch to the screen of an application having the lowest or highest Z-order.

Figure 27A:
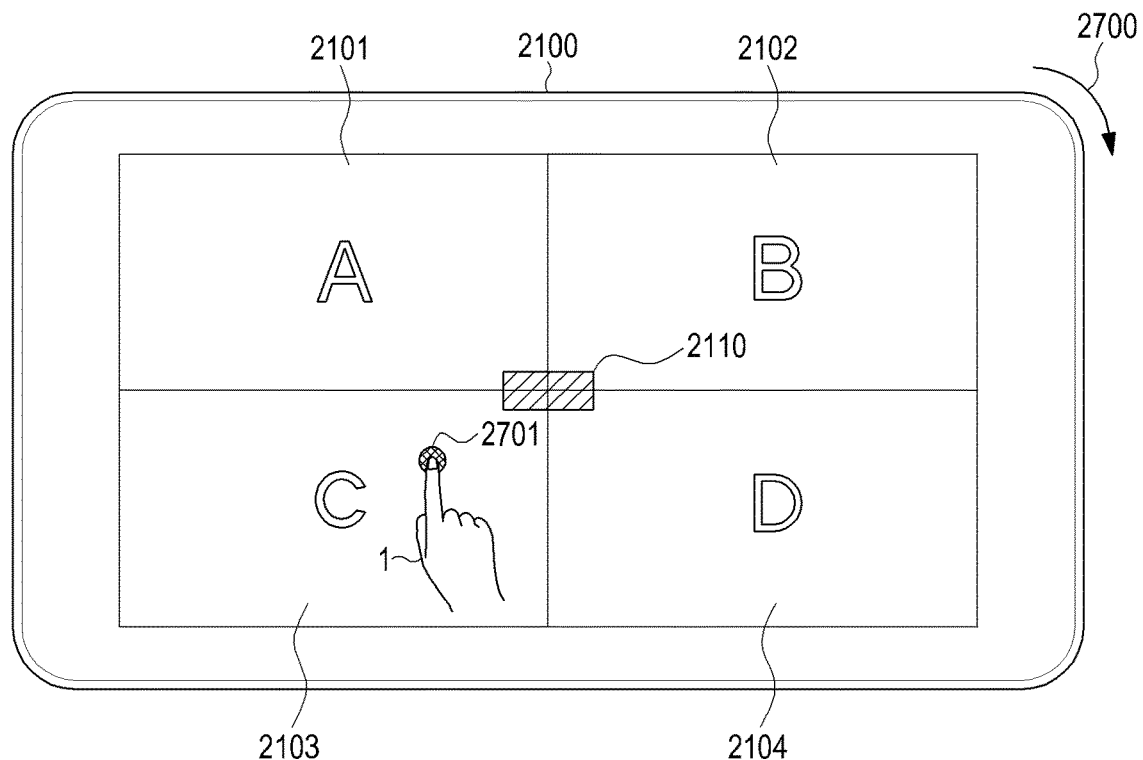
FIGS. 27A and 27B illustrate screens of a display device describing a Z-order change command according to an embodiment of the present disclosure.
Figure 27B:
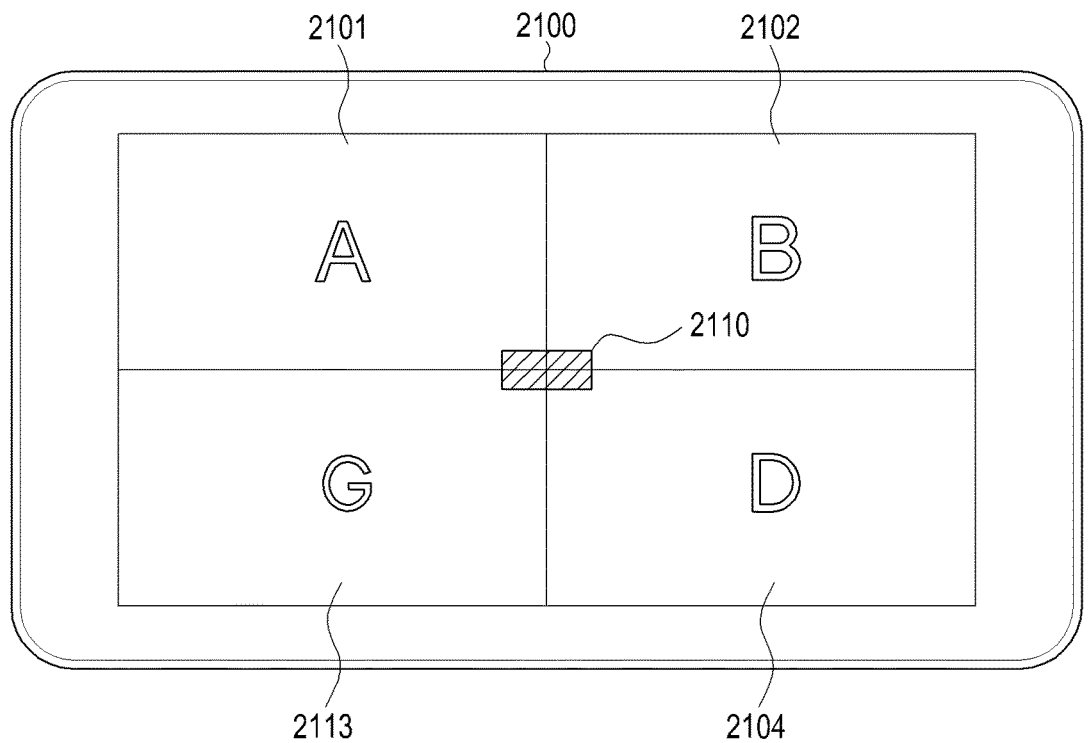

FIGS. 27A and 27B illustrate screens of a display device describing a Z-order change command according to an embodiment of the present disclosure. FIG. 28 illustrates an activity stack according to an embodiment of the present disclosure.

Referring to FIGS. 27A and 27B, the display device 2100 displays the first window 2101 in the first area to execute application A, the second window 2102 in the second area to execute application B, the third window 2103 in the third area to execute application C, and the fourth window 2104 in the fourth area to execute application D. The display device 2100 may manage an activity stack as illustrated in FIG. 28. The user 1 may input a Z-order change command to the third area. For example, the user 1 may make a rightward tilting gesture 2700, while touching the third area as indicated by reference numeral 2701. The controller may recognize the touch and rightward tilting gesture as a Z-order change command.

The controller may change Z-orders in the activity stack illustrated in FIG. 28 based on the Z-order change command, which has been described before with reference to FIG. 22 and thus, will not be described redundantly. The controller may control display of the fifth window 2113 in the third area in order to execute application G as illustrated in FIG. 27B.

Figure 29A:
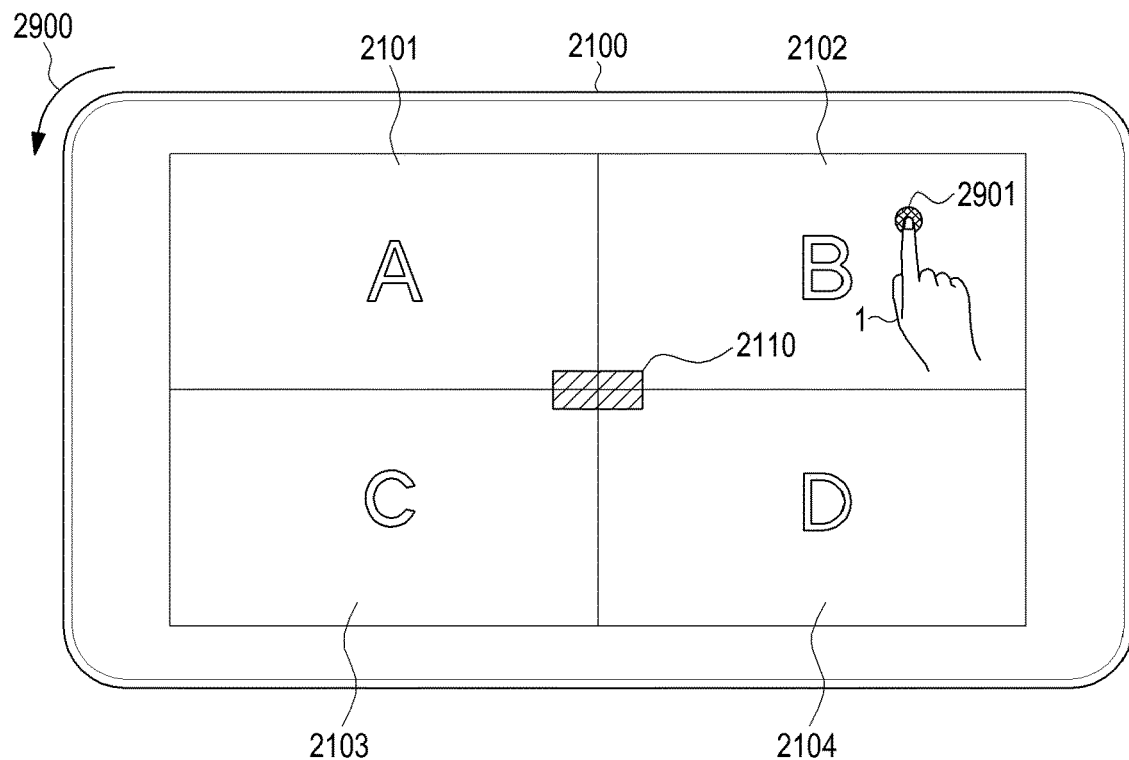
FIGS. 29A and 29B illustrate screens of a display device describing a Z-order change command according to an embodiment of the present disclosure.
Figure 29B:
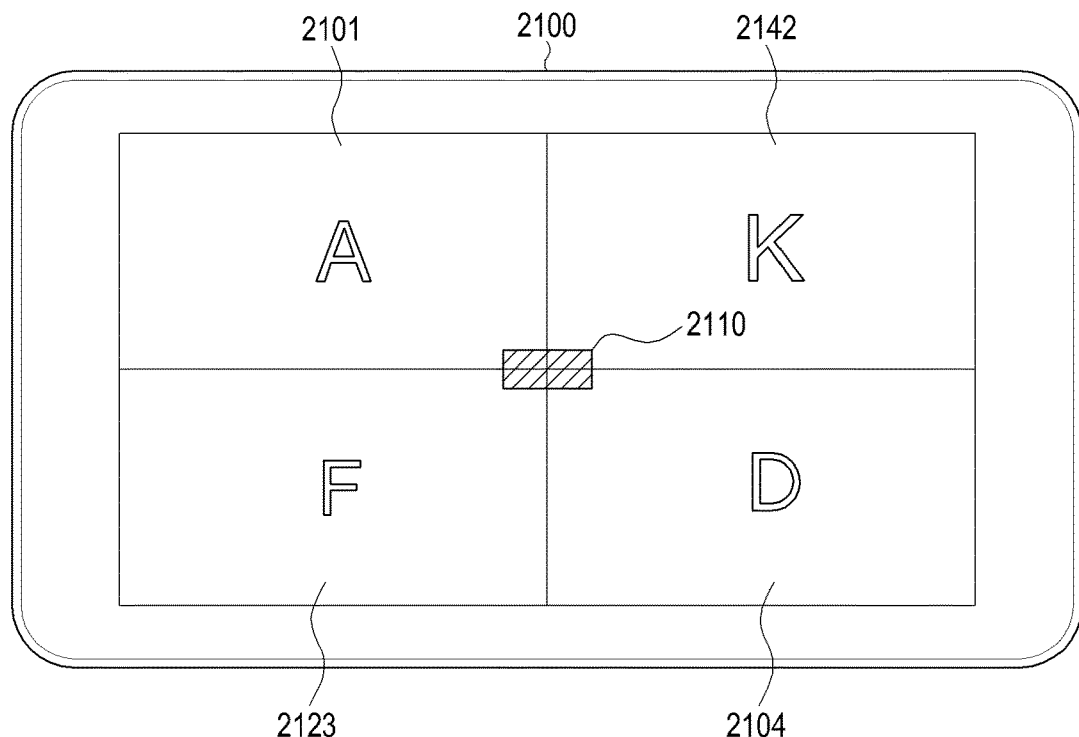

FIGS. 29A and 29B illustrate screens of a display device describing a Z-order change command according to an embodiment of the present disclosure.

Figure 30:
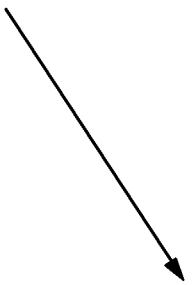
FIG. 30 illustrates an activity stack according to an embodiment of the present disclosure.

Referring to FIGS. 29A and 29B, the display device 2100 displays the first window 2101 in the first area to execute application A, the second window 2102 in the second area to execute application B, the third window 2103 in the third area to execute application C, and the fourth window 2104 in the fourth area to execute application D. The display device 2100 may manage an activity stack as illustrated in FIG. 30. The user 1 may input a Z-order change command to the second area. For example, the user 1 may make a leftward tilting gesture 2900, while touching the second area as indicated by reference numeral 2901. The controller may recognize the touch and leftward tilting gesture as a Z-order change command.

The controller may change Z-orders in an activity stack illustrated in FIG. 30 based on the Z-order change command, which has been described before with reference to FIG. 26 and thus, will not be described redundantly. The controller may control display of the eighth window 2142 in the second area in order to execute application K as illustrated in FIG. 29B.

Figure 31A:
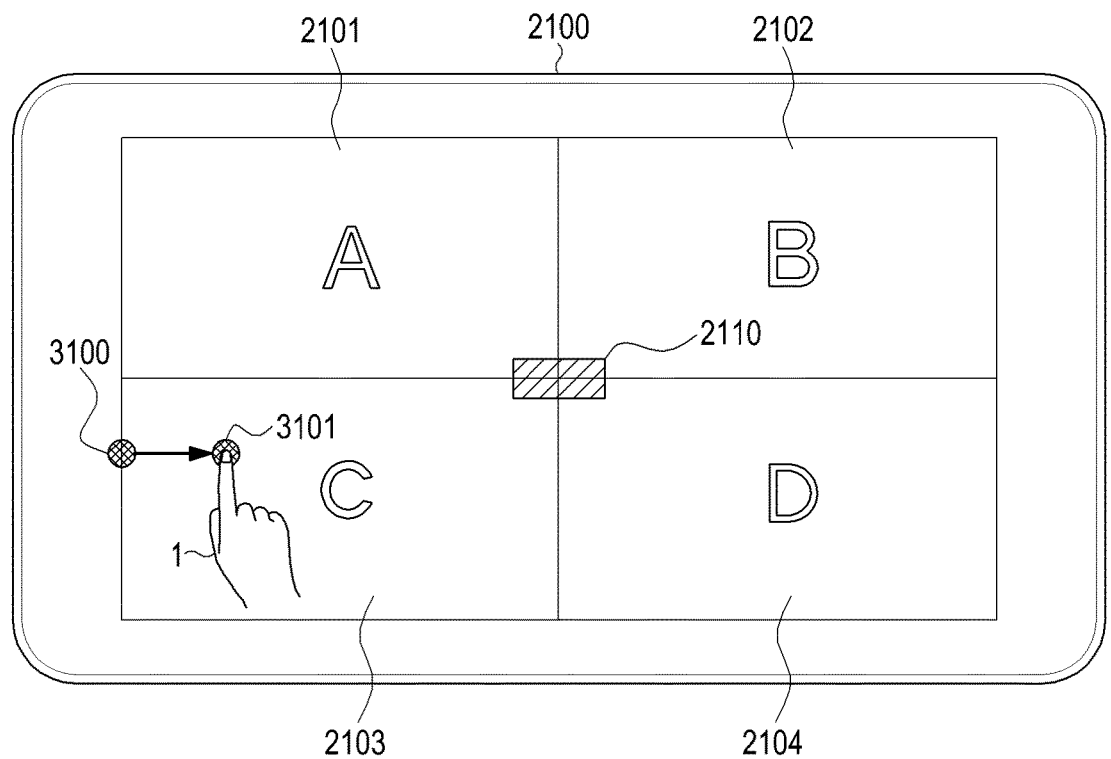
FIGS. 31A and 31B illustrate screens of a display device describing a Z-order change command according to an embodiment of the present disclosure.
Figure 31B:
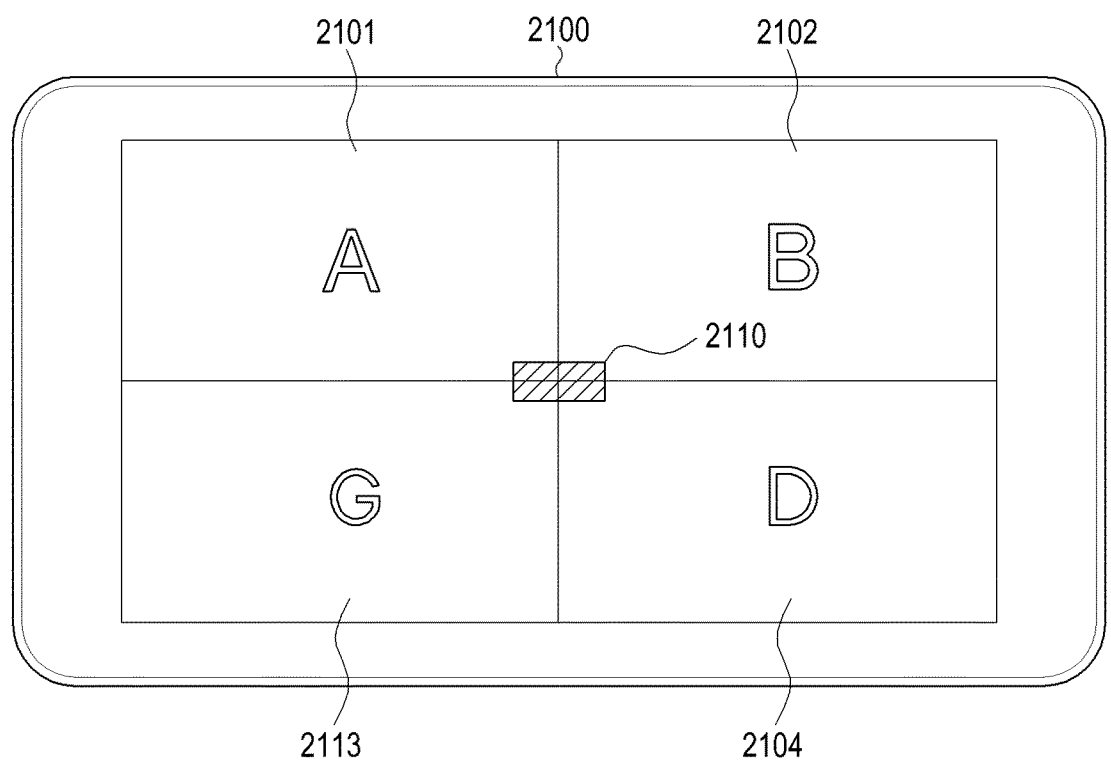
Figure 32:
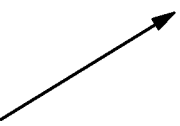
FIG. 32 illustrates an activity stack according to an embodiment of the present disclosure.

FIGS. 31A and 31B illustrate screens of a display device describing a Z-order change command according to an embodiment of the present disclosure. FIG. 32 illustrates an activity stack according to an embodiment of the present disclosure.

Referring to FIGS. 31A, 31B, and 32, the display device 2100 displays the first window 2101 in the first area to execute application A, the second window 2102 in the second area to execute application B, the third window 2103 in the third area to execute application C, and the fourth window 2104 in the fourth area to execute application D. The display device 2100 may manage an activity stack as illustrated in FIG. 32. The user 1 may input a Z-order change command to the third area. For example, the user 1 may touch a point 3100 in the third area and make a rightward edge flick gesture 3101 in the third area. The controller may recognize the rightward edge flick gesture as a Z-order change command.

The controller may change Z-orders in the activity stack illustrated in FIG. 32 based on the Z-order change command, which has been described before with reference to FIG. 22 and thus, will not be described redundantly. The controller may control display of the fifth window 2113 in the third area in order to execute application Gas illustrated in FIG. 31B.

Figure 33A:
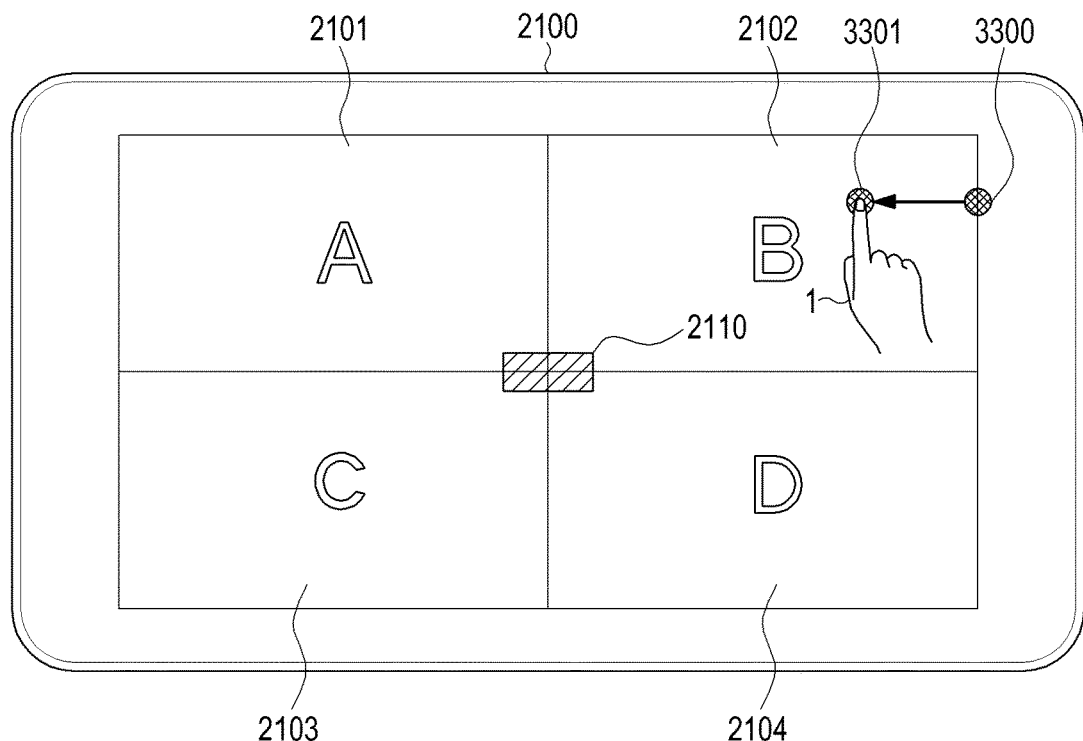
FIGS. 33A and 33B illustrate screens of a display device describing a Z-order change command according to an embodiment of the present disclosure.
Figure 33B:
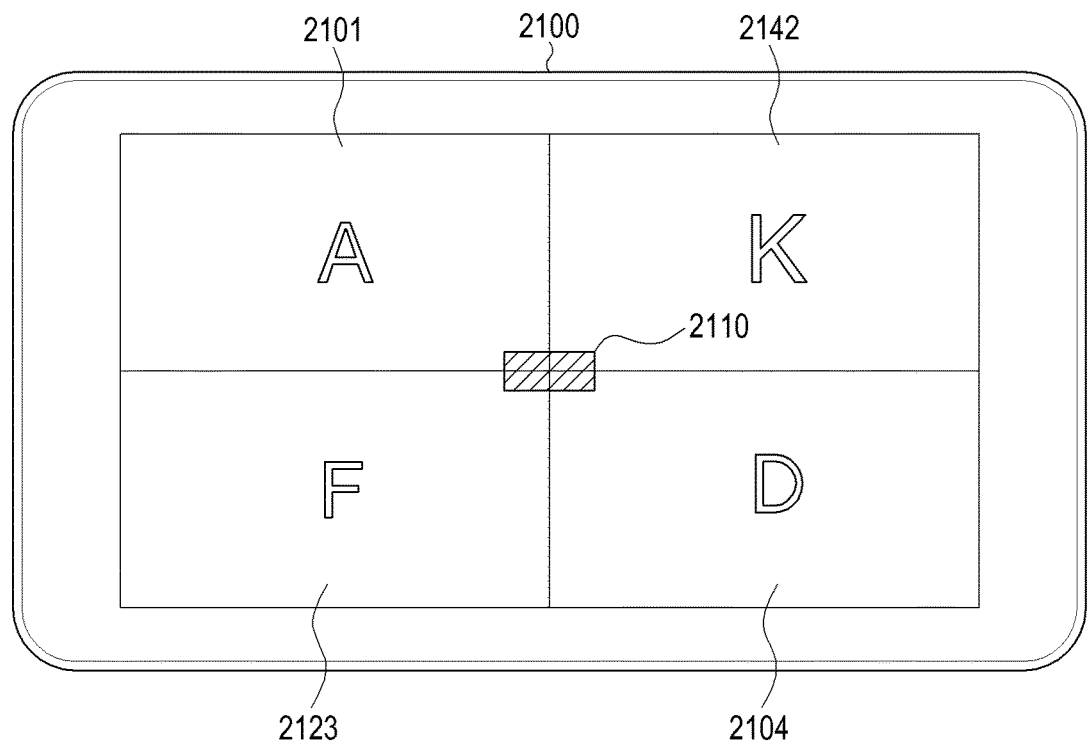
Figure 34:
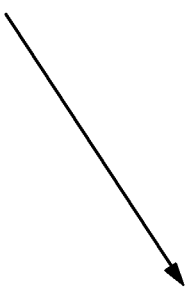
FIG. 34 illustrates an activity stack according to an embodiment of the present disclosure.

FIGS. 33A and 33B illustrate screens of a display device describing a Z-order change command according to an embodiment of the present disclosure. FIG. 34 illustrates an activity stack according to an embodiment of the present disclosure.

Referring to FIGS. 33A, 33B, and 34, the display device 2100 displays the first window 2101 in the first area to execute application A, the second window 2102 in the second area to execute application B, the third window 2103 in the third area to execute application C, and the fourth window 2104 in the fourth area to execute application D. The display device 2100 may manage an activity stack as illustrated in FIG. 34.

The user 1 may input a Z-order change command to the second area. For example, the user 1 may touch a point 3300 in the second area and make a leftward edge flick gesture 3301 in the second area. The controller may recognize the leftward edge flick gesture as a Z-order change command.

The controller may change Z-orders in the activity stack illustrated in FIG. 34 based on the Z-order change command, which has been described before with reference to FIG. 26 and thus, will not be described redundantly. The controller may control display of the eighth window 2142 in the second area in order to execute application K as illustrated in FIG. 33B.

The methods of changing a Z-order in a split mode have been described so far. Now, a description will be given of methods of changing a Z-order in a freestyle mode.

Figure 35:
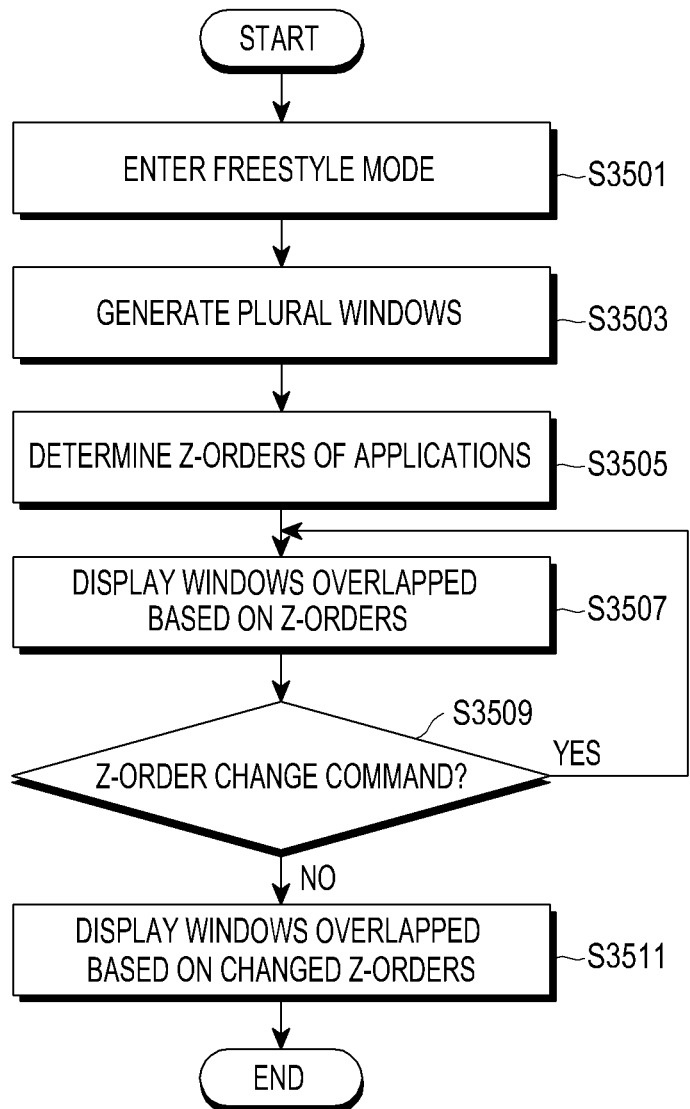
FIG. 35 is a flowchart illustrating a method for controlling a display device according to an embodiment of the present disclosure.

FIG. 35 is a flowchart illustrating a method for controlling a display device according to an embodiment of the present disclosure.

Referring to FIG. 35, a controller may set a layout in a freestyle mode in operation S3501. The controller may receive application execution commands and thus, may generate a plurality of windows to execute a plurality of applications in operation S3503. The controller may determine the Z-order of each of the plurality of windows in operation S3505 and may display the windows overlapped based on their Z-orders in operation S3507.

The controller may determine whether a Z-order change command has been received in operation S3509. Upon receipt of the Z-order change command, the controller may control display of the windows overlapped according to a changed Z-order in operation S3511.

Figure 36A:
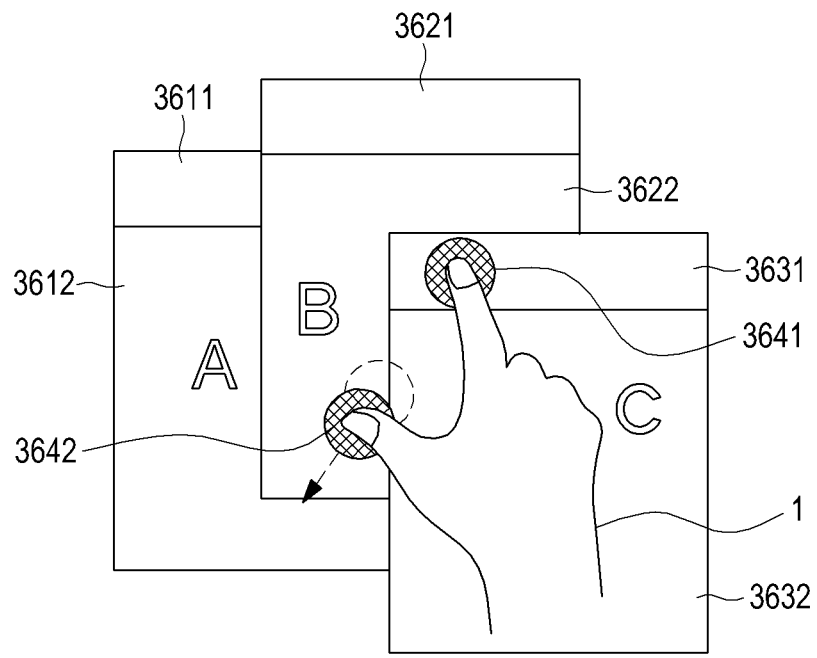
FIGS. 36A, 36B, and 36C illustrate screens of a display device describing a Z-order change command according to an embodiment of the present disclosure.
Figure 36B:
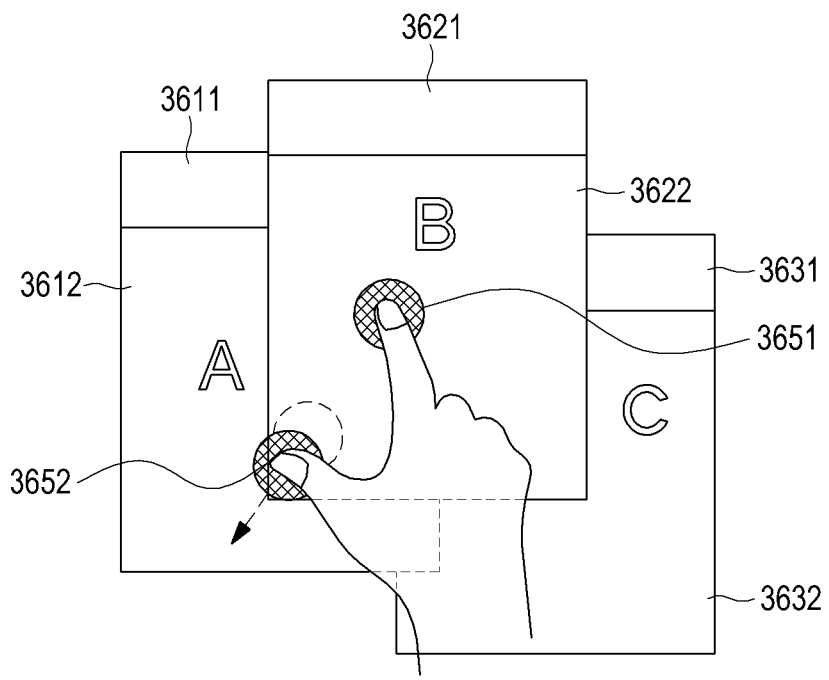
Figure 36C:
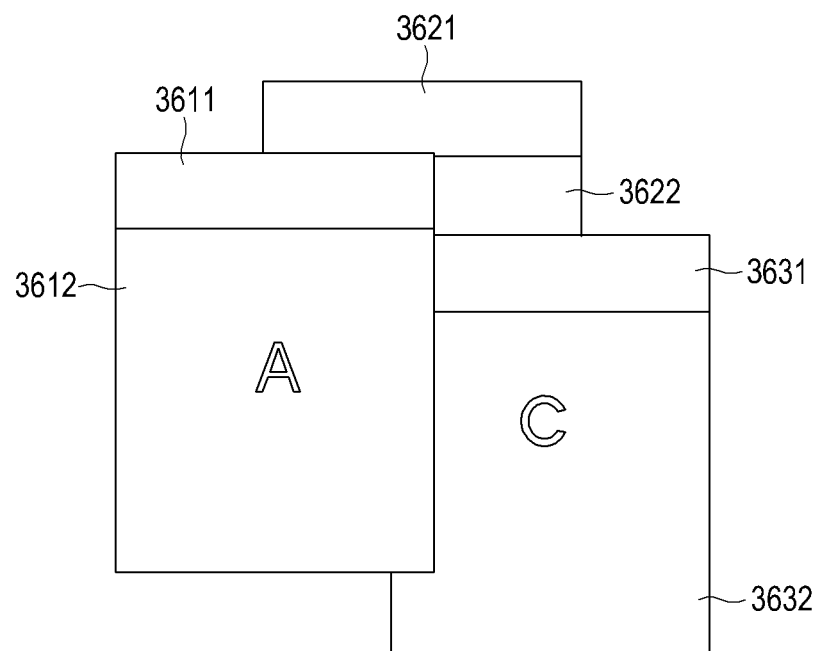
Figure 37A:
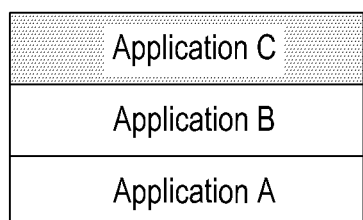
FIGS. 37A, 37B, and 37C illustrate activity stacks according to embodiments of the present disclosure.
Figure 37B:
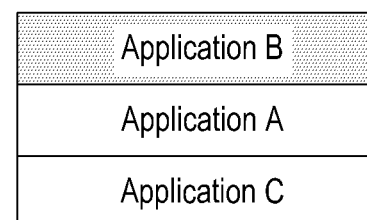
Figure 37C:
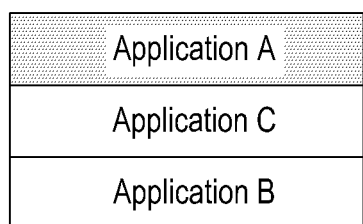

FIGS. 36A, 36B, and 36C illustrate screens of a display device describing a Z-order change command according to an embodiment of the present disclosure and FIGS. 37A, 37B, and 37C illustrate activity stacks according to embodiments of the present disclosure.

Referring to FIGS. 36A, 36B, 36C, 37A, 37B, and 37C, the controller may manage the activity stack illustrated in FIG. 37A. For example, the controller may assign a lowest Z-order to window A that executes application A, a middle Z-order to window B that executes application B, and a highest Z-order to window C that executes application C. Accordingly, the controller may control display of the windows in the order of window C 3631 and 3632, window B 3621 and 3622, and window A 3611 and 3612, as illustrated in FIG. 36A.

The user 1 may input a Z-order change command. The Z-order change command may be triggered by a pinch-out gesture 3642 to the left, while a title bar 3631 is touched in window C, as indicated by reference numeral 3641. Pinch-out may be a gesture of spreading two touched points. In this case, the Z-order of window C 3631 and 3632 may be reset to the lowest Z-order. As a result, the controller assigns the middle Z-order to window A, the highest Z-order to window B, and the lowest Z-order to window C. For example, the controller may assign the lowest Z-order to window C, while increasing the Z-orders of the other windows by 1. Therefore, the controller may control display of the windows in the order of window B 3621 and 3622, window A 3611 and 3612, and window C 3631 and 3632. Pinch-out is a Z-order change command and thus, it will be readily understood to those skilled in the art that the Z-order change command may be triggered by various gestures including flick, drag, edge flick, touch and tilt, tilt, and shake.

The user 1 may input a Z-order change command. The Z-order change command may be triggered by a pinch-out gesture 3652 to the left, while an application execution screen 3632 is touched in window C, as indicated by reference numeral 3651. In this case, the Z-order of window C 3631 and 3632 may be reset to the lowest Z-order. As a result, the controller assigns the highest Z-order to window A, the lowest Z-order to window B that executes application B, and the middle Z-order to window C that executes application C. For example, the controller may assign the lowest Z-order to window B, while increasing the Z-orders of the other windows by 1. Therefore, the controller may control display of the windows in the order of window A 3611 and 3612, window C 3631 and 3632, and window B 3621 and 3622.

Figure 38A:
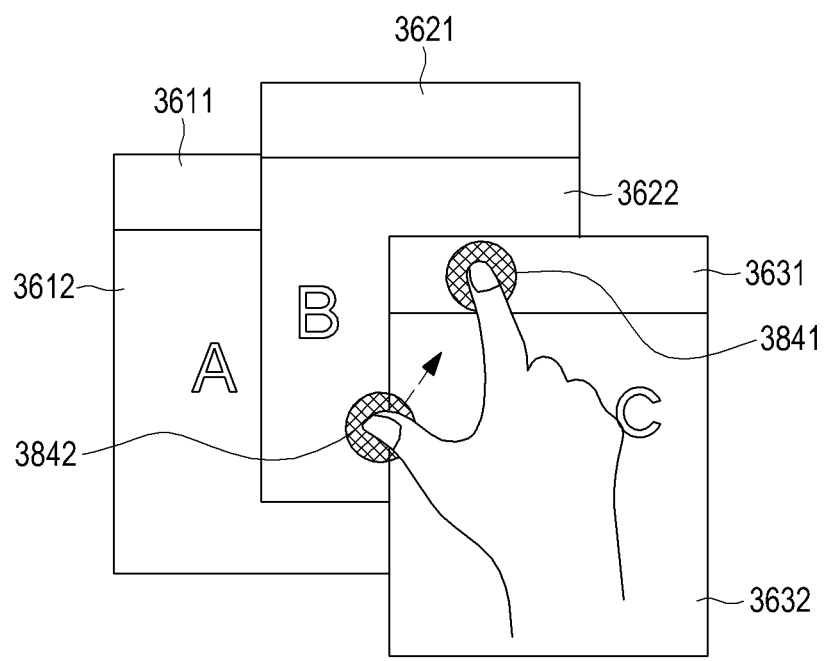
FIGS. 38A, 38B, and 38C illustrate screens of a display device describing a Z-order change command according to an embodiment of the present disclosure.
Figure 38B:
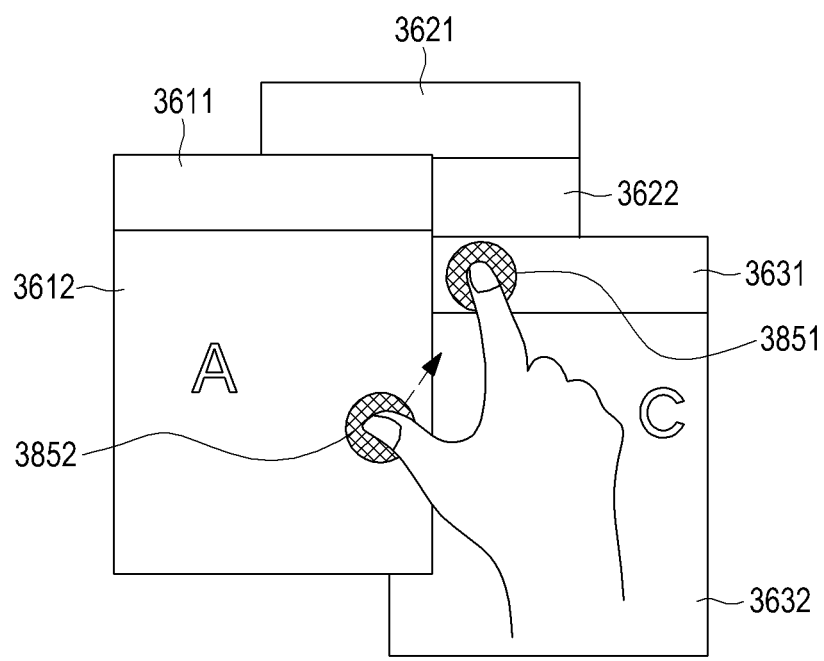
Figure 38C:
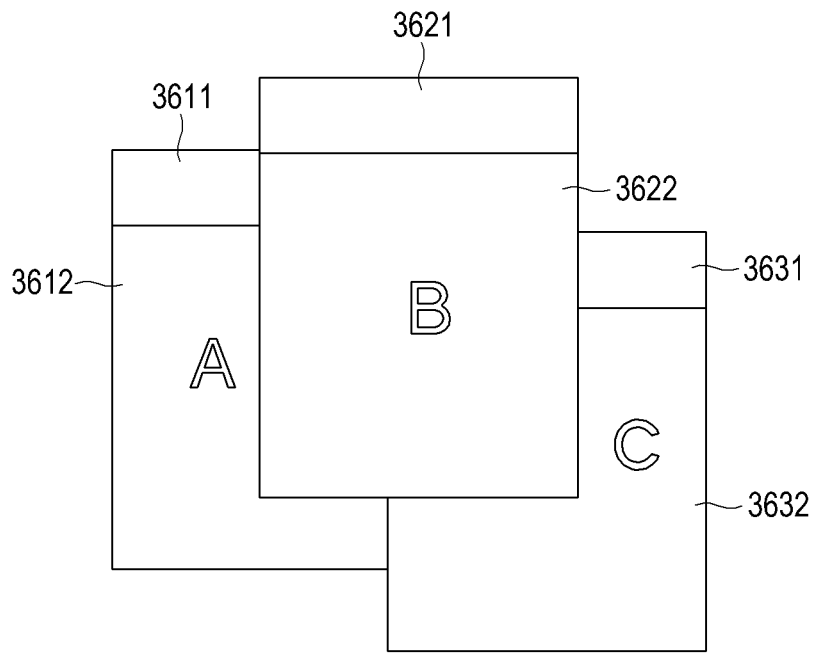
Figure 39A:
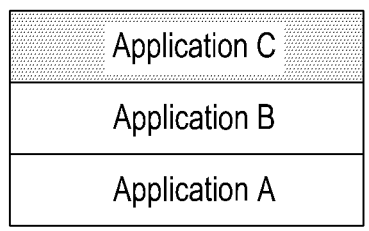
FIGS. 39A, 39B, and 39C illustrate activity stacks according to embodiments of the present disclosure.
Figure 39B:
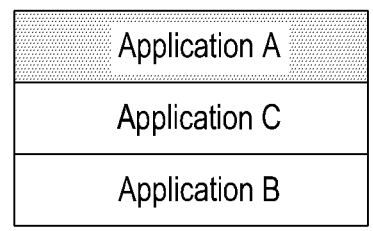
Figure 39C:
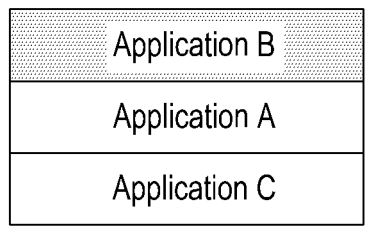

FIGS. 38A, 38B, and 38C illustrate screens of a display device describing a Z-order change command according to an embodiment of the present disclosure and FIGS. 39A, 39B and 39C illustrate activity stacks according to embodiments of the present disclosure.

Referring to FIGS. 38A, 38B, 38C, 39A, 39B, and 39C, the controller may manage the activity stack illustrated in FIG. 39A. For example, the controller may assign a lowest Z-order to window A that executes application A, a middle Z-order to window B that executes application B, and the highest Z-order to window C that executes application C. Accordingly, the controller may control display of the windows in the order of window C 3631 and 3632, window B 3621 and 3622, and window A 3611 and 3612, as illustrated in FIG. 38A.

The user 1 may input a Z-order change command. The Z-order change command may be triggered by a pinch-in gesture 3842 from the left, while the title bar 3631 is touched in window C, as indicated by reference numeral 3841. Pinch-in may be a gesture of narrowing the distance between two touched points. In this case, the Z-order of window A 3631 and 3632 having the lowest Z-order may be reset to the highest Z-order, while decreasing the Z-orders of the other windows by 1. Therefore, the controller may assign the highest Z-order to window A, the lowest Z-order to window B that executes application B, and the middle Z-order to window C that executes application C, as illustrated in FIG. 39B.

As illustrated in FIG. 38B, the controller may control display of the windows in the order of window A 3611 and 3612, window C 3631 and 3632, and window B 3621 and 3622. The user 1 may input a Z-order change command. The Z-order change command may be triggered by a pinch-in gesture 3852 from the left, while the title bar 3631 is touched in window C, as indicated by reference numeral 3851. In this case, the Z-order of window B 3621 and 3622 having the lowest Z-order may be reset to the highest Z-order, while the Z-orders of the other windows are decreased by 1. As a result, the controller may assign the middle Z-order to window A that executes application A, the highest Z-order to window B that executes application B, and the lowest Z-order to window C that executes application C, as illustrated in FIG. 39C.

Therefore, the controller may control display of the windows in the order of window B 3621 and 3622, window A 3611 and 3612, and window C 3631 and 3632.

As described above, upon receipt of a Z-order change command by a pinch-out gesture, the controller may assign the lowest Z-order to a window having the highest Z-order. On the contrary, upon receipt of a Z-order change command by a pinch-in gesture, the controller may assign the highest Z-order to a window having the lowest Z-order. Since a user can change the Z-orders of windows through a simple manipulation, an intended window appears in the top layer of a screen. Therefore, user convenience can be increased.

FIGS. 40A, 40B, 40C, 40D, 40E, 40F, 40G, 40H, 40I, 40J, and 40K illustrate a method for displaying an application execution window according to an embodiment of the present disclosure.

Figure 40A:
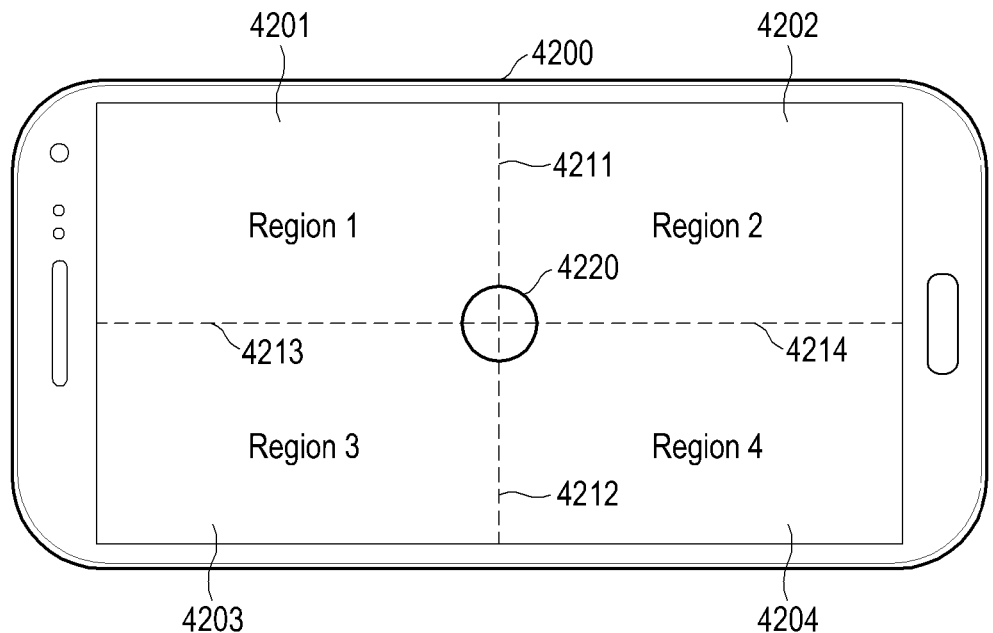
FIGS. 40A, 40B, 40C, 40D, 40E, 40F, 40G, 40H, 40I, 40J, and 40K illustrate a method for displaying an application execution window according to an embodiment of the present disclosure.

Referring to FIGS. 40A, 40B, 40C, 40D, 40E, 40F, 40G, 40H, 40I, 40J, and 40K, a display device 4200 may define a plurality of regions 4201, 4202, 4203, and 4204 on a touch screen. For convenience of describing FIG. 40A and subsequent drawings, the plurality of regions 4201, 4202, 4203, and 4204 are referred to as first, second, third, and fourth regions 4201, 4202, 4203, and 4204 (Region 1, Region 2, Region 3, and Region 4), respectively. Both the first and third regions 4201 and 4203 form a fifth region (Region 5, not shown) and both the second and fourth regions 4202 and 4204 form a sixth region (Region 6, not shown). Both the first and second regions 4201 and 4202 form a seventh region (Region 7, not shown) and both the third and fourth regions 4203 and 4204 form an eighth region (Region 8, not shown). The first to fourth regions 4201, 4202, 4203, and 4204 form Region F. A first boundary 4211 may be set between the first and second regions 4201 and 4202, a second boundary 4212 may be set between the third and fourth regions 4203 and 4204, a third boundary 4213 may be set between the first and third regions 4201 and 4203, and a fourth boundary 4214 may be set between the second and fourth regions 4202 and 4204. The first and second boundaries 4211 and 4212 may form a single line, and the third and fourth boundaries 4213 and 4214 may form a single line. The first to fourth boundaries 4211 to 4214 are not necessarily to be displayed explicitly. Rather, the first to fourth boundaries 4211 to 4214 may be virtual lines. A controller (not shown) may configure the first to fourth regions 4201, 4202, 4203, and 4204 in such a manner that the first to fourth regions 4201, 4202, 4203, and 4204 are not overlapped. For example, as illustrated in FIG. 40A, the controller may configure the first region 4201 at an upper left-hand corner, the second region 4202 at an upper right-hand corner, the third region 4203 at a lower left-hand corner, and the fourth region 4204 at a lower right-hand corner. The controller may divide the screen into left and right parts by the first and second boundaries 4211 and 4212 and into upper and lower parts by the third and fourth boundaries 4213 and 4214.

The touch screen may display a center button 4220 at an intersection where the first to fourth boundaries 4211 to 4214 meet. The center button 4220 may be a function key that changes the size of a region in which to display an application execution window or that sets an operation mode of controlling an execution window.

The controller may control the touch screen in such a manner that an application execution window is displayed in each of a plurality of regions. For example, the controller may control the touch screen so that a window displaying an executed application, that is, an application execution window is displayed in each of the regions 4201, 4202, 4203, and 4204, as illustrated in FIGS. 40B, 40C, 40D, 40E, 40F, 40G, 40H, 40I, 40J, and 40K.

Objects related to the application may be displayed on the execution screen of the application. The objects may take various forms, such as text, a figure, an icon, a button, a check box, a photo, a video, a Web page, a map, and the like. When a user touches an object, a function or event corresponding to the touched object may be executed in the application. An object may be called a view according to an OS. For example, at least one of a capture button that captures an execution window to control display of the execution window, a minimize button that minimizes the size of an execution window, a maximize button that maximizes the size of an execution window, and an exit button that ends an execution window may be displayed.

Figure 40B:
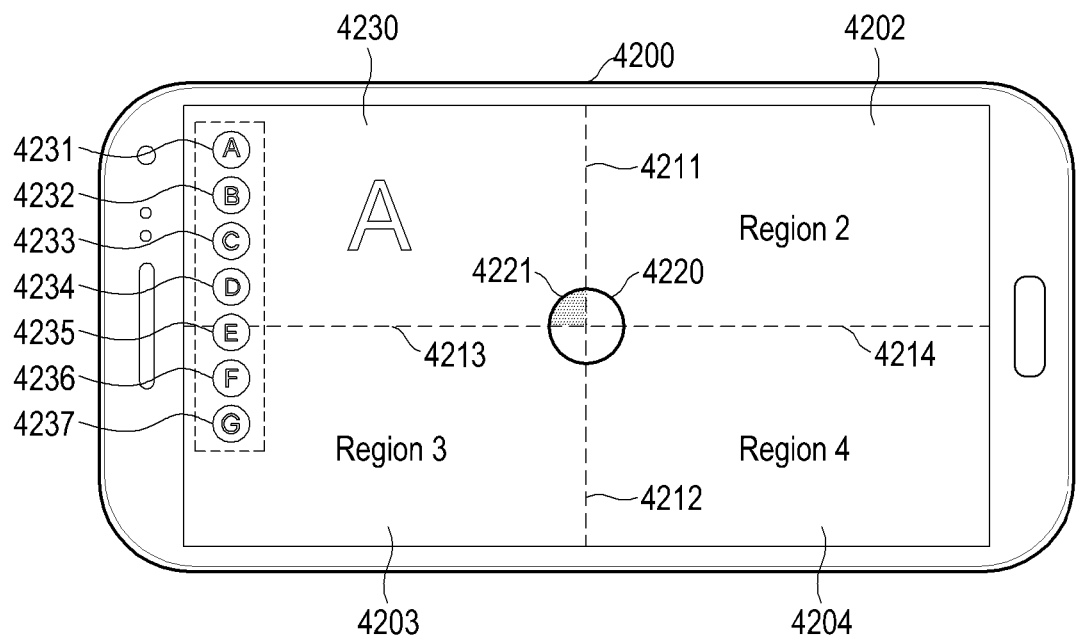

Referring to FIG. 40B, the controller may control display of icons 4231, 4232, 4233, 4234, 4235, 4236, and 4237 representing executable applications on the touch screen. The display device 4200 may execute application A. As illustrated in FIG. 40B, in response to the execution of application A, the controller may control the touch screen to display an execution window 4230 of application A in the first region 4201. In addition, the controller may control display of the icons 4231, 4232, 4233, 4234, 4235, 4236, and 4237 representing the executable applications at a specific position of the touch screen. Upon receipt of a touch input to one of the icons 4231, 4232, 4233, 4234, 4235, 4236, and 4237, that is, upon receipt of an input that selects an icon representing an application to be executed, the display device 4200 may display an execution window of the application corresponding to the selected icon in one of the first to fourth regions 4201, 4202, 4203, and 4204.

The controller may display an indicator 4221 indicating an active region, on the displayed center button 4220. The active region may be a region in which an execution window of a last executed application or a last application selected by a user is displayed. A user-manipulated application may be considered to be a user-selected application.

The indicator 4221 may be implemented in various manners to indicate the position of an active region. For example, at least a part of an application execution window displayed in an active region may be displayed in an area overlapped between the application execution window of the active region and the center button 4220. Alternatively, an arrow indicating the direction of an active region may be displayed on the center button 4220.

The active region may be determined based on an activity stack. The last executed application or the last user-selected application may be placed on the top of the activity stack. The display device 4200 may determine, as an active region, a region in which an execution window of an application on the top of the activity stack is displayed. The active region may be referred to as a focused region. For example, the indicator 4221 may indicate the first region 4201 in FIG. 40B.

FIGS. 41A, 41B, 41C, 41D, 41E, and 41F illustrate activity stacks according to various embodiments of the present disclosure.

Figure 41A:
FIGS. 41A, 41B, 41C, 41D, 41E, and 41F illustrate activity stacks according to various embodiments of the present disclosure.

Referring to FIG. 41A, it illustrates an activity stack managed by the display device 4200. The controller may generate and manage an activity 4301 for application A in the activity stack, in response to execution of application A.

Figure 40C:
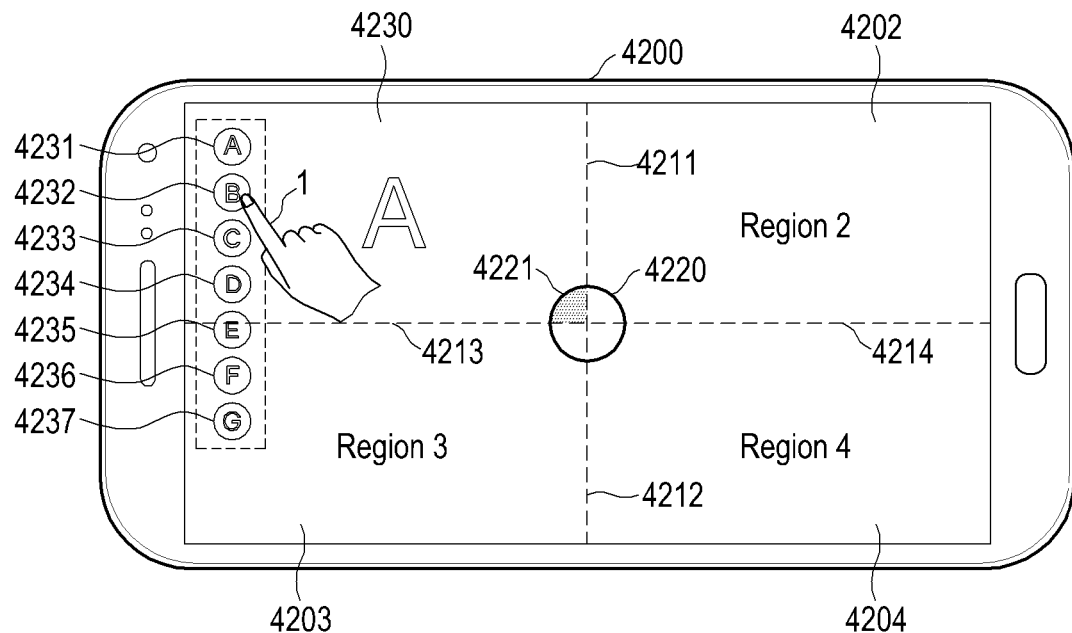
Figure 40D:
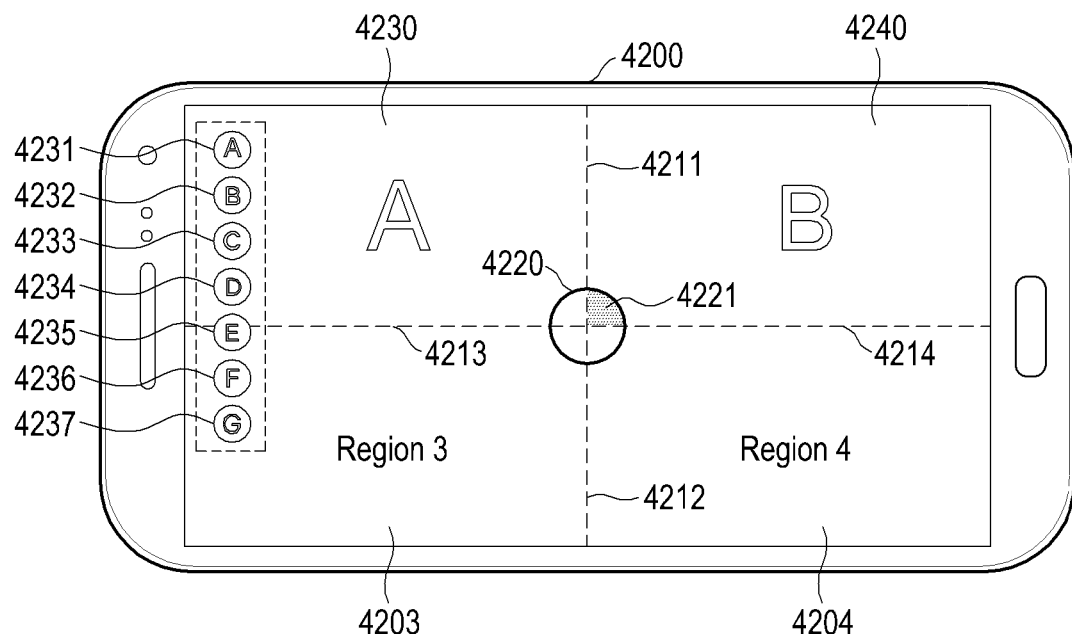

Referring to FIG. 40C, the user 1 may touch the icon 4232 representing application B. When the icon 4232 representing application B is touched, the controller controls display of an execution window 4240 of application B in the second region 4202, as illustrated in FIG. 40D. The controller may determine a region in which to display an execution window according to a certain order. For example, the controller may control display of new execution windows in the order of the second, third, and fourth regions 4202, 4203 and 4204. The aforementioned execution window display order is merely one example and thus the order of displaying new execution windows in the regions 4201, 4202, 4203, and 4204 may be changed according to various embodiments of the present disclosure.

As the execution window 4240 of application B is displayed in the second region 4202, the indicator 4221 may indicate the second region 4202 in FIG. 40D.

Figure 41B:
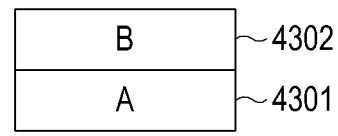

Referring to FIG. 41B, it illustrates an activity stack corresponding to FIG. 40D. The controller generates an activity 4301 for application B in the activity stack in response to execution of application B. The controller may place the activity 4302 of the latest executed application B on the activity 4301 of application A.

Figure 40E:
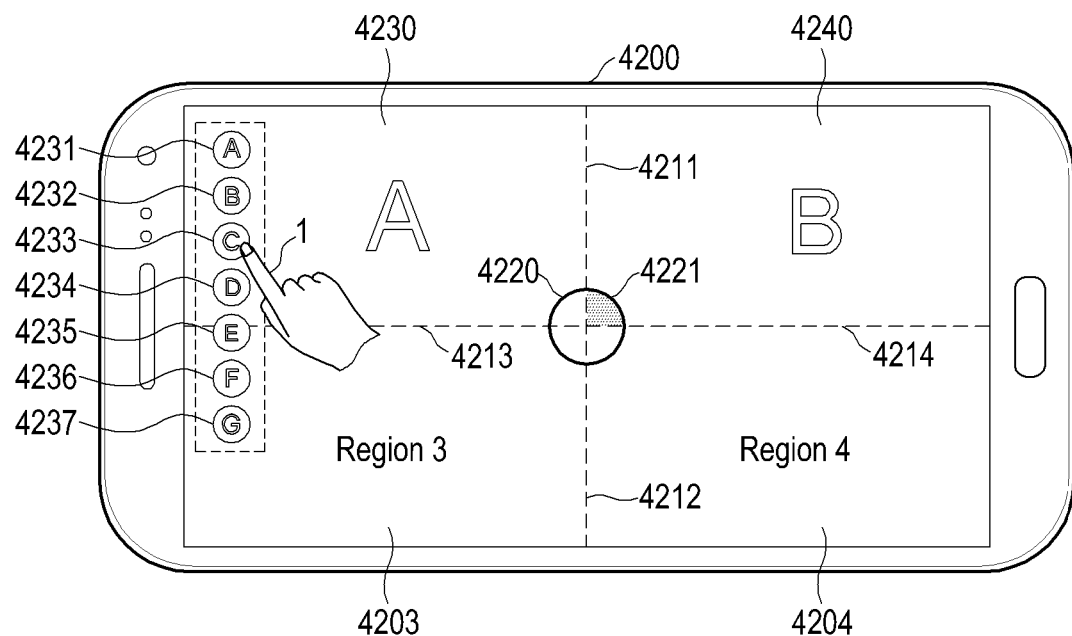
Figure 40F:
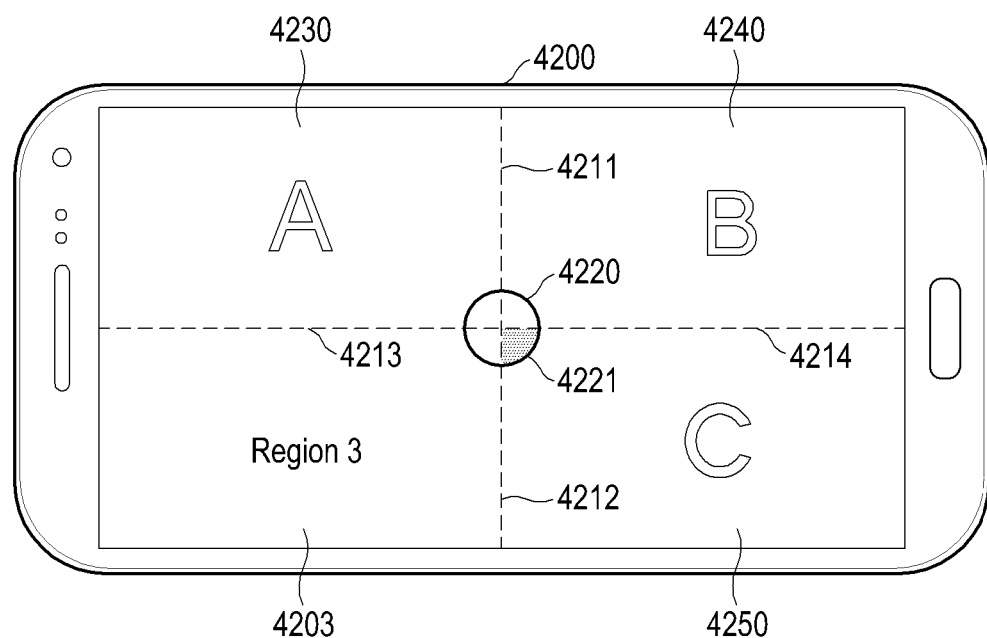

Referring to FIG. 40E, the user 1 may touch the icon 4233 corresponding to application C. When the icon 4233 representing application C is touched, the controller controls display of an execution window 4250 of application C in the fourth region 4204, as illustrated in FIG. 40F. Along with the display of the execution window 4250 of application C in the fourth region 4204, the indicator 4221 may indicate the fourth region 4204.

Figure 41C:
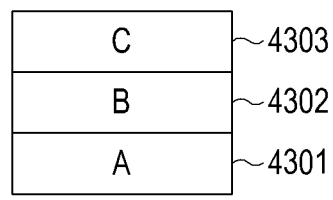

FIG. 41C illustrates an activity stack corresponding to FIG. 40F. The controller generates an activity 4303 for application C in the activity stack in response to execution of application C. The controller places the activity 4303 of the latest executed application C on the top of the activity stack.

Figure 40G:
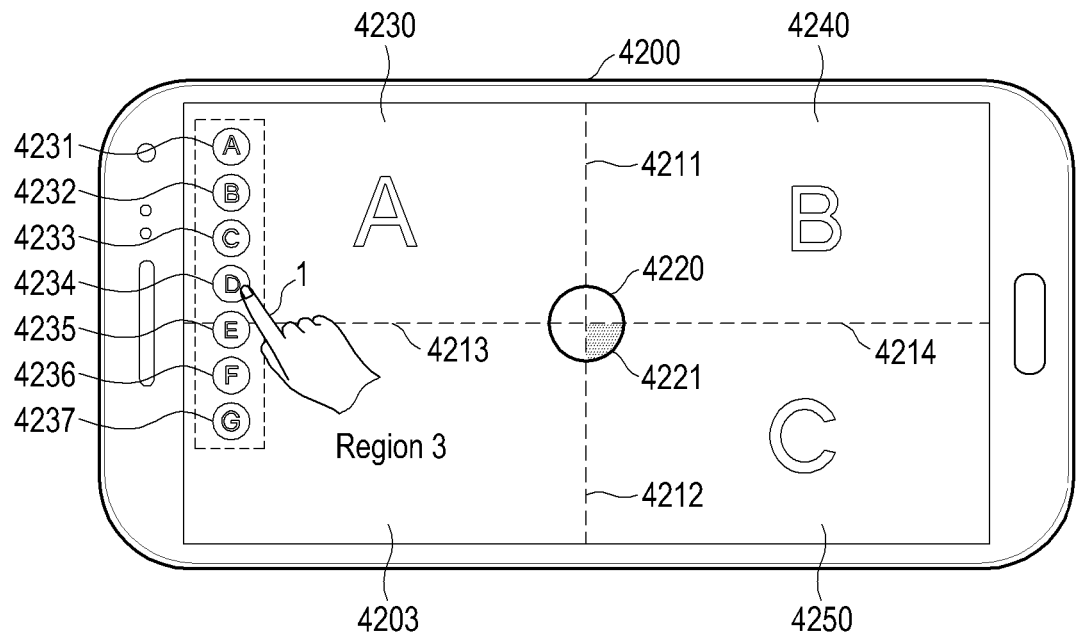
Figure 40H:
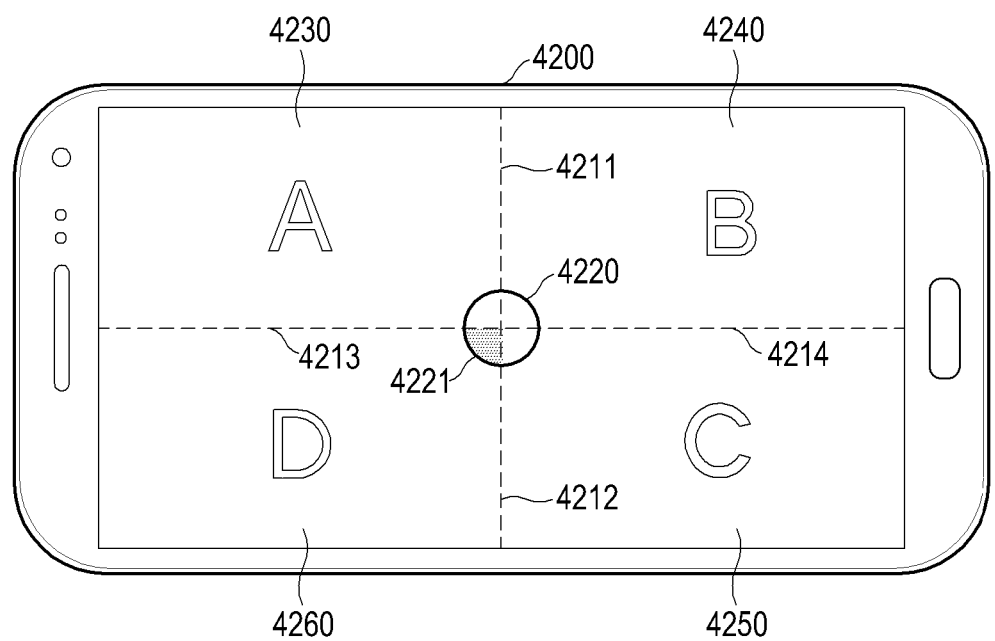

Referring to FIG. 40G, the user 1 may touch the icon 4234 representing application D. When the icon 4234 representing application D is touched, the controller controls display of an execution window 4260 of the application D in the third region 4203, as illustrated in FIG. 40H. As the execution window 4260 of application D is displayed in the third region 4203, the indicator 4221 on the center button 4220 may indicate the third region 4203.

Figure 41D:
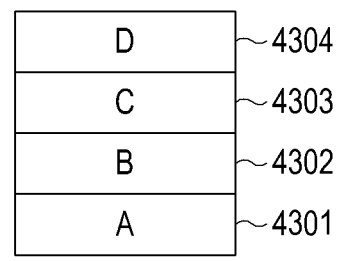

FIG. 41D illustrates an activity stack corresponding to FIG. 40H. The controller generates an activity 4304 for application D in the activity stack in response to execution of application D. The controller places the activity 4304 of the latest executed application D on the top of the activity stack.

Figure 40I:
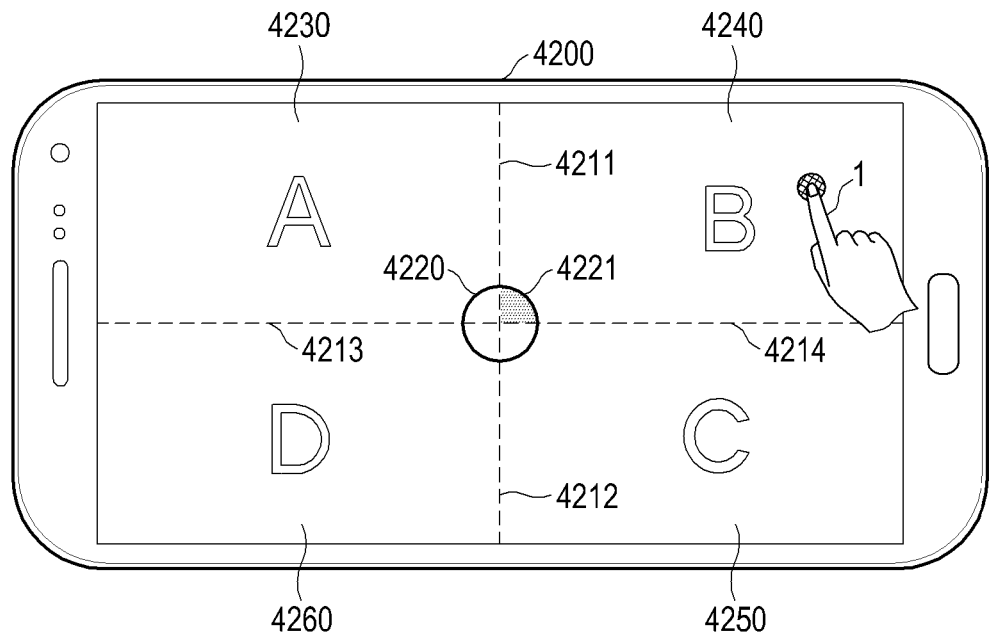
Figure 41E:
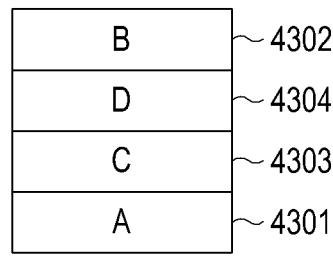

Referring to FIG. 40I, the user 1 may manipulate application B. FIG. 41E illustrates an activity stack corresponding to FIG. 40I. The controller moves the activity 4302 of application B to the top of the activity stack in response to the user input to the execution window 4240 of application B.

Upon receipt of the user input to the execution window 4240 of application B, the controller may determine the second region 4202 to be an active region, as illustrated in FIG. 40I. Therefore, the indicator 4221 on the center button 4220 may indicate the second region 4202.

Figure 40J:
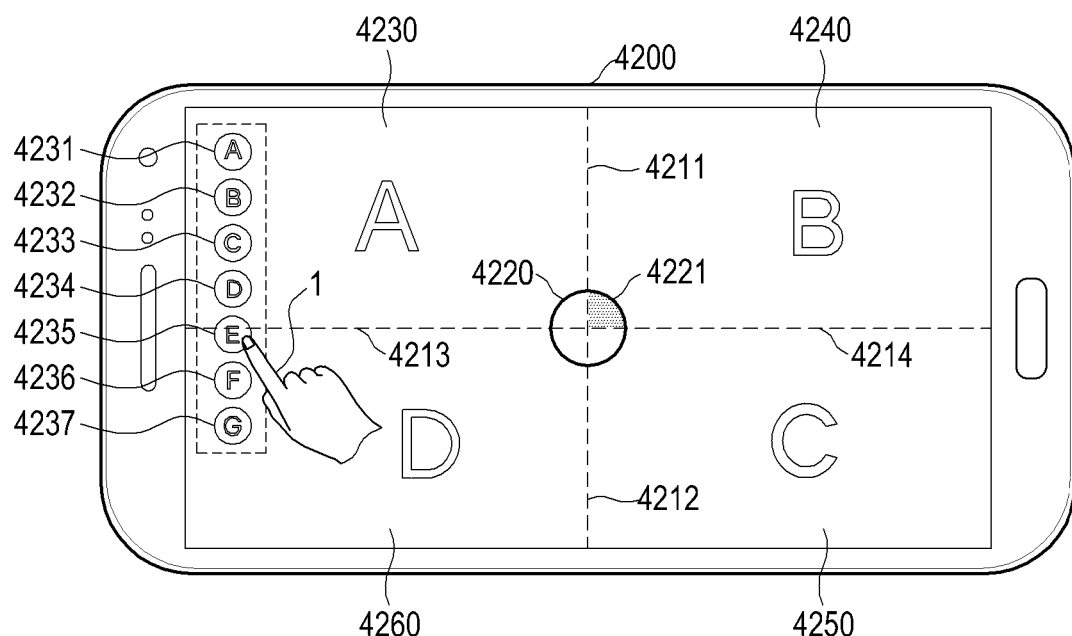
Figure 40K:
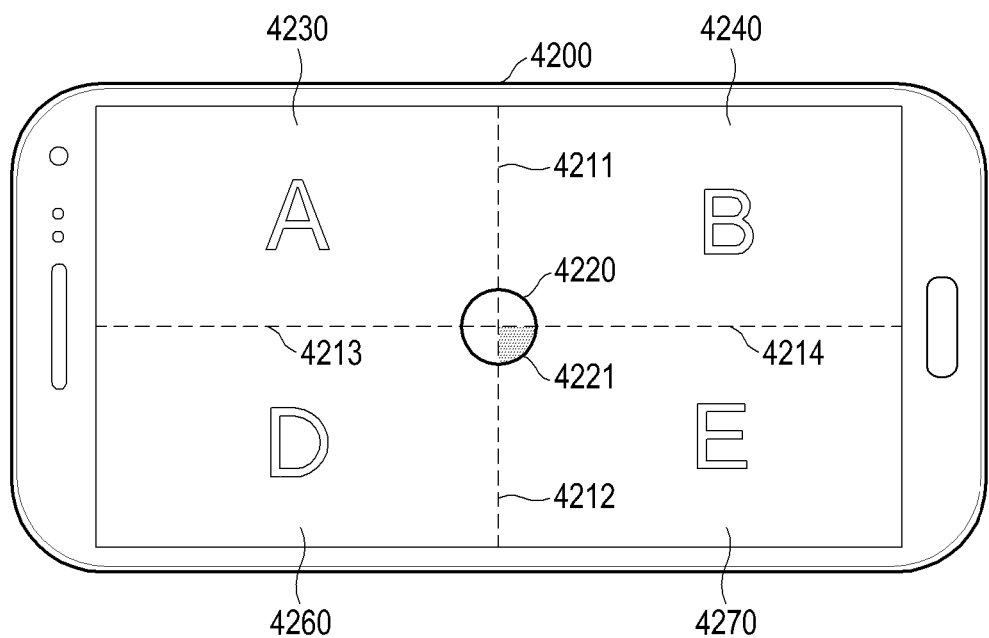

Referring to FIG. 40J, the user 1 may touch the icon 4235 representing application E. When the icon 4235 representing application E is touched, the controller controls display of an execution window 4270 of application E in the fourth region 4204 on the touch screen, as illustrated in FIG. 40K. In the absence of an empty region, the controller may refer to the activity stack illustrated in FIG. 41E. The controller may select the lowest application activity from the activity stack and may display the execution window 4270 of application E, substituting for application C corresponding to the lowest activity, in the fourth region 4204.

Figure 41F:
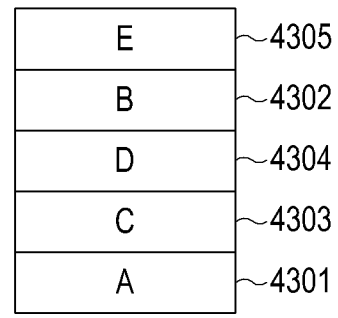

FIG. 41F illustrates an activity stack corresponding to FIG. 40K. The controller generates an activity 4305 for application E in the activity stack in response to execution of application E. The controller places the activity 4305 of the latest executed application E on the top of the activity stack.

Figure 42:
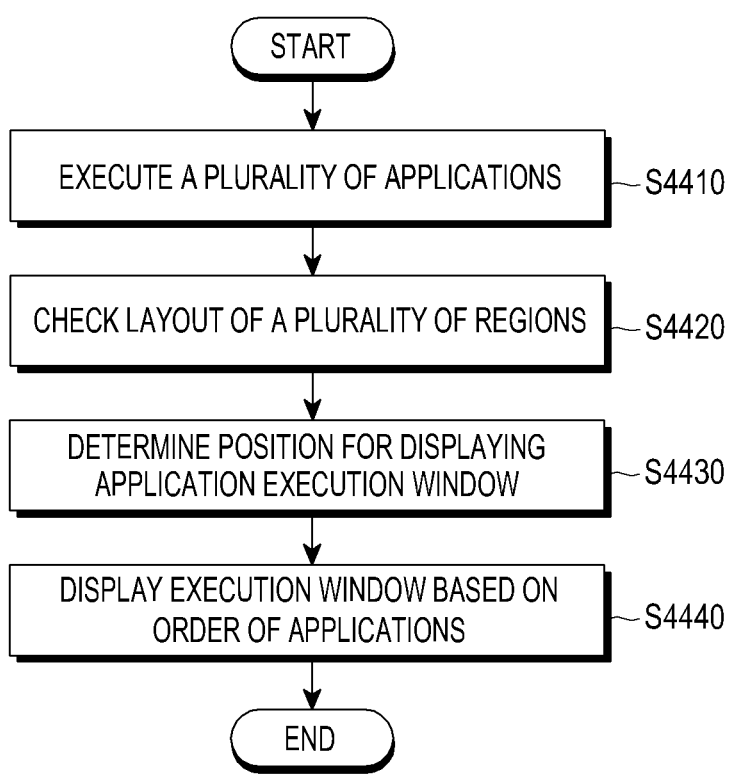
FIG. 42 is a flowchart illustrating a method for executing an application in a display device according to an embodiment of the present disclosure.

FIG. 42 is a flowchart illustrating a method for executing an application in a display device according to an embodiment of the present disclosure.

Referring to FIG. 42, the display device may execute a plurality of applications in operation S4410. For example, the display device may execute an application in response to reception of a touch input on an icon representing the application.

The display device may determine a layout to dispose execution windows of the applications in operation S4420. The layout defines regions in which execution windows may be arranged. For example, various layouts are available, inclusive of a 2-top/down area split layout, a 2-left/right area split layout, a 3-area split layout, a 4-area split layout, and the like.

The display device may determine window positions in the layout in operation S4430. In the case of a 2-left/right area split layout in which the fifth and sixth regions are defined, the display device may allocate execution windows of a Web browser and a phone book application to the fifth region and an execution window of a video play application to the sixth region.

The display device may display a plurality of execution windows according to the priority levels of the applications in operation S4440. For example, if the execution windows of the Web browser and the phone book application are allocated to the fifth region, the execution window of an application having a higher priority between the Web browser and the phone book application may be displayed in the fifth region.

Figure 43A:
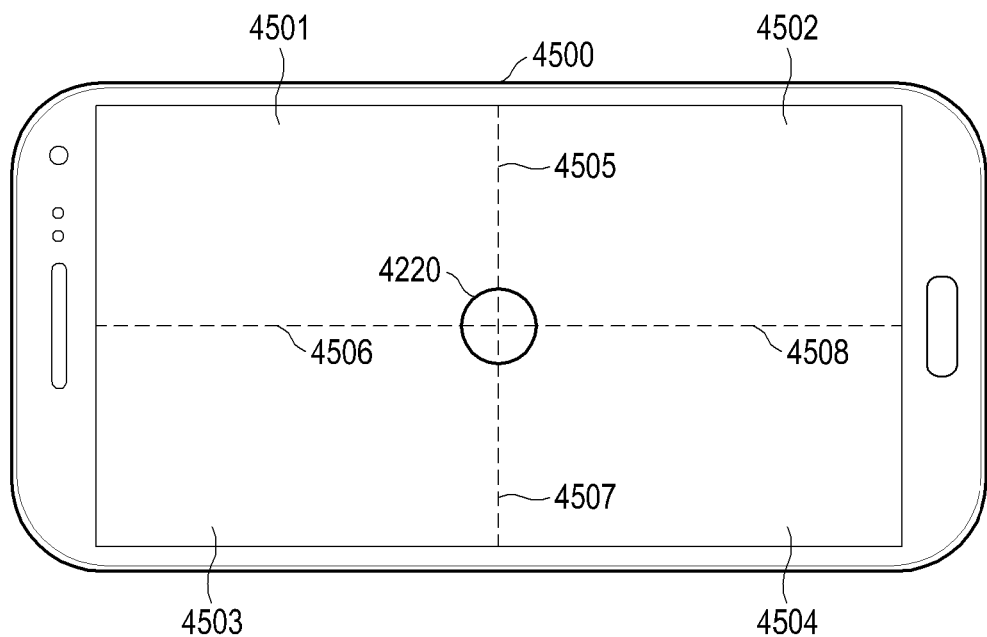
FIGS. 43A and 43B illustrate a method for controlling a display area of an application execution window using a center button according to an embodiment of the present disclosure.
Figure 43B:
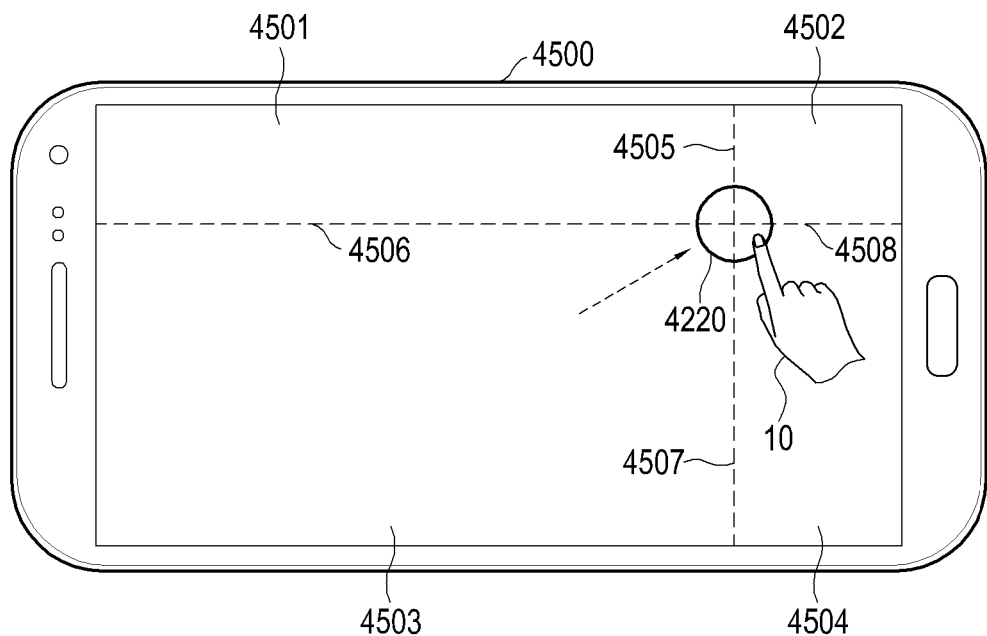

FIGS. 43A and 43B illustrate a method for controlling a display area of an application execution window using a center button according to an embodiment of the present disclosure.

Referring to FIG. 43A, a display device 4500 may define a first region 4501, a second region 4502, a third region 4503, a fourth region 4504, a first boundary 4505, a second boundary 4507, a third boundary 4506, and a fourth boundary 4508, which should not be construed as limiting the present disclosure. Thus, the display device 4500 may define regions and boundaries in various manners.

The display device 4500 may display the center button 4220 on at least one boundary. For example, if the first boundary 4505, the second boundary 4507, the third boundary 4506, and the fourth boundary 4508 are defined, the display device 4500 may display the center button 4220 at an intersection where the first boundary 4505, the second boundary 4507, the third boundary 4506, and the fourth boundary 4508 meet, as illustrated in FIG. 43A. In another example, if the display device 4500 defines the fifth and sixth regions (not shown) and the first and second boundaries 4505 and 4507, the display device 4500 may display the center button 4220 on the first or second boundary 4505 or 4507.

Referring to FIG. 43B, if the user 10 touches the center button 4220 and drags the touched center button 4220, the display device 4500 may move the center button 4220 to a dragged position. As the center button 4220 moves, the display device 4500 may change the sizes and positions of the regions in which to display execution windows of applications and the boundaries.

FIGS. 44A, 44B, 44C, 44D, 44E, 44F, 44G, 44H, 44I, 44J, 44K, 44L, 44M, 44N, 44O, 44P, 44Q, 44R, 44S, 44T, 44U, 4V, and 44W illustrate a method for executing a plurality of applications according to an embodiment of the present disclosure.

Referring to FIGS. 44A, 44B, 44C, 44D, 44E, 44F, 44G, 44H, 44I, 44J, 44K, 44L, 44M, 44N, 44O, 44P, 44Q, 44R, 44S, 44T, 44U, 4V, and 44W, while application A is being executed, a display device 4600 may display a list 4610 of at least one application. The application list 4610 lists executable applications. For example, icons 4611, 4612, 4613, 4614, 4615, 4616, and 4617 representing the executable applications may be listed in the application list 4610.

FIGS. 45A, 45B, 45C, 45D, 45E, 45F, 45G, 45H, 45I, and 45J illustrate activity stacks according to embodiments of the present disclosure.

Figure 44A:
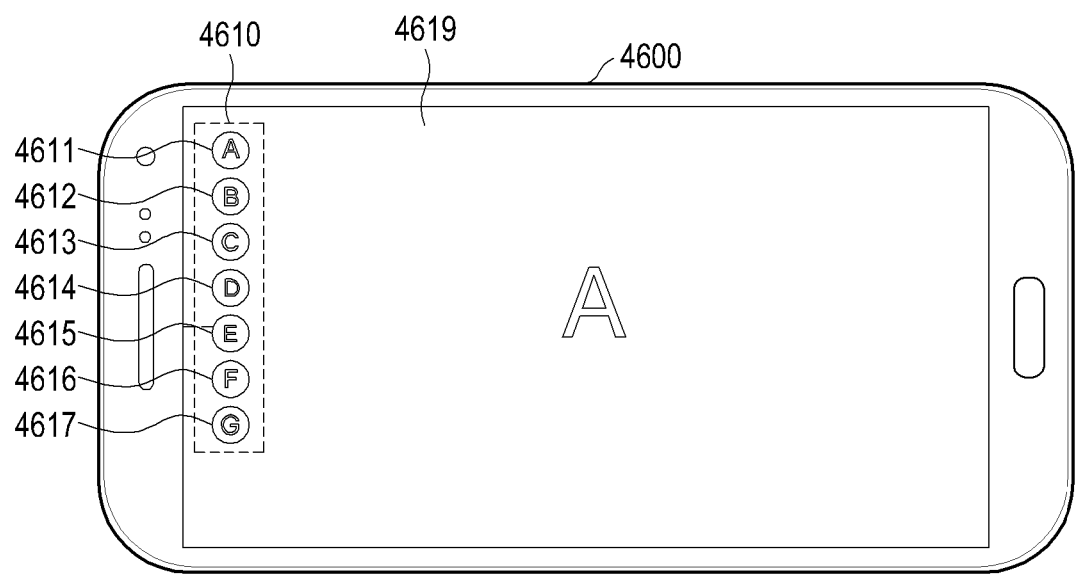
Figure 44B:
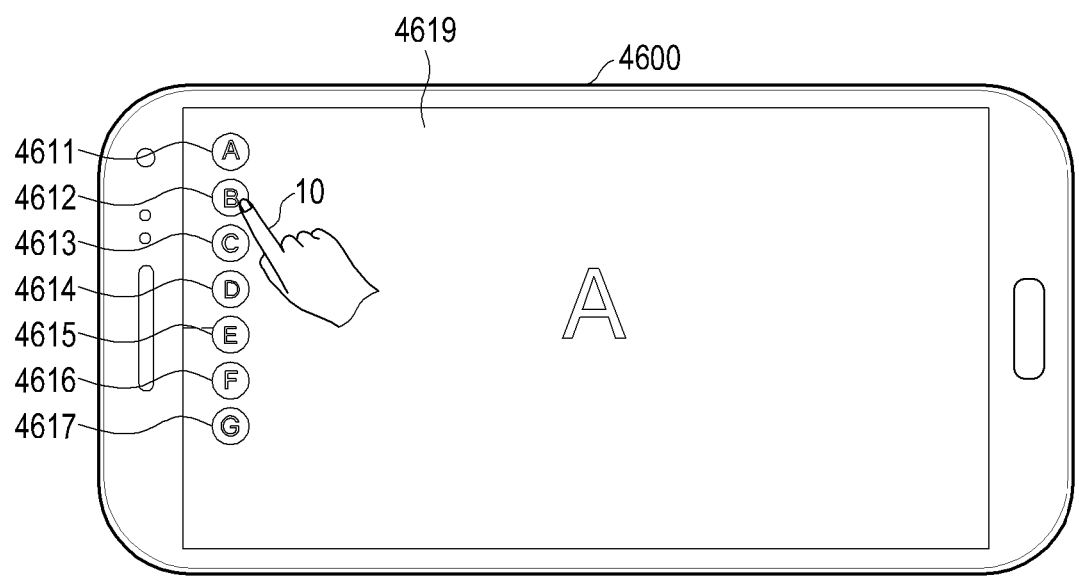
Figure 44C:
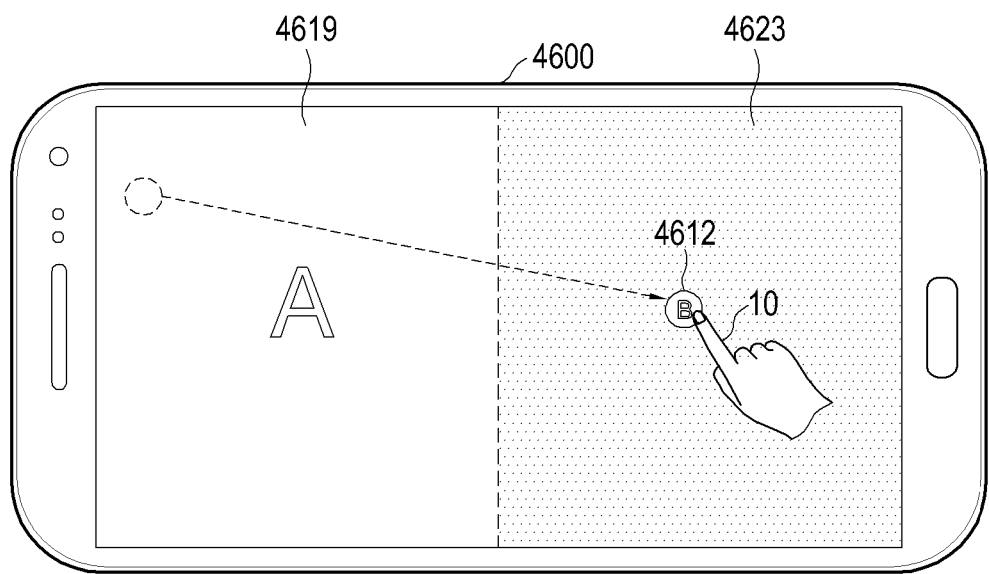

Referring to FIG. 45A, an activity stack corresponding to FIG. 44A is illustrated. As an execution window of application A is displayed in Region F occupying the entirety of a screen, a controller (not shown) generates an activity for application as illustrated in FIG. 45A.

The user 10 may manipulate the display device 4600 to additionally execute application B. For example, the user 10 may touch the icon 4612 representing application B as illustrated in FIG. 45B and drag the touched icon 4612 to a sixth region 4623 as illustrated in FIG. 45C.

If the drag input ends in the sixth region 4623, the display device 4600 executes application B corresponding to the selected icon 4612. In addition, the display device 4600 moves application A displayed in Region F to a fifth region 4619, while displaying application B in the sixth region 4623.

Eventually, an execution window 4620 of application A is displayed in the fifth region 4619, while an execution window 4630 of application B is displayed in the sixth region 4623.

The display device 4600 may display a center button 4622 on the boundary between the fifth and sixth regions 4619 and 4623. The display device 4600 may also display an indicator 4621 indicating the execution window 4630 of the latest executed application B on the center button 4622. The indicator 4621 may indicate a region in which an execution window of an application placed on the top of an activity stack is displayed.

Figure 44D:
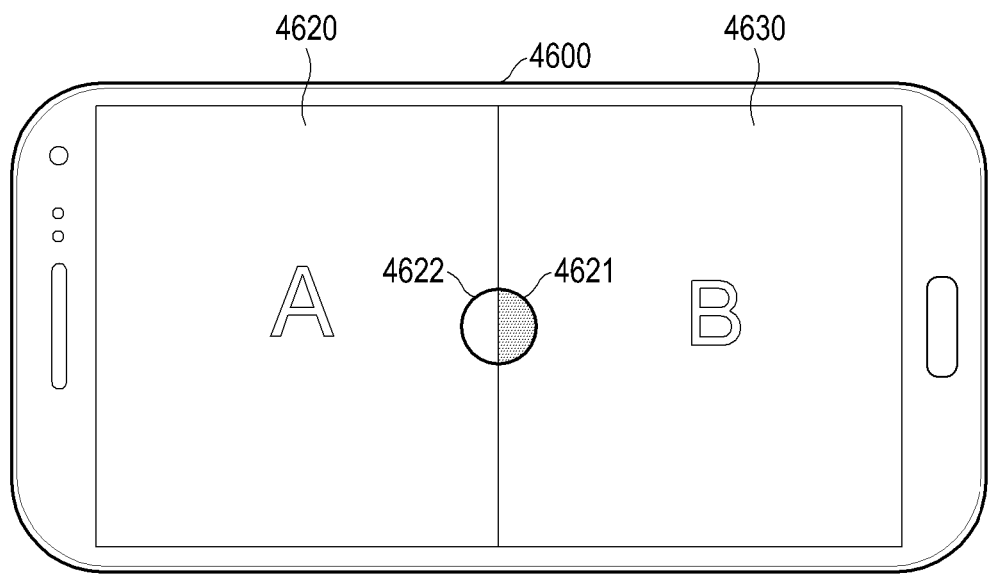

FIG. 45B illustrates an activity stack corresponding to FIG. 44D. The activity of application A displayed in Region F is changed so that application A may be displayed in the fifth region 4619. As application B is executed, an activity for application B is generated and application B is disposed in the sixth region 4623. The activity of application B is placed on the top of the activity stack.

Figure 44E:
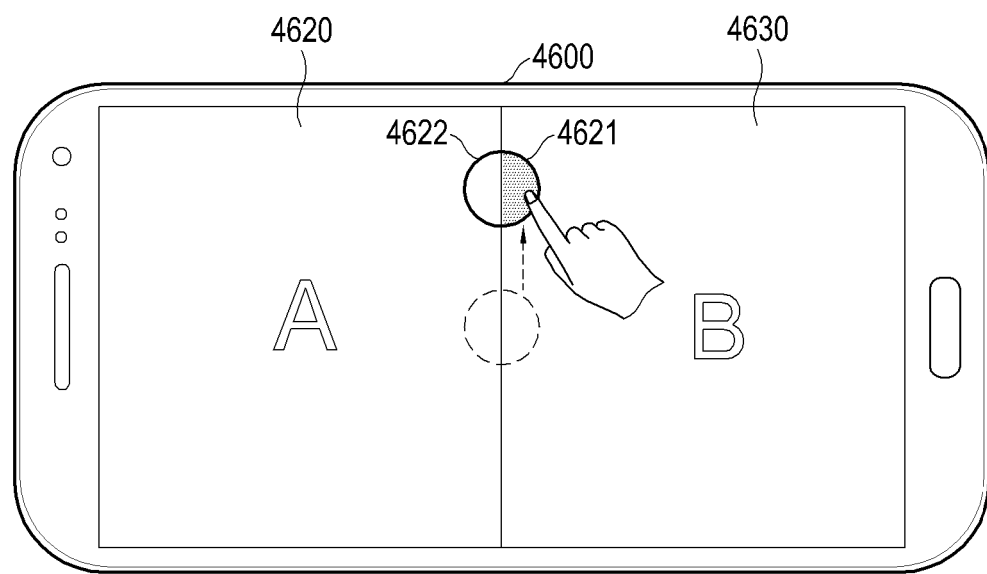

Referring to FIG. 44E, the user 10 may move the displayed center button 4622. As illustrated in FIGS. 43A and 43B, along with the movement of the center button 4622, the sizes of the regions in which to display execution windows of applications may be changed.

Figure 44F:
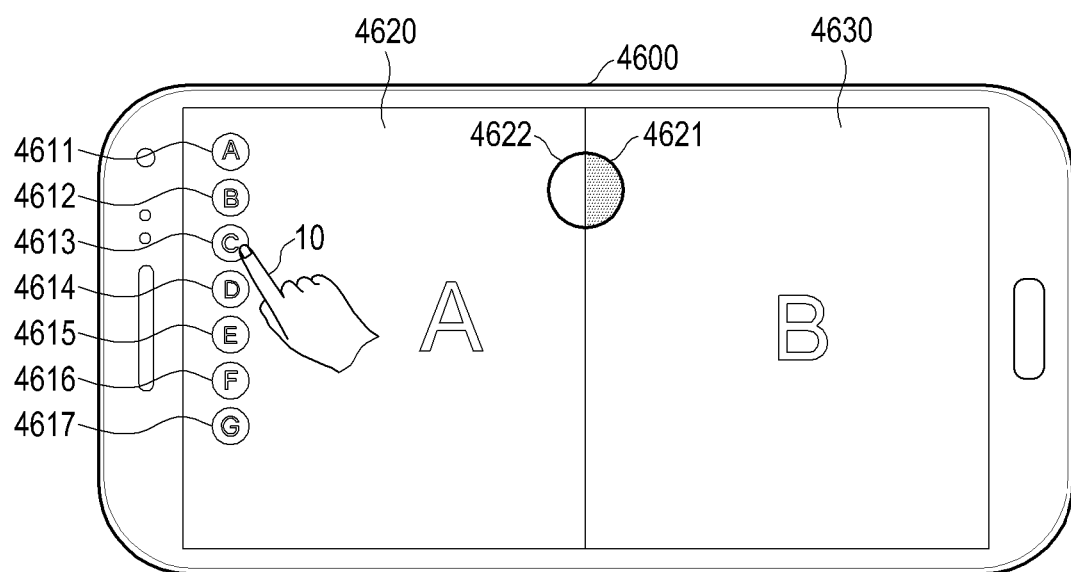
Figure 44G:
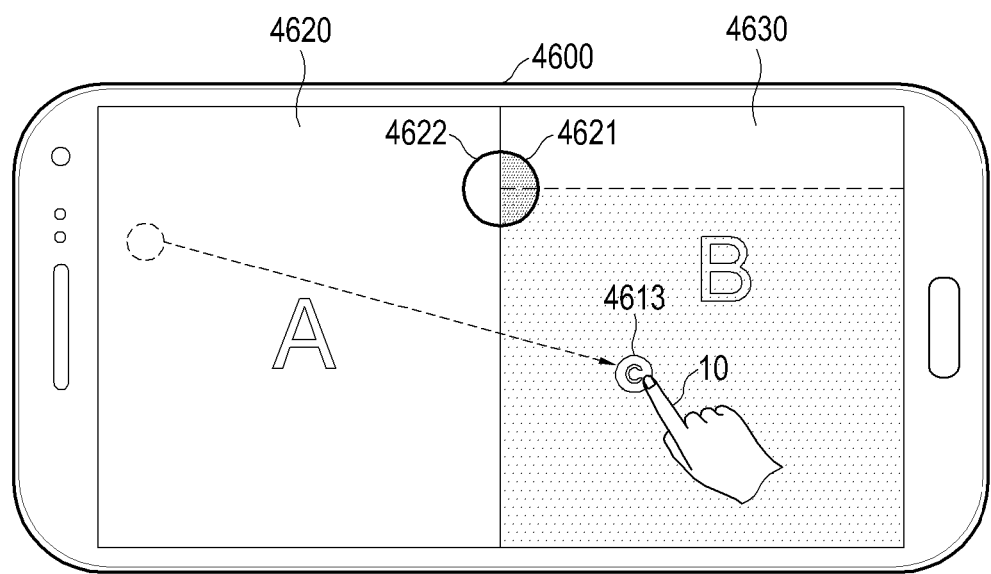
Figure 44H:
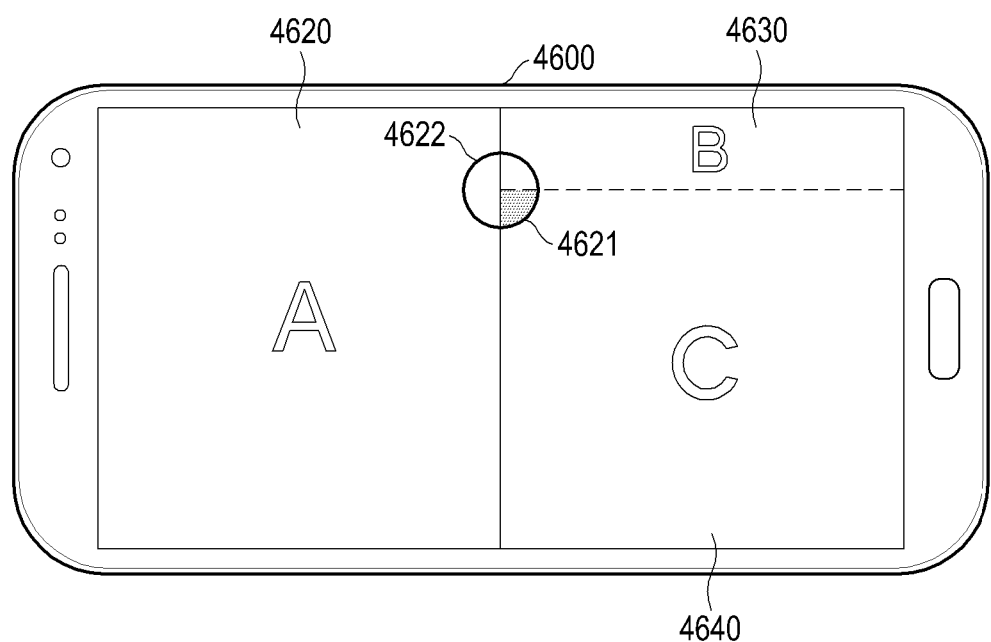

Subsequently, the user 10 may touch the icon 4613 representing application C as illustrated in FIG. 44F and drag the touched icon 4613 to a fourth region 4627 as illustrated in FIG. 44G. The size of the fourth region 4627 may be determined according to the position of the center button 4622. When the drag of the icon 4613 representing application C ends in the fourth region 4627, the display device 4600 may execute application C. As illustrated in FIG. 44H, the display device 4600 may display an execution window 4640 of application C in the fourth region 4627. The display device 4600 may display the indicator 4621 indicating the active region displaying the execution window 4640 of application C, on the center button 4622.

FIG. 45C illustrates an activity stack corresponding to FIG. 44H. A controller (not shown) generates an activity for application C in response to execution of application C. Application C is disposed in the fourth region 4627. Because the region displaying the execution window 4630 of application B is split, application B is allocated to the second region in FIG. 44E.

Figure 44I:
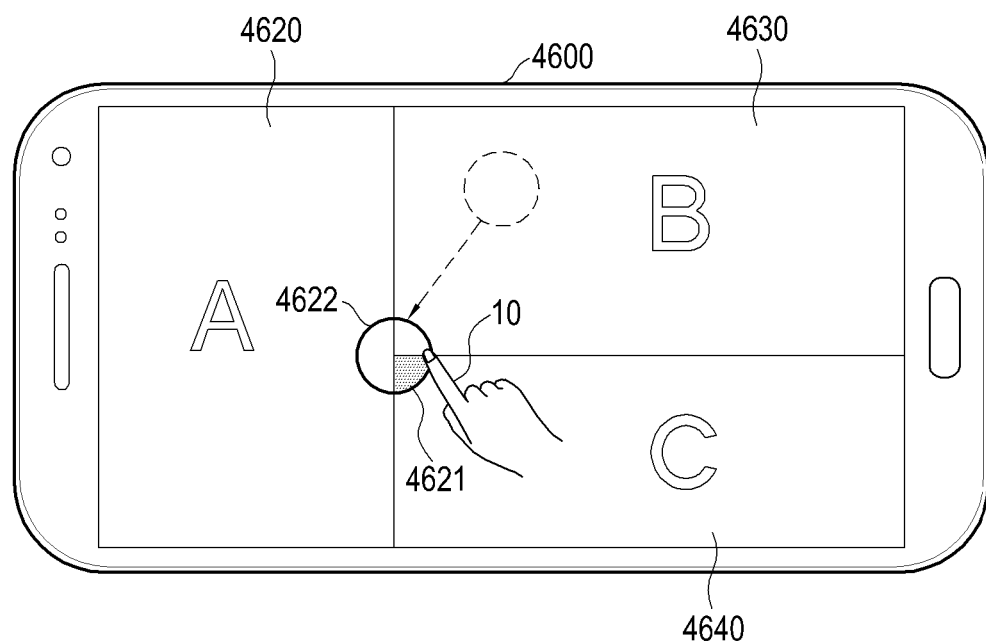

Referring to FIG. 44I, the user 10 may control the size of the regions displaying the execution windows 4620 to 4640 of the applications by applying an input that moves the center button 4622.

Figure 44J:
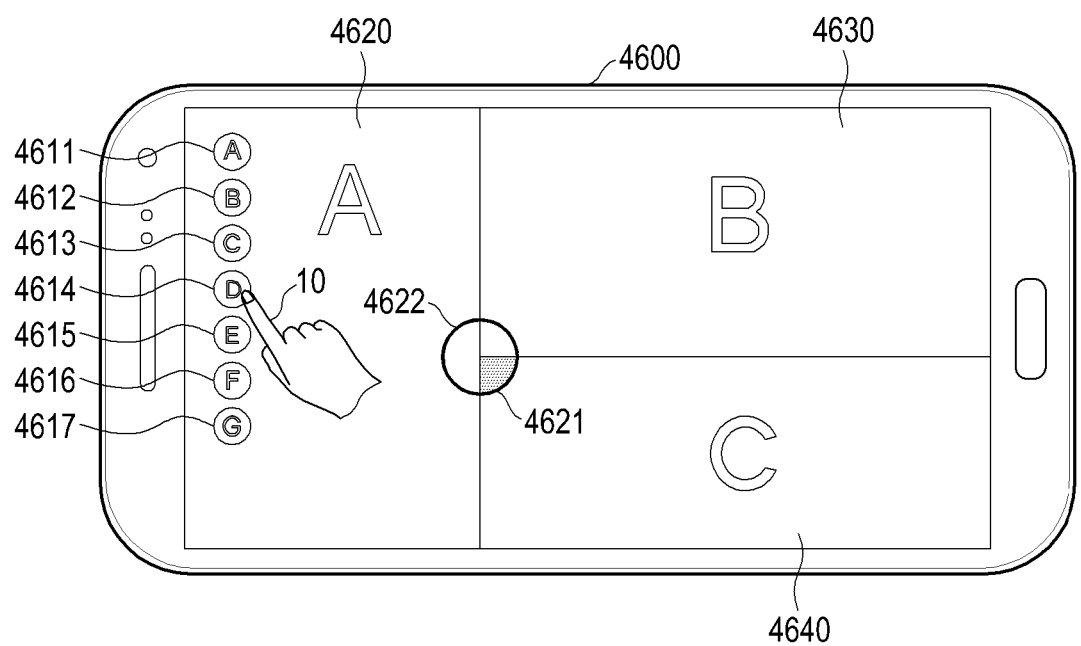
Figure 44K:
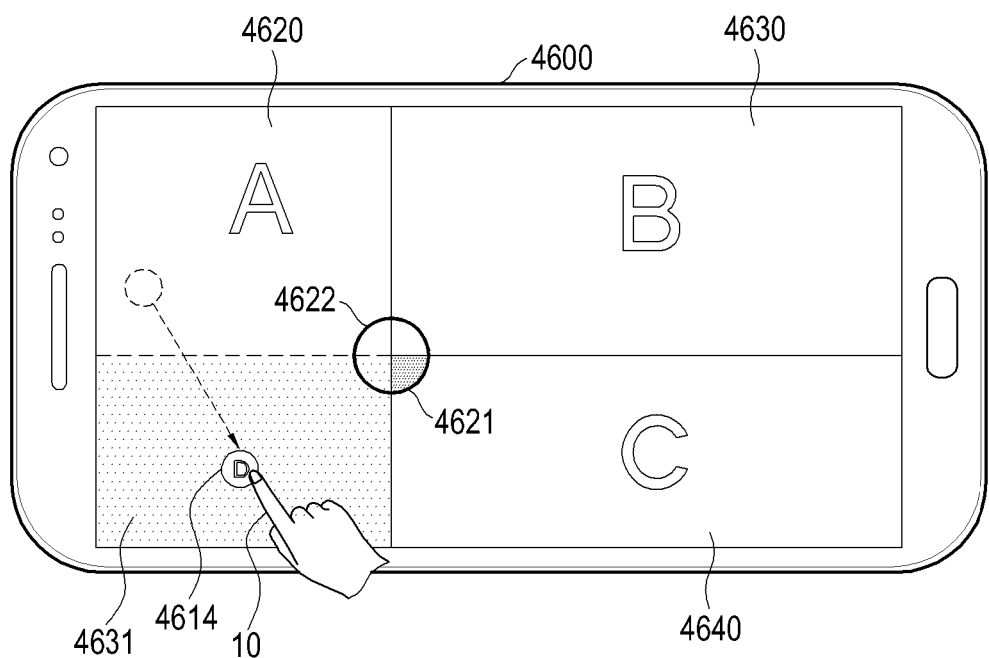

The user 10 may touch the icon 4614 representing application D as illustrated in FIG. 44J and drag the touched icon 4614 to a third region 4631 as illustrated in FIG. 44K.

Figure 44L:
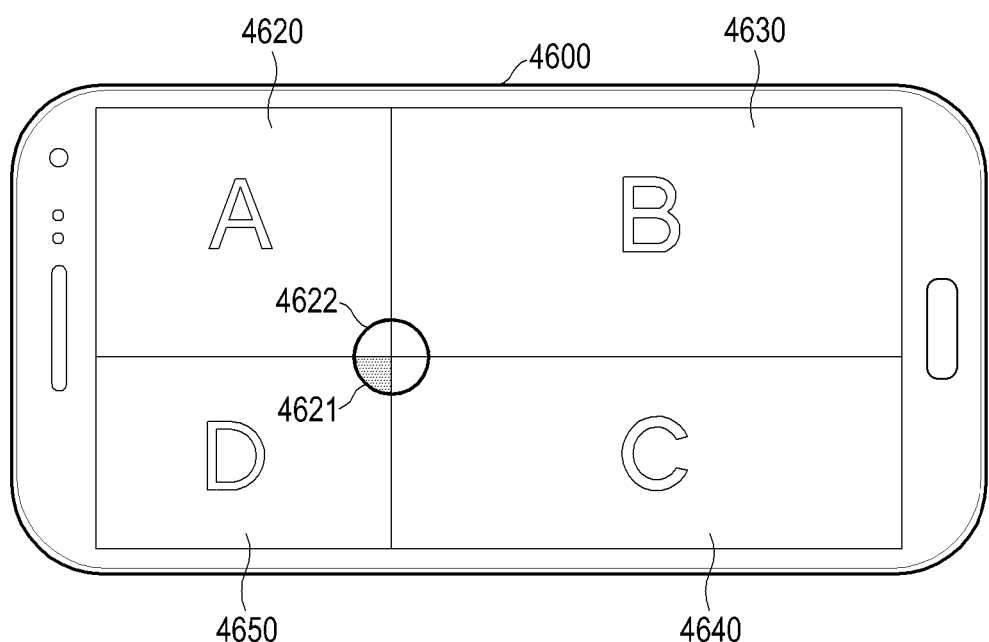

If the drag of the touched icon 4614 representing application D ends in the third region 4631, the display device 4600 may execute application D. The display device 4600 may display an execution window 4650 of application D in the third region 4631 as illustrated in FIG. 44L. The display device 4600 may display the indicator 4621 indicating the active region displaying the execution window 4650 of application D, on the center button 4622.

FIG. 45D illustrates an activity stack corresponding to FIG. 44L. The controller generates an activity for application D in response to execution of application D. Application D is allocated to the third region 4631. Because the region displaying the execution window 4620 of application A is split, application A is allocated to the first region in FIG. 44I.

Figure 44M:
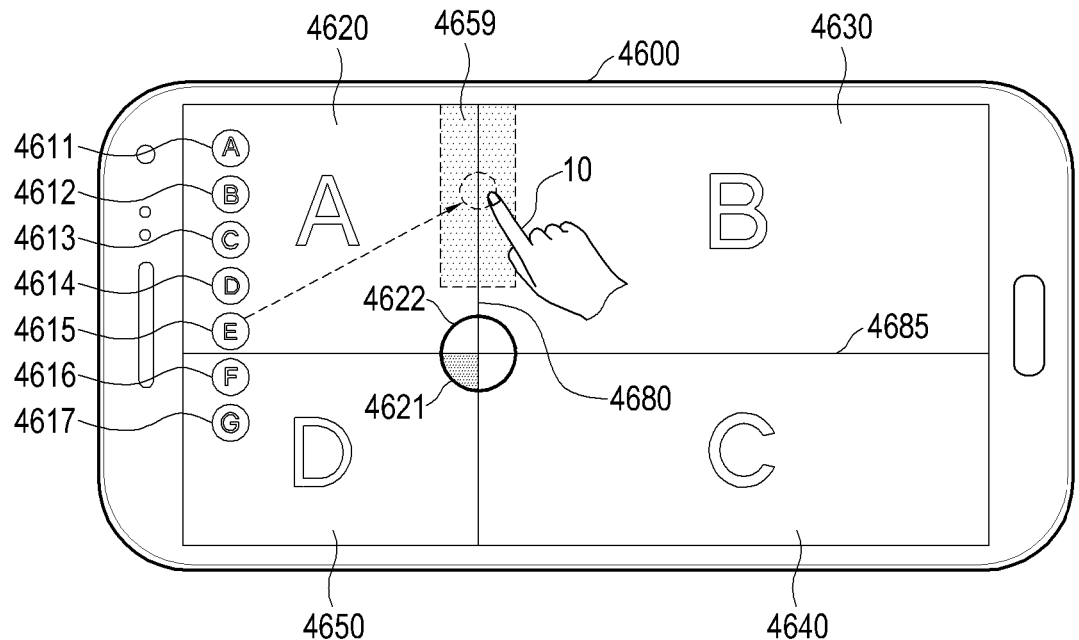

The user 10 may touch the icon 4615 representing application E and drag the touched icon 4615 to a boundary region 4659 as illustrated in FIG. 44M. The display device 4600 defines the boundary region 4659 to include a boundary 4685.

Figure 44N:
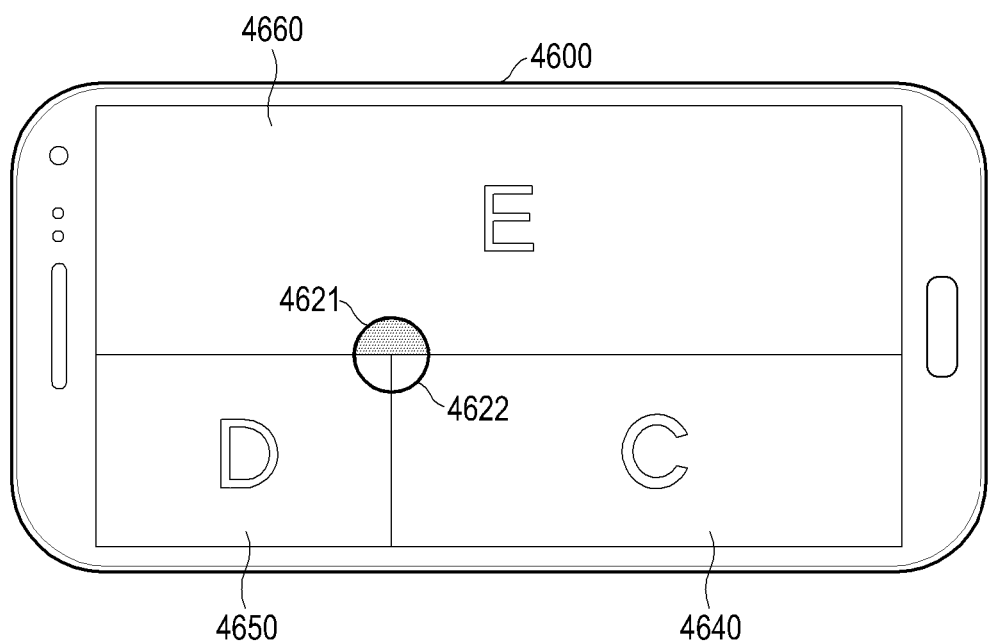

If the drag of the touched icon 4615 representing application E ends in the boundary region 4659, the display device 4600 may execute application E. The display device 4600 may dispose an execution window 4660 of application E in a seventh region including the first and second regions adjacent to the boundary 4685 included in the boundary region 4659, as illustrated in FIG. 44N. The display device 4600 may display the indicator 4621 indicating the active region displaying the execution window 4660 of application E, on the center button 4622.

FIG. 45E illustrates an activity stack corresponding to FIG. 44N. The controller generates an activity for application E in response to execution of application E. Application E is allocated to the seventh region, and applications A and B displayed in the first and second regions included in the seventh region are placed in the seventh region.

Figure 44O:
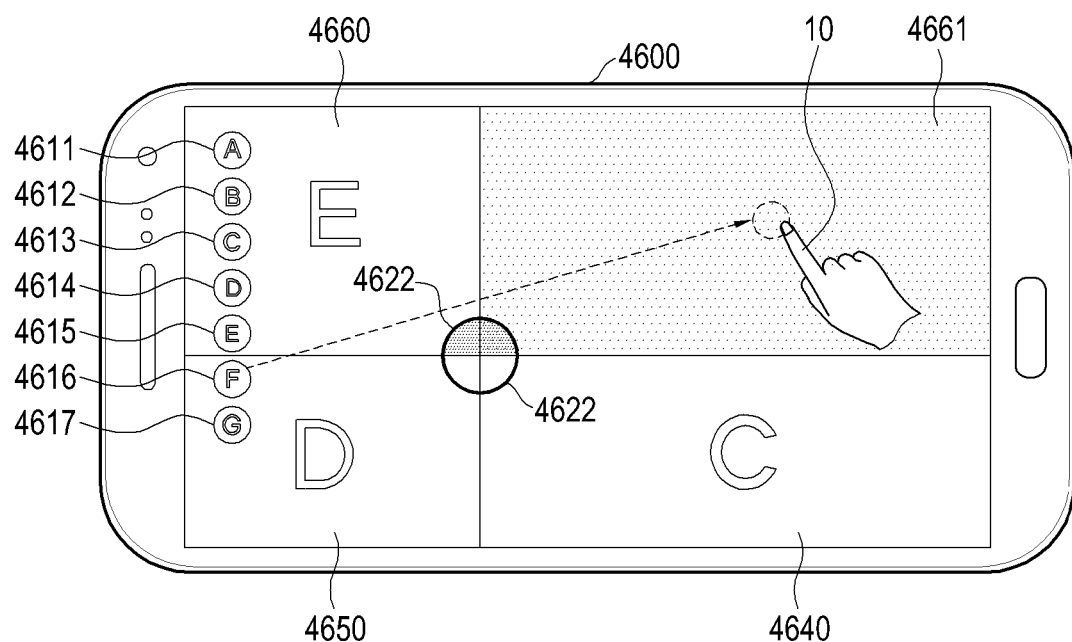

The user 10 may touch the icon 4616 representing application F and drag the touched icon 4616 to the second region 4661 as illustrated in FIG. 44O.

If the drag of the touched icon 4616 representing application F ends in the second region 4661, the display device 4600 may execute application F. The display device 4600 may display an execution window 4670 of application F in the second region 4661, as illustrated in FIG. 44P.

Referring to FIG. 45F, the controller may generate an activity for application F disposed in the second region. As the seventh region is split, applications A, B, and E displayed in the seventh region may be disposed in the first region.

Figure 44P:
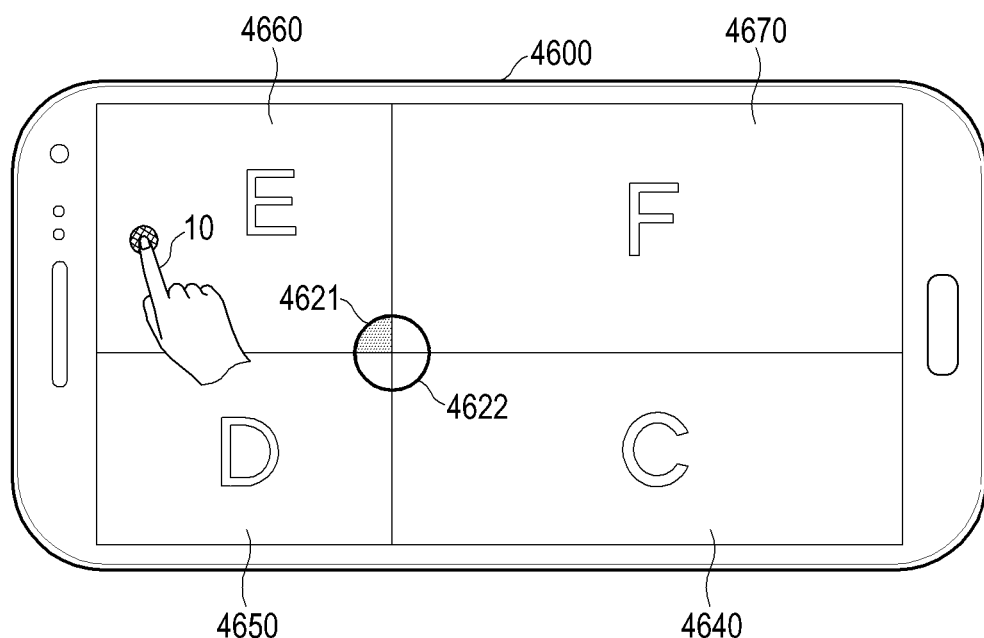

The touch screen may receive an input that selects the execution window 4660 of application E from the user 10, as illustrated in FIG. 44P.

Referring to FIG. 45G, in response to the selection of the execution window 4660 of application E, the controller may move the activity of application E to the top of the activity stack. The display device 4600 may display the indicator 4621 indicating the position of the execution window 4660, on the center button 4622.

Figure 44Q:
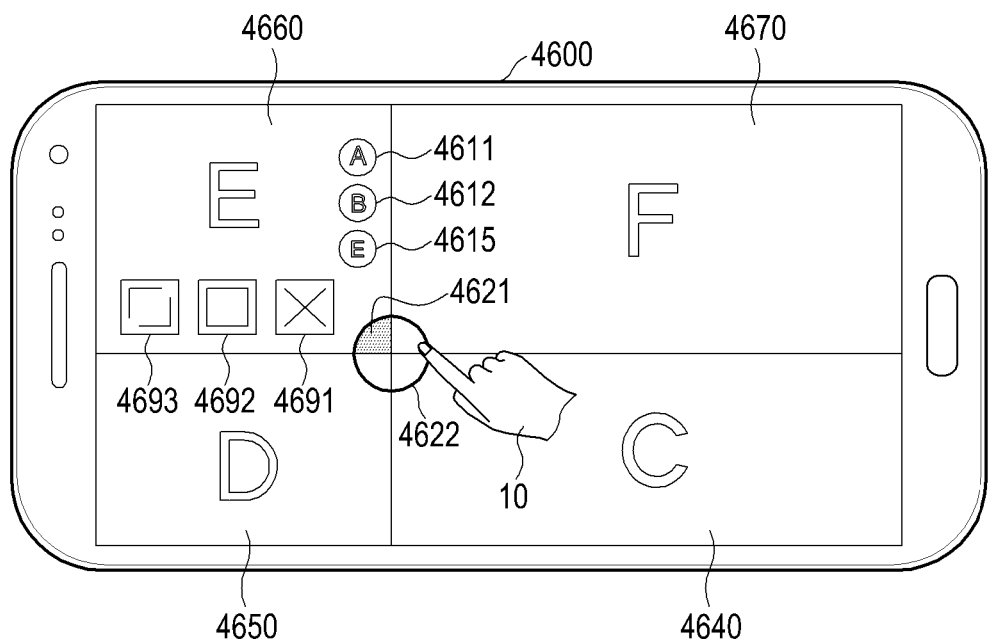
Figure 44R:
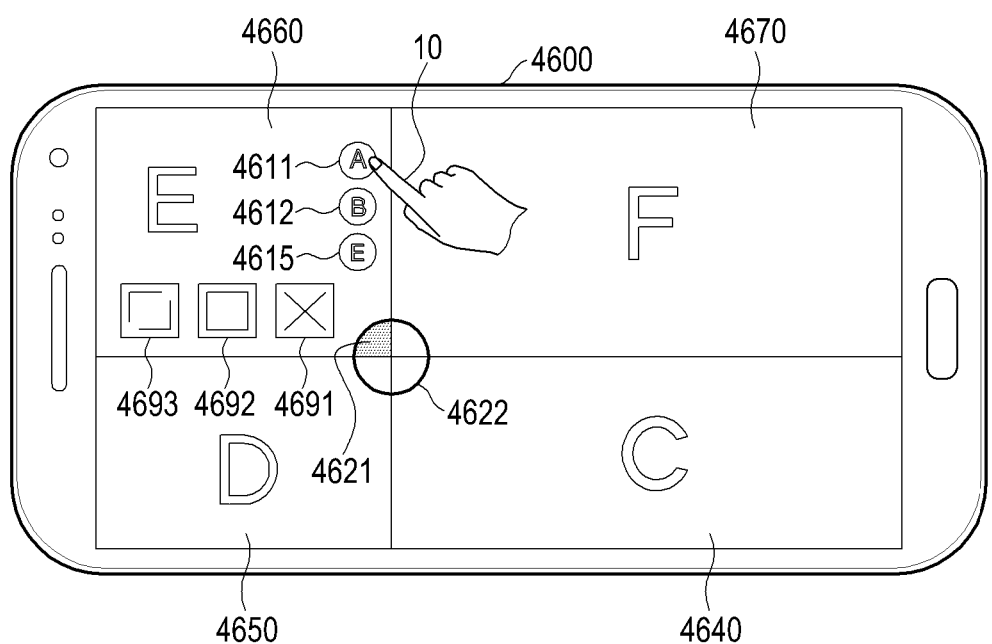

Referring to FIG. 44Q, the display device 4600 may receive an input that selects the execution window 4660 of application E from the user 10. For example, the UE 10 may touch the center button 4622. In response to the reception of the input that selects the center button 4622, the display device 4600 may display a list of applications 4611, 4612, and 4615 displayed in the first region which is now active.

For example, the display device 4600 may display icons representing applications A, B, and E allocated to the first region, in the first region referring to the activity stack illustrated in FIG. 45G.

In response to the reception of the input that selects the center button 4622, the display device 4600 may further display icons 4691, 4692, and 4693 representing operations related to the execution window of an application displayed in the first region.

Figure 44S:
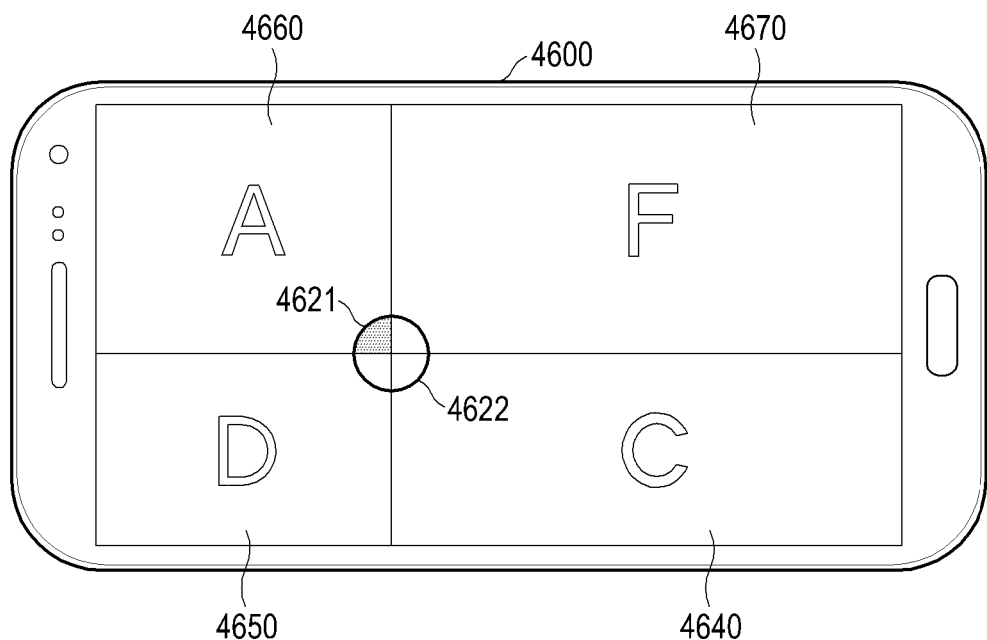

Upon receipt of an input that selects the icon 4611 representing application A from among the icons displayed in the first region, the display device 4600 may display the execution window 4620 of application A in the first region, as illustrated in FIG. 44S.

FIG. 45H illustrates an activity stack corresponding to FIG. 44S. In response to the reception of the input that selects the icon 4611 representing application A, the controller may move the activity of application A to the top of the activity stack.

Figure 44T:
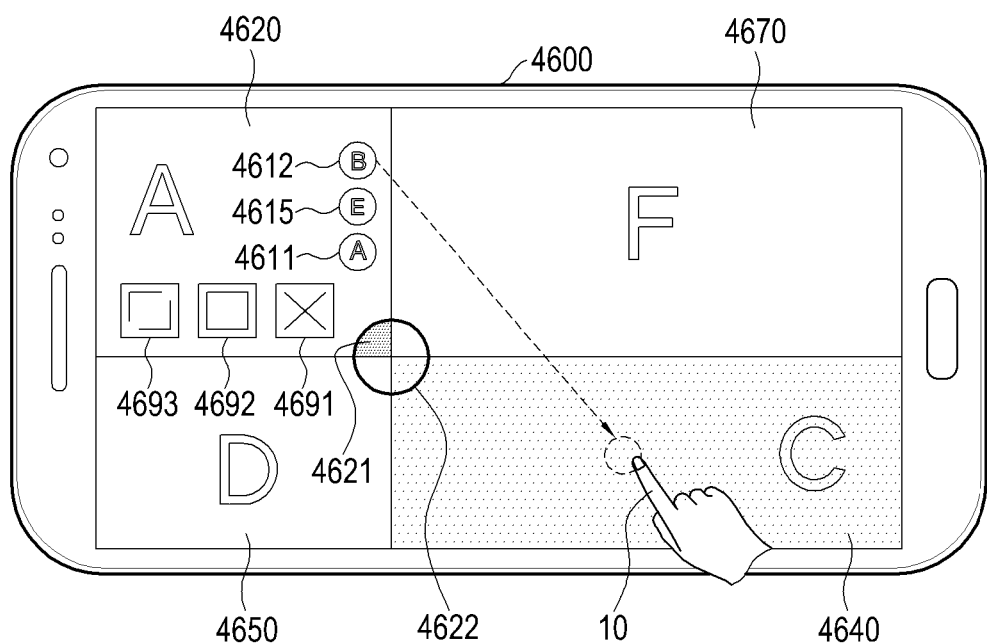
Figure 44U:
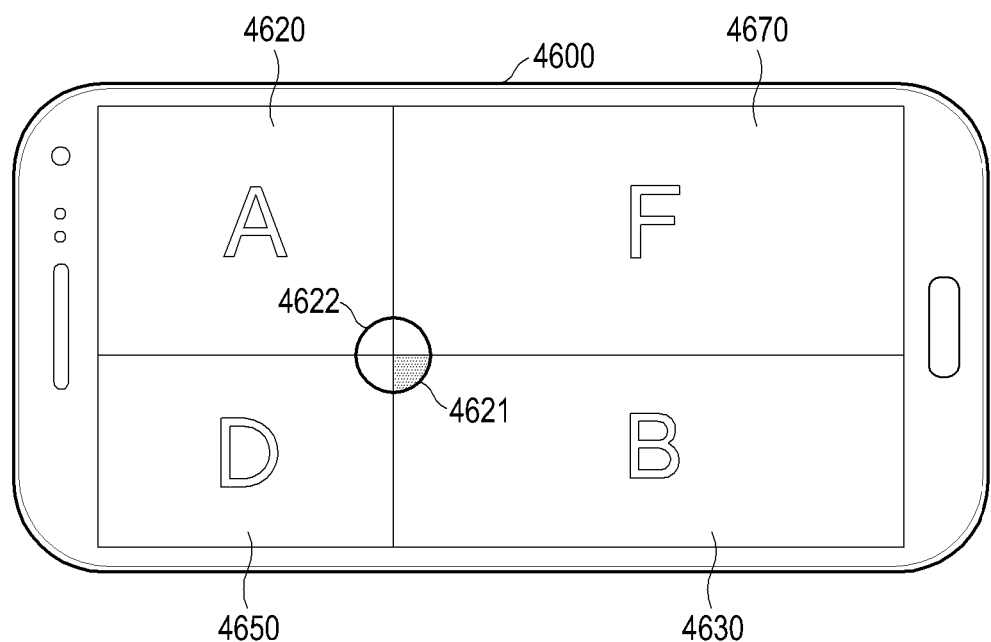

Referring to FIG. 44T, upon receipt of an input that selects the center button 4622, the list of applications 4611, 4612, and 4615 allocated to the first region being an active region may be displayed. In addition, a drag input of dragging the icon 4612 representing application B to a region displaying the execution window 4640 of application C may be received from the user 10. As the drag input is completed, the display device 4600 may display the execution window 4630 of application B in the fourth region as illustrated in FIG. 44U. The display device 4600 may display the indicator 4621 indicating the position of the execution window 4630 of application B, on the center button 4622.

FIG. 45I illustrates an activity stack corresponding to FIG. 44U. Since the execution window 4630 of application B is displayed in the fourth region, the controller updates the region to which application B is allocated to the fourth region and moves the activity of application B to the top of the activity stack.

Figure 44V:
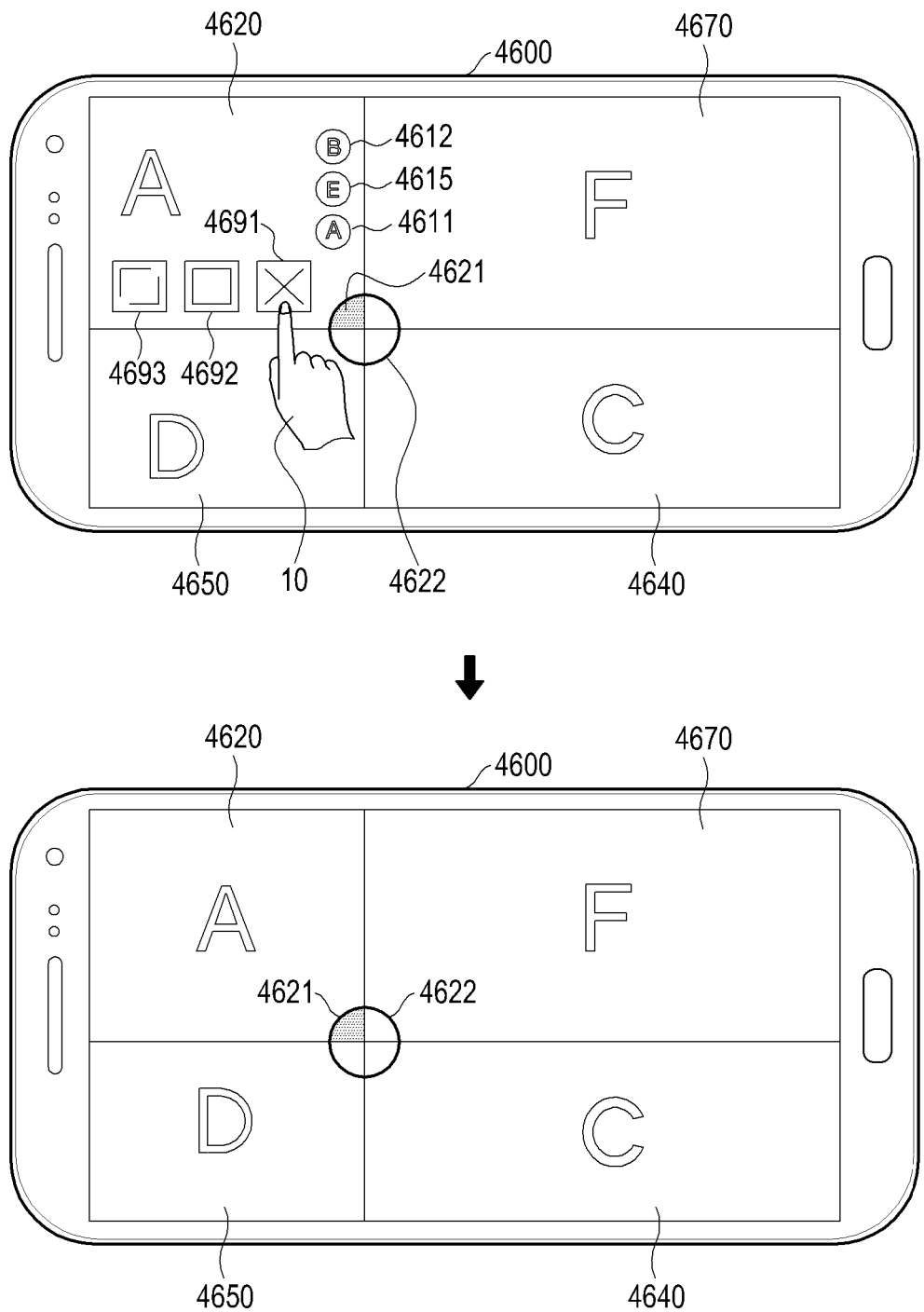

Referring to FIG. 44V, upon receipt of an input that selects the center button 4622, the icons 4691, 4692, and 4693 representing operations related to the execution window of an application displayed in the first region being an active region may further be displayed. The operations related to the execution window of the application may perform various additional functions in regards to the execution window of the application. For example, the icons representing the operations related to the application execution window may include at least one of the exit button 4691 that ends the execution window, the maximize button 4692 that displays the execution window in full screen, and the capture button 4693 that captures the execution window, which should not be construed as limiting the present disclosure. Upon receipt of an input that selects the exit button 4691 from the user 10, the controller may end the execution window of application A, as illustrated in (b) of FIG. 44V.

Figure 45J:
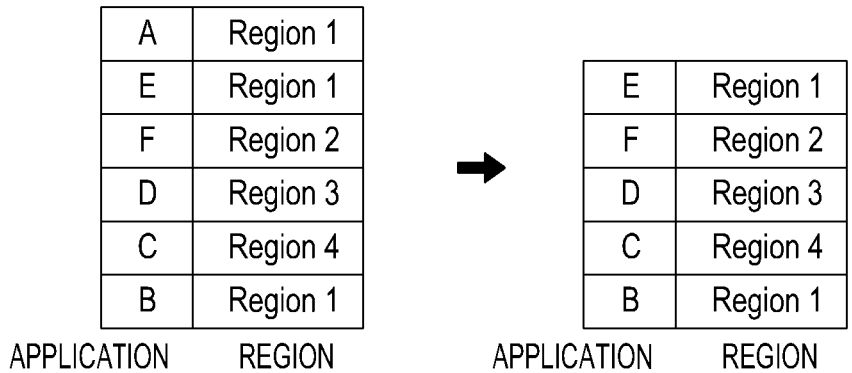

FIG. 45J illustrates an activity stack corresponding to FIG. 44V. Upon termination of the execution window of application A, the activity of application A may be removed from the activity stack.

Referring to FIG. 44W, upon receipt of an input that selects the maximize button 4692 from the user 10, the display device 4600 may display an execution window 4660 of application A displayed in an active region in full screen on the touch screen.

Upon receipt of an input that selects the capture button 4693 from the user 10, the display device 4600 may capture the active execution window 4660.

Figure 46:
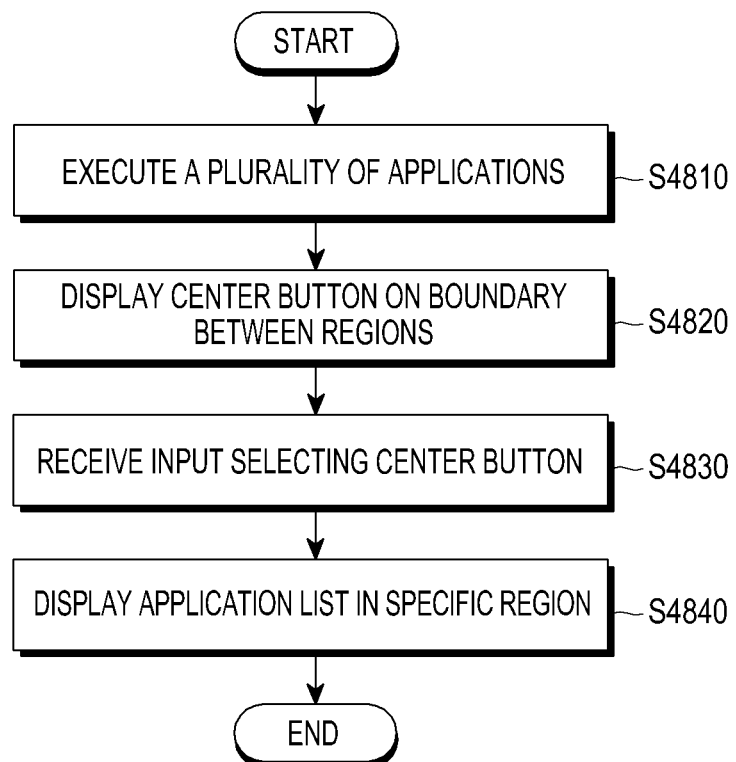
FIG. 46 is a flowchart illustrating a method for providing a user interface on which to execute an application in a display device according to an embodiment of the present disclosure.

FIG. 46 is a flowchart illustrating a method for providing a user interface on which an application is executed in a display device according to an embodiment of the present disclosure.

Referring to FIG. 46, the display device may display execution windows of applications in a plurality of regions defined on a touch screen in operation S4810. The display device may also display a center button on at least one boundary between a plurality of regions in operation S4820.

The display device may display an indicator on the center button in order to indicate an active region. The active region may refer to a last area selected from the plurality of regions. In addition, the active region means a region in which an execution window is displayed in a state controllable by a user input.

The display device may receive an input that selects the center button in operation S4830. Upon receipt of the input that selects the center button, the display device may display a list of applications in a specific region in operation S4840. Herein, the specific region may be an active region.

The application list may list at least one icon representing at least one application. Upon receipt of an input that selects at least one of applications included in the application list, the display device may display an execution window of the selected application in the specific region. Upon receipt of a drag input of dragging an icon included in the application list, the display device may display an execution window of an application corresponding to the dragged icon in the dragged region.

The display device may further display icons representing operations related to the execution window of the application displayed in the specific region. The icons representing operations related to the execution window of the application may include at least one of a capture button that captures an execution window to control display of the execution window, a minimize button that minimizes the size of an execution window, a maximize button that maximizes the size of an execution window, and an exit button that ends an execution window.

Figure 47:
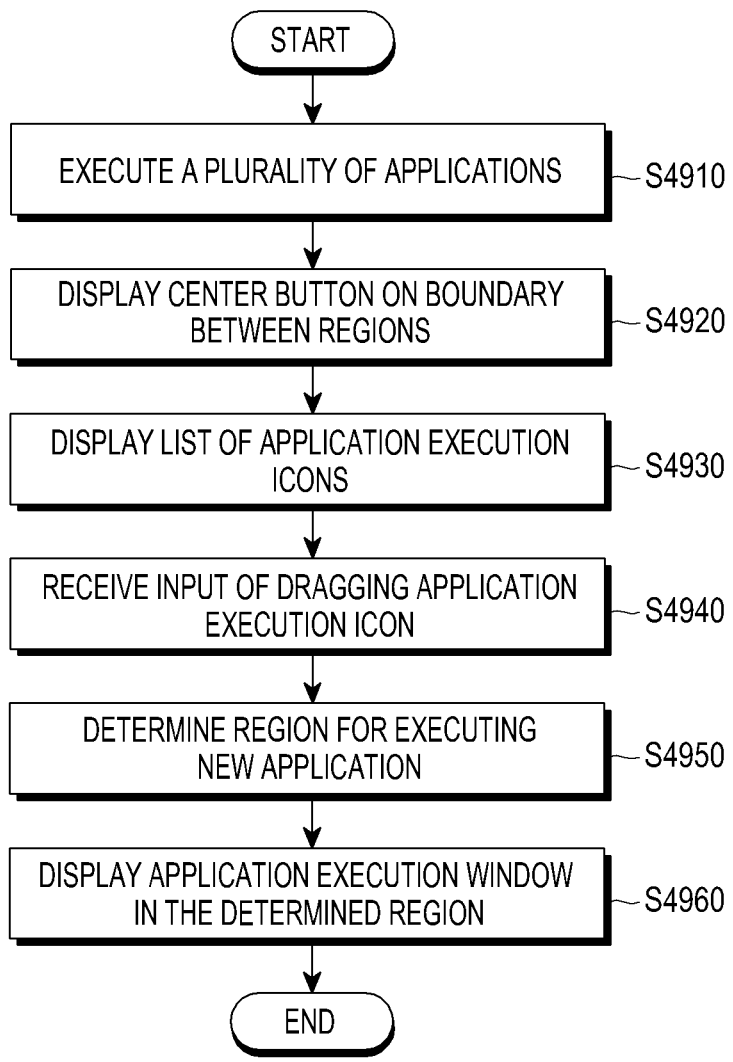
FIG. 47 is a flowchart illustrating a method for executing an application in a display device according to an embodiment of the present disclosure.

FIG. 47 is a flowchart illustrating a method for executing an application in a display device according to an embodiment of the present disclosure.

Referring to FIG. 47, the display device may display execution windows of applications in a plurality of regions defined on a touch screen in operation S4910. The display device may also display a center button on at least one boundary between a plurality of regions in operation S4920.

The display device may display a list of at least one application execution icon in a partial area of a touch screen in operation S4930.

The display device may determine a region in which to execute a new application based on a position to which an application execution icon is dragged and the position of the center button in operation S4940. The execution region of the new application is a region in which the execution window of the additionally executed application will be displayed.

If the dragged position falls within a boundary region including the at least one boundary, the execution region of the new application may be determined to include regions adjacent to the at least one boundary S4950.

Subsequently, the display device may display the execution window of the application in the determined region in operation S4960.

Figure 48:
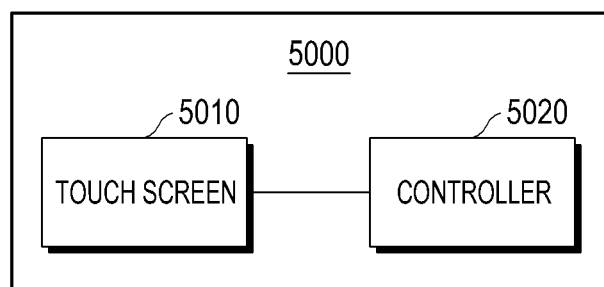
FIG. 48 is a block diagram of a display device according to an embodiment of the present disclosure.

FIG. 48 is a block diagram of a display device according to an embodiment of the present disclosure.

Referring to FIG. 48, a display device 5000 may include a touch screen 5010 configured to display execution windows of applications in a plurality of regions, to display a center button on at least one boundary between a plurality of regions, and to receive an input that selects the center button, and a controller 5020 configured to control the touch screen 5010 to display a list of at least one application executed in a specific region selected from among the plurality of regions in the specific region based on the received input.

The specific region includes an active region controllable by a user input. The active region may be a last region selected from among the plurality of regions.

In addition, the controller 5020 may control the touch screen 5010 to display an indicator indicating the active region on the center button.

FIGS. 49A, 49B, 49C, and 49D illustrate a method for displaying a center button according to an embodiment of the present disclosure.

Figure 49A:
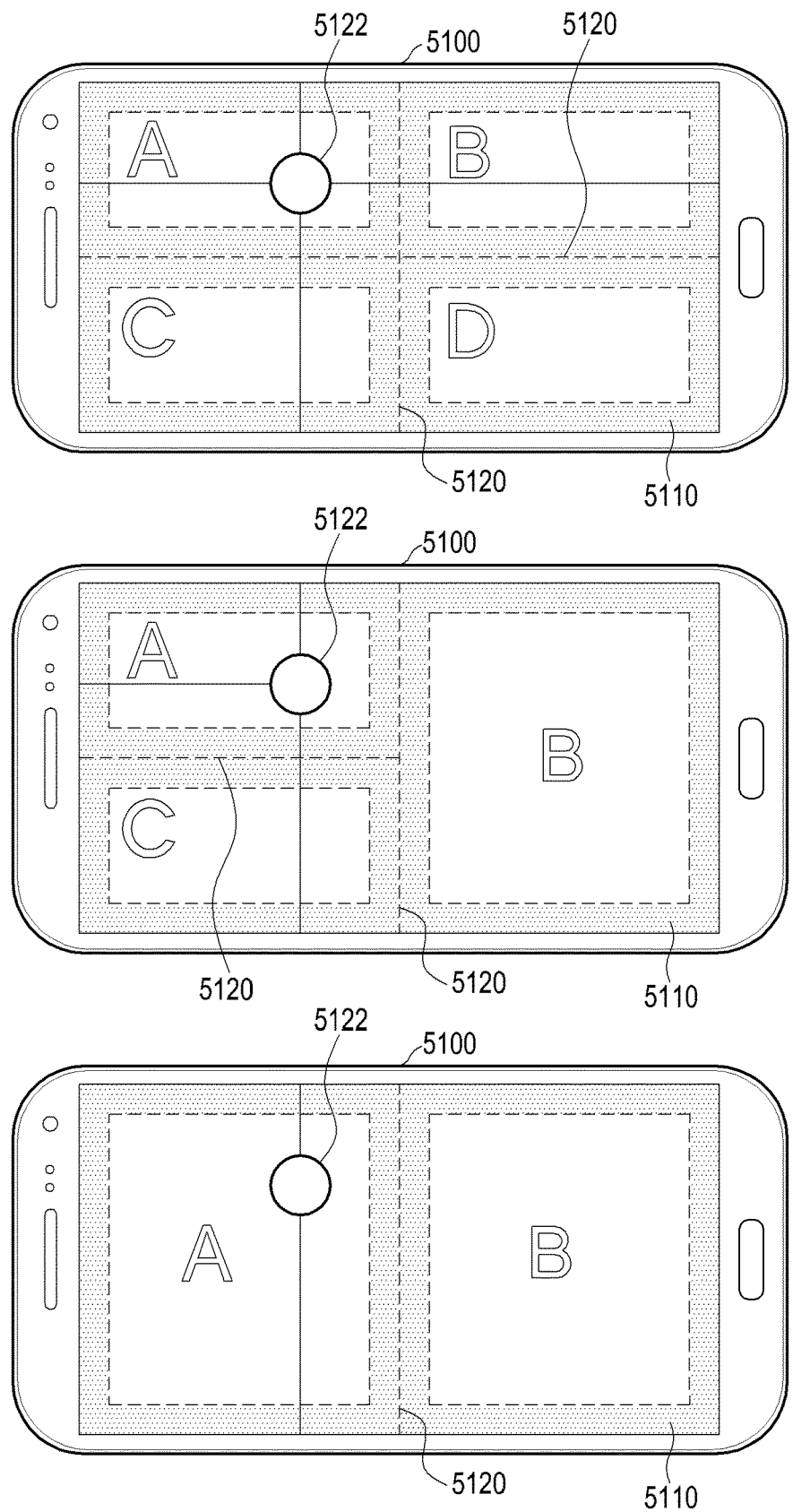
FIGS. 49A, 49B, 49C, and 49D illustrate a method for displaying a center button according to an embodiment of the present disclosure.

Referring to FIG. 49A, a display device 5100 may display a center button 5122 on a boundary that separates regions in which execution windows of a plurality of applications are displayed. In addition, the display device 5100 may define an alignment line 5120 according to a layout of application execution windows. The alignment line 5120 may include a dotted line and the outline of a touch screen.

The display device 5100 may further define an alignment region 5110. The alignment line 5120 may be included in the alignment region 5110.

As illustrated in FIG. 49A, the alignment line 5120 and the alignment region 5110 may be determined according to the number and positions of execution windows of applications displayed on the touch screen. For example, if the layout is a 2-top/down area split layout, a 2-left/right area split layout, a 3-area split layout, or a 4-area split layout, the alignment line 5120 and the alignment region 5110 may be defined according to the layout.

Figure 49B:
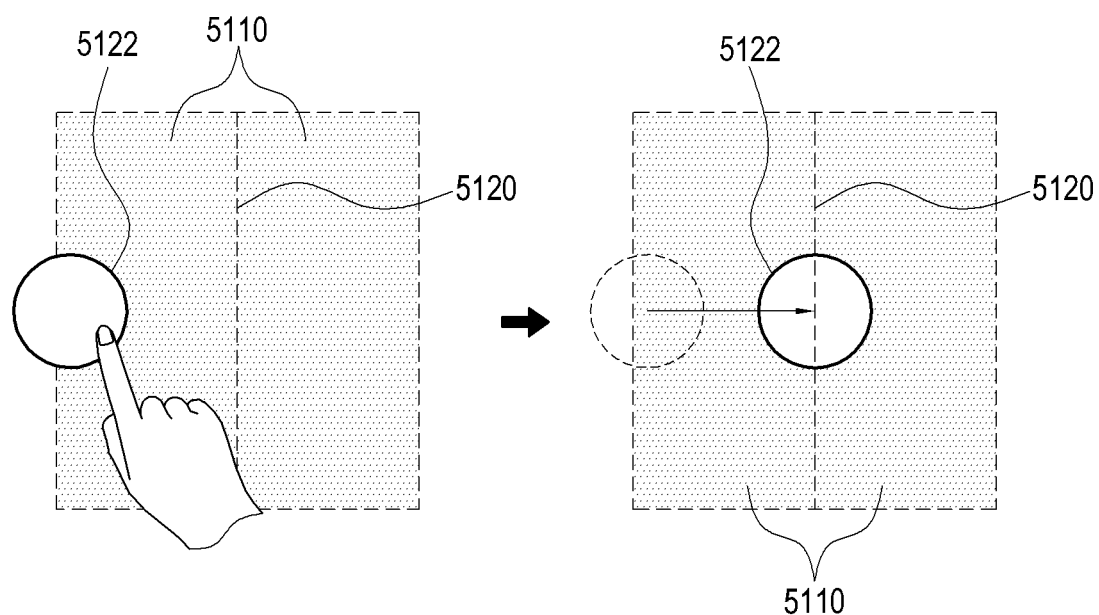

Referring to FIG. 49B, upon receipt of an input that moves the center button 5122 into the alignment region 5110 on the touch screen, the display device 5100 may move the center button 5122 onto a part of the alignment line 5120 nearest to the last position of the center button 5122.

The display device 5100 may determine a region in which to display the execution windows of applications based on the position of the center button 5122 on the alignment line 5120. Accordingly, the display device 5100 may align the display regions of the application execution windows.

Figure 49C:
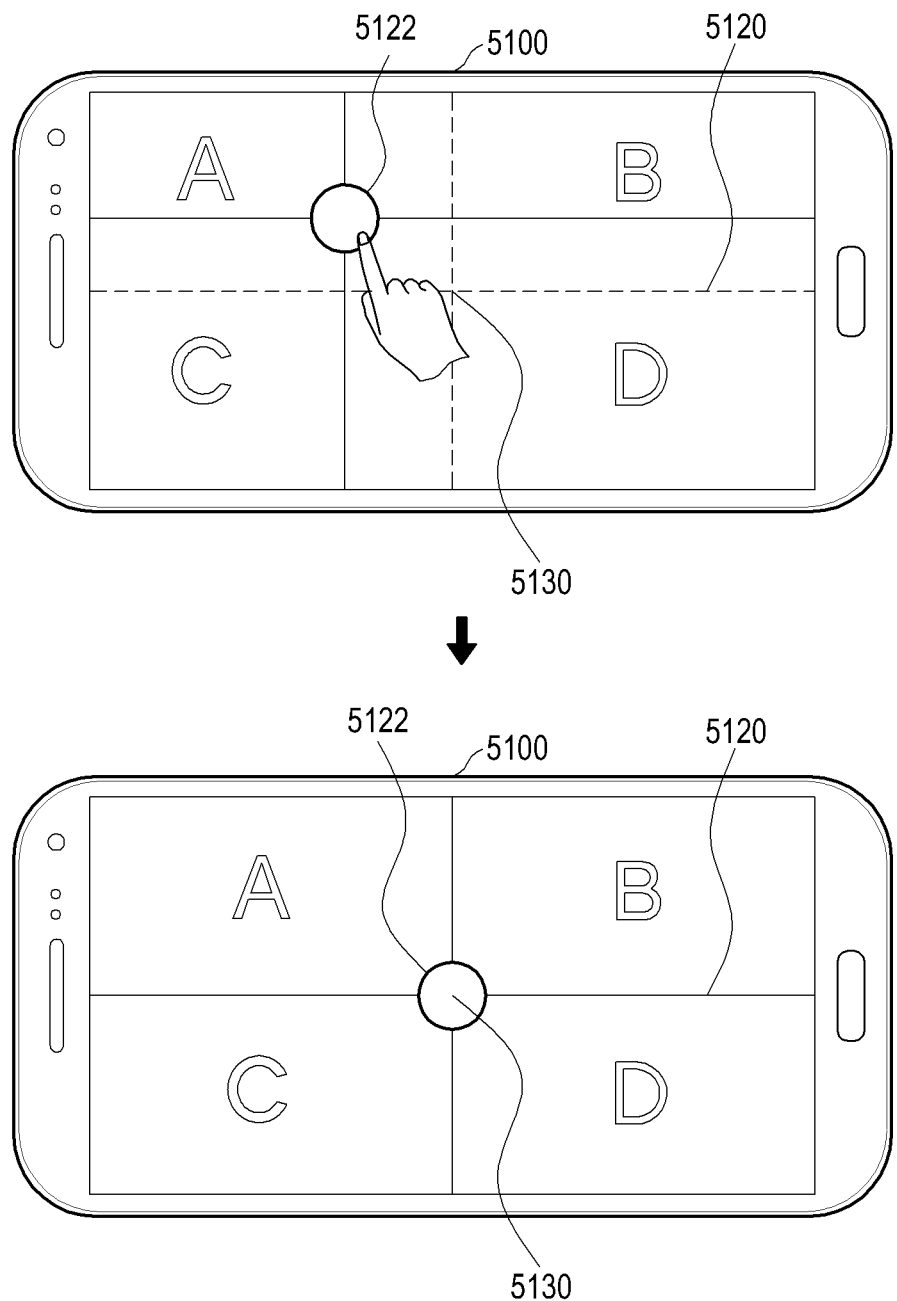

Referring to FIG. 49C, the display device 5100 may define an alignment point 5130 at a certain position of the alignment line 5120. Upon receipt of an input to the button 5122 (e.g., two consecutive touches on the center button 5122), the display device 5100 may move the button 5122 to the alignment point 5130.

Figure 49D:
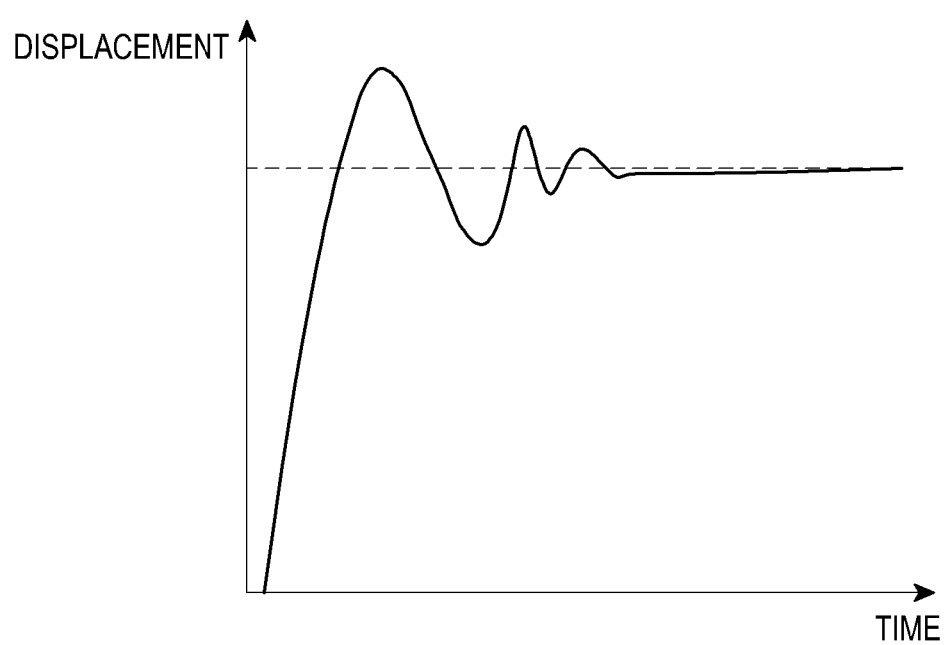

Referring to FIG. 49D, if the center button 5122 moves in the manner illustrated in FIGS. 49A, 49B, and 49C, the movement may be animated according to a function illustrated in FIG. 49D. For example, when the center button 5122 moves to the alignment line 5120 or the alignment point 5130, the center button 5122 may pass the alignment line 5120 or the alignment point 5130 and return to the alignment line 5120 or the alignment point 5130.

Embodiments of the present disclosure provide a display device that can readily switch from one window to another lower-priority window after executing a plurality of windows on a single display, and a method for controlling the display device. Consequently, a user can simultaneously use a plurality of applications in a plurality of windows. Furthermore, if a plurality of windows are displayed overlapped, a currently displayed window is easily switched to another lower-priority window. Accordingly, the user can execute a window in a desired size at a desired position with increased convenience in an environment where a plurality of windows are displayed on a screen.

It will be understood that the various embodiments of the present disclosure can be implemented in hardware, software, or a combination thereof. The software may be stored in a volatile or a non-volatile memory device, such as, a ROM, irrespective of whether data is erasable or rewritable, in a memory, such as, a RAM, a memory chip, a device, an integrated circuit, a storage medium to which data can be recorded optically or magnetically and from which data can be read by a machine (e.g., a computer), such as a Compact Disc (CD), a Digital Versatile Disc (DVD), a magnetic disk, a magnetic tape, or the like. Furthermore, the embodiments of the present disclosure can be implemented in a computer or a portable terminal that has a controller and a memory, such as a machine-readable storage medium suitable for storing a program or programs including commands, to implement the embodiments of the present disclosure. Accordingly, the present disclosure includes a program having a code for implementing the apparatus or methods defined by the claims and a storage medium readable by a machine that stores the program. The program can be transferred electronically through a medium, such as a communication signal transmitted via a wired or a wireless connection, wherein the medium and the equivalents of which are included in the present disclosure.

The device can receive and store the program from a program providing device through a wired or a wireless connection. The program providing device may include a program including commands to implement the embodiments of the present disclosure, a memory for storing information used for the embodiments of the present disclosure, a communication module for communicating with the mobile device through a wired or a wireless connection, and a controller for transmitting the program to the mobile device automatically or upon request.

While the disclosure has been particularly shown and described with reference to various embodiments thereof, it will be understood by those skilled in the art that various changes in form and details may be made therein without departing from the spirit and scope of the present disclosure as defined by the following claims and their equivalents.

What is claimed is:

1. A method of an electronic device with a touch display, the method comprising:
    displaying, on the touch display, an execution screen of a first application in a first size, wherein the execution screen of the first application is displayed on substantially an entirety of a display area of the touch display;
    based on receiving a first user input, displaying, on the touch display, a tray including a plurality of icons respectively corresponding to a plurality of applications, wherein the first user input includes an edge flick received from an edge of the touch display, and the tray is displayed together with the execution screen of the first application;
    receiving, through the touch display, a first drag gesture of dragging a first icon from the tray, wherein the first icon is associated with a second application, and the second application is different from the first application;
    based on the first drag gesture being released in a predetermined area of the display area, displaying, on the touch display, the execution screen of the first application in a second size and an execution screen of the second application in the second size in a split mode, wherein the execution screen of the first application and the execution screen of the second application are displayed on substantially the entirety of the display area of the touch display, and the second size is smaller than the first size; and
    receiving, through the touch display, a second drag gesture of dragging a second icon from the tray while the execution screen of the first application and the execution screen of the second application are displayed in the split mode, wherein the second icon is associated with a third application:
        based on the second drag gesture being released in an area of the display area corresponding to the execution screen of the first application, displaying, on the touch display, the execution screen of the second application and an execution screen of the third application in the split mode by displaying the execution screen of the third application on the area of the display area corresponding to the execution screen of the first application, wherein the execution screen of the second application and the execution screen of the third application are displayed on substantially the entirety of the display area of the touch display,
        based on the second drag gesture being released in an area of the display area corresponding to the execution screen of the second application, displaying, on the touch display, the execution screen of the first application and the execution screen of the third application in the split mode by displaying the execution screen of the third application on the area of the display area corresponding to the execution screen of the second application, wherein the execution screen of the first application and the execution screen of the third application are displayed on substantially the entirety of the display area of the touch display, and
        based on the second drag gesture being released in an area of the display area corresponding to a boundary between the execution screen of the first application and the execution screen of the second application, displaying the execution screen of the third application in the first size on substantially the entirety of the display area of the touch display.

2. The method of claim 1, further comprising:
    displaying a visual effect around the first icon while the first drag gesture is received.

3. The method of claim 1, wherein, as a position of the first drag gesture is changed, a position of the first icon being displayed is changed corresponding to the position of the first drag gesture.

4. The method of claim 1, further comprising:
    displaying a center button on the boundary between the execution screen of the first application and the execution screen of the second application,
    wherein the center button is configured to provide a function of changing a size of at least one of the execution screen of the first application or the execution screen of the second application in response to a third drag gesture of dragging the center button.

5. The method of claim 1, wherein the split mode includes a mode in which a plurality of execution screens are not overlapped and displayed.

6. An electronic device, comprising:
    a touch display; and
    one or more processors configured to control to:

display, on the touch display, an execution screen of a first application in a first size, wherein the execution screen of the first application is displayed on substantially an entirety of a display area of the touch display;

based on receiving a first user input, display, on the touch display, a tray including a plurality of icons respectively corresponding to a plurality of applications, wherein the first user input includes an edge flick received from an edge of the touch display, and the tray is displayed together with the execution screen of the first application;

receive, through the touch display, a first drag gesture of dragging a first icon from the tray, wherein the first icon is associated with a second application, and the second application is different from the first application;

based on the first drag gesture being released in a predetermined area of the display area, display, on the touch display, the execution screen of the first application in a second size and an execution screen of the second application in the second size in a split mode, wherein the execution screen of the first application and the execution screen of the second application are displayed on substantially the entirety of the display area of the touch display, and the second size is smaller than the first size; and receive, through the touch display, a second drag gesture of dragging a second icon from the tray while the execution screen of the first application and the execution screen of the second application are displayed in the split mode, wherein the second icon is associated with a third application:

based on the second drag gesture being released in an area of the display area corresponding to the execution screen of the first application, display, on the touch display, the execution screen of the second application and an execution screen of the third application in the split mode by displaying the execution screen of the third application on the area of the display area corresponding to the execution screen of the first application, wherein the execution screen of the second application and the execution screen of the third application are displayed on substantially the entirety of the display area of the touch display, based on the second drag gesture being released in an area of the display area corresponding to the execution screen of the second application, display, on the touch display, the execution screen of the first application and the execution screen of the third application in the split mode by displaying the execution screen of the third application on the area of the display area corresponding to the execution screen of the second application, wherein the execution screen of the first application and the execution screen of the third application are displayed on substantially the entirety of the display area of the touch display, and based on the second drag gesture being released in an area of the display area corresponding to a boundary between the execution screen of the first application and the execution screen of the second application, display the execution screen of the third application in the first size on substantially the entirety of the display area of the touch display.

7. The electronic device of claim 6, wherein the split mode includes a mode in which a plurality of execution screens are not overlapped and displayed.

8. The electronic device of claim 6, wherein the one or more processors are further configured to control to display a visual effect around the first icon while the first drag gesture is received.

9. The electronic device of claim 6, wherein, as a position of the first drag gesture is changed, a position of the first icon being displayed is changed corresponding to the position of the first drag gesture.

10. The electronic device of claim 6,
wherein the one or more processors are further configured to control to:
display a center button on the boundary between the execution screen of the first application and the execution screen of the second application, and
wherein the center button is configured to provide a function changing a size of at least one of the execution screen of the first application or the execution screen of the second application in response to a third drag gesture of dragging the center button.

11. The method of claim 2, wherein, as a position of the first drag gesture is changed while continuing to be detected on the execution screen of the first application, a size of the visual effect being displayed does not change.

12. The electronic device of claim 8, wherein, as a position of the first drag gesture is changed while continuing to be detected on the execution screen of the first application, a size of the visual effect being displayed does not change.

* * * * *